US012777349B2

(12) United States Patent
Zhu et al.

(10) Patent No.: US 12,777,349 B2
(45) Date of Patent: Oct. 27, 2026

(54) BEAM FAILURE DECLARATION, NEW BEAM IDENTIFICATION, AND RECOVERY IN MULTI-TRP OPERATION

(71) Applicant: Samsung Electronics Co., Ltd., Suwon-si (KR)

(72) Inventors: Dalin Zhu, Allen, TX (US); Emad Nader Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 18/408,436

(22) Filed: Jan. 9, 2024

(65) Prior Publication Data

US 2024/0259843 A1 Aug. 1, 2024

Related U.S. Application Data

(60) Provisional application No. 63/471,077, filed on Jun. 5, 2023, provisional application No. 63/442,017, filed (Continued)

(51) Int. Cl.

*H04W 24/08* (2009.01)
*H04L 1/1812* (2023.01)

(Continued)

(52) U.S. Cl.

CPC .......... *H04W 24/08* (2013.01); *H04L 1/1812* (2013.01); *H04W 72/1268* (2013.01);

(Continued)

(58) Field of Classification Search

CPC ............ H04W 72/1273; H04W 76/20; H04W 72/1268; H04W 24/08; H04W 72/232;

(Continued)

(56) References Cited

U.S. PATENT DOCUMENTS

2021/0028849 A1 1/2021 Chin
2021/0152234 A1 5/2021 Zhou et al.

(Continued)

FOREIGN PATENT DOCUMENTS

WO 2022239966 A1 11/2022

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

(Continued)

*Primary Examiner* — Kwang B Yao

(57) ABSTRACT

Methods and apparatuses for beam failure declaration, new beam identification, and recovery in multi transmission and reception point (TRP) operation. A method performed by a user equipment (UE) includes transmitting a physical uplink shared channel (PUSCH) including a first reference signal (RS) index for a first beam failure recovery request associated with a first beam failure detection (BFD) RS set; receiving a response to the first beam failure recovery request; receiving first information for reception of a physical downlink control channel (PDCCH); and receiving second information for reception of a physical downlink shared channel (PDSCH). The method further includes determining, based on the response and the first information, whether to apply a first spatial domain filter according to the first RS index for reception of the PDCCH and determining, based on the response and the second information, whether to apply a second spatial domain filter according to the first RS index for reception of the PDSCH.

20 Claims, 19 Drawing Sheets

Related U.S. Application Data on Jan. 30, 2023, provisional application No. 63/441,126, filed on Jan. 25, 2023, provisional application No. 63/440,303, filed on Jan. 20, 2023.

(51) Int. Cl.

| | |
|---|---|
| ***H04W 72/1268*** | (2023.01) |
| ***H04W 72/1273*** | (2023.01) |
| ***H04W 72/232*** | (2023.01) |
| ***H04W 76/20*** | (2018.01) |

(52) U.S. Cl.

CPC ..... *H04W 72/1273* (2013.01); *H04W 72/232* (2023.01); *H04W 76/20* (2018.02)

(58) Field of Classification Search

CPC ............. H04W 72/1263; H04W 76/19; H04W 72/231; H04L 1/1812; H04L 5/0023; H04L 5/0051; H04L 5/0048; H04L 5/0053; H04B 7/06964; H04B 7/088; H04B 7/0695

See application file for complete search history.

(56) References Cited

U.S. PATENT DOCUMENTS

| | | | | |
|---|---|---|---|---|
| 2022/0103227 | A1* | 3/2022 | Lee | H04W 72/23 |
| 2022/0158715 | A1* | 5/2022 | Bishwarup | H04W 72/23 |
| 2022/0225135 | A1 | 7/2022 | Cirik et al. | |
| 2022/0286183 | A1 | 9/2022 | Yi et al. | |
| 2022/0322480 | A1 | 10/2022 | Deenoo et al. | |
| 2023/0032365 | A1* | 2/2023 | Bai | H04B 7/06964 |
| 2023/0336232 | A1* | 10/2023 | Moon | H04B 7/0695 |
| 2024/0039612 | A1 | 2/2024 | Jung et al. | |
| 2024/0048345 | A1* | 2/2024 | He | H04W 72/23 |
| 2024/0057111 | A1* | 2/2024 | Lin | H04L 5/0094 |
| 2024/0172229 | A1* | 5/2024 | Gao | H04W 72/1273 |
| 2024/0187199 | A1* | 6/2024 | Gao | H04W 72/12 |
| 2024/0334452 | A1* | 10/2024 | Gao | H04L 5/0094 |
| 2024/0372689 | A1* | 11/2024 | Gao | H04L 5/0094 |
| 2024/0430969 | A1* | 12/2024 | Gao | H04B 7/06964 |
| 2025/0007584 | A1* | 1/2025 | Svedman | H04B 7/0626 |
| 2025/0007679 | A1* | 1/2025 | Matsumura | H04W 16/28 |
| 2025/0038823 | A1* | 1/2025 | Go | H04L 5/0094 |
| 2025/0062818 | A1* | 2/2025 | Gao | H04L 5/0053 |
| 2025/0240134 | A1* | 7/2025 | Park | H04L 5/0091 |
| 2025/0254748 | A1* | 8/2025 | Matsumura | H04W 24/04 |
| 2025/0351153 | A1* | 11/2025 | Go | H04W 72/21 |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

International Search Report and Written Opinion issued Apr. 25, 2024 regarding International Application No. PCT/KR2024/000943, 8 pages.

Supplementary European Search Report dated Mar. 20, 2026, in connection with European Patent Application No. 24744920.0, 11 pages.

Ericsson, "Unified TCI framework extension for multiple TCI states," R1-2211051, 3GPP TSG-RAN WG1 Meeting #111, Toulouse, France, Nov. 14-18, 2022, 14 pages.

* cited by examiner

BEAM FAILURE DECLARATION, NEW BEAM IDENTIFICATION, AND RECOVERY IN MULTI-TRP OPERATION

CROSS-REFERENCE TO RELATED AND CLAIM OF PRIORITY

The present application claims priority under 35 U.S.C. § 119(e) to U.S. Provisional Patent Application No. 63/440,303 filed on Jan. 20, 2023; U.S. Provisional Patent Application No. 63/441,126 filed on Jan. 25, 2023; U.S. Provisional Patent Application No. 63/442,017 filed on Jan. 30, 2023; and U.S. Provisional Patent Application No. 63/471,077 filed on Jun. 5, 2023, which are hereby incorporated by reference in their entirety.

TECHNICAL FIELD

The present disclosure relates generally to wireless communication systems and, more specifically, the present disclosure relates to methods and apparatus for beam failure declaration, new beam identification, and recovery in multi transmission and reception point (TRP) operation.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to beam failure declaration, new beam identification, and recovery in multi-TRP operation.

In an embodiment, a user equipment (UE) is provided. The UE includes a transceiver configured to transmit a physical uplink shared channel (PUSCH) including a first reference signal (RS) index for a first beam failure recovery request associated with a first beam failure detection (BFD) RS set; receive a response to the first beam failure recovery request; receive first information for reception of a physical downlink control channel (PDCCH); and receive second information for reception of a physical downlink shared channel (PDSCH). The UE further includes a processor operably coupled to the transceiver. The processor is configured to determine, based on the response and the first information, whether to apply a first spatial domain filter according to the first RS index for reception of the PDCCH and determine, based on the response and the second information, whether to apply a second spatial domain filter according to the first RS index for reception of the PDSCH.

In another embodiment, a base station (BS) is provided. The BS includes a transceiver configured to receive a PUSCH including a first RS index for a first beam failure recovery request associated with a first BFD RS set; transmit a response to the first beam failure recovery request; transmit first information for reception of a PDCCH; and transmit second information for reception of a PDSCH. A processor operably coupled to the transceiver is provided. The processor is configured to determine, based on the response and the first information, whether to apply a first spatial domain filter according to the first RS index for transmission of the PDCCH and determine, based on the response and the second information, whether to apply a second spatial domain filter according to the first RS index for transmission of the PDSCH.

In yet another embodiment, a method performed by a UE is provided. The method includes transmitting a PUSCH including a first RS index for a first beam failure recovery request associated with a first BFD RS set; receiving a response to the first beam failure recovery request; receiving first information for reception of a PDCCH; and receiving second information for reception of a PDSCH. The method further includes determining, based on the response and the first information, whether to apply a first spatial domain filter according to the first RS index for reception of the PDCCH and determining, based on the response and the second information, whether to apply a second spatial domain filter according to the first RS index for reception of the PDSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-19, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation;" [2] 3GPP TS 38.212 v16.1.0, "NR; Multiplexing and Channel coding;"

[3] 3GPP TS 38.213 v16.1.0, "NR; Physical Layer Procedures for Control;" [4] 3GPP TS 38.214 v16.1.0, "NR; Physical Layer Procedures for Data;" [5] 3GPP TS 38.321 v16.1.0, "NR; Medium Access Control (MAC) protocol specification;" and [6] 3GPP TS 38.331 v16.1.0, "NR; Radio Resource Control (RRC) Protocol Specification."

Figure 1:
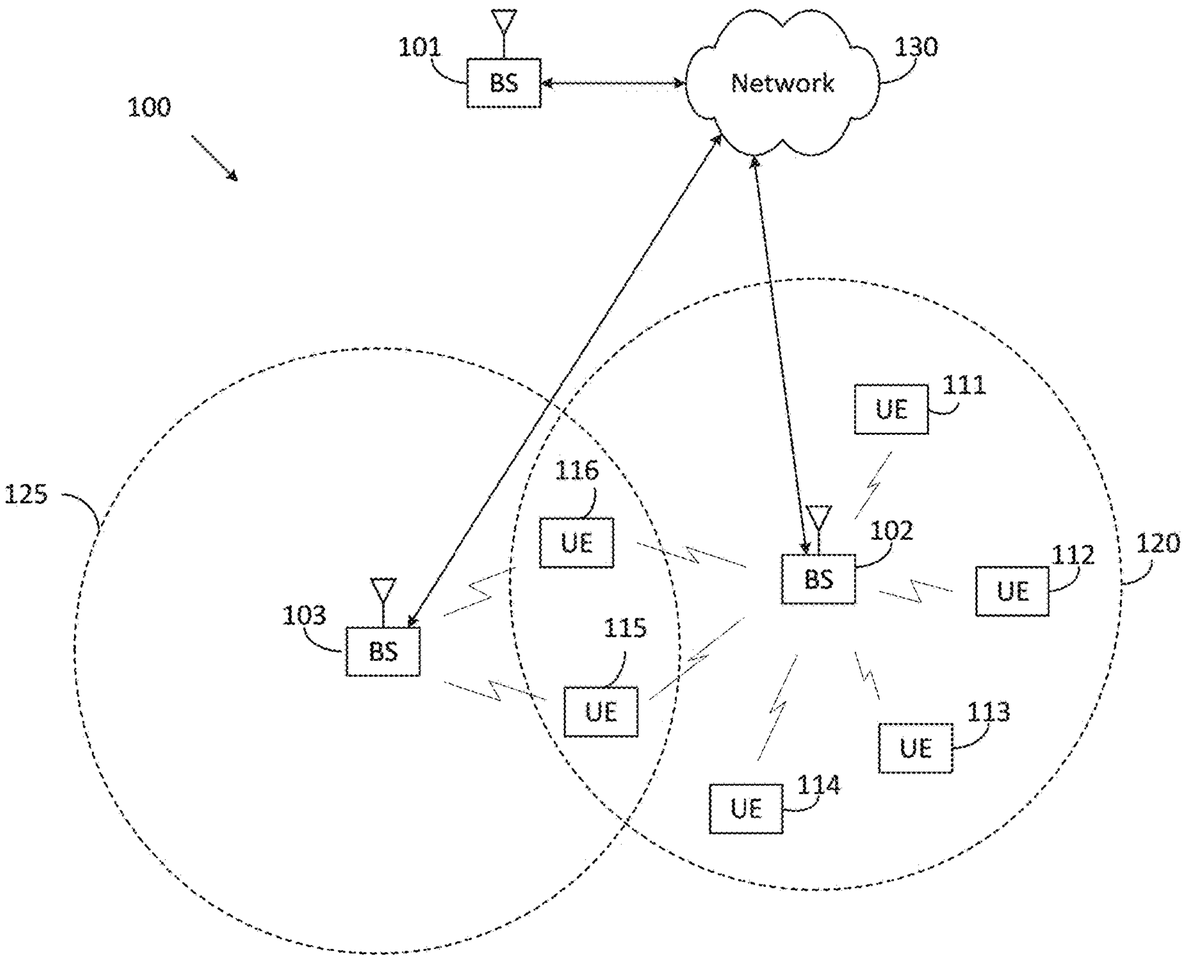
FIG. 1 illustrates an example wireless network according to embodiments of the present disclosure.
Figure 2:
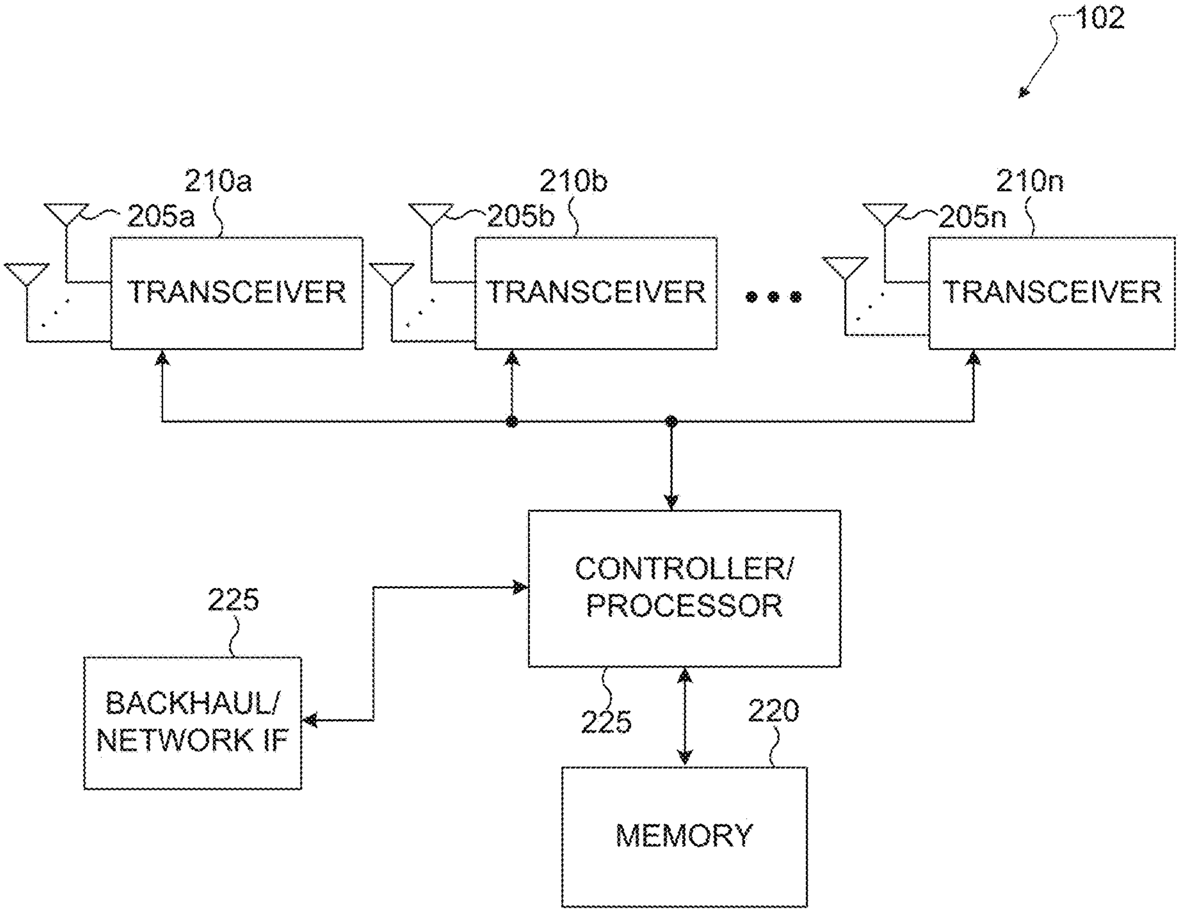
FIG. 2 illustrates an example gNodeB (gNB) according to embodiments of the present disclosure.
Figure 3:
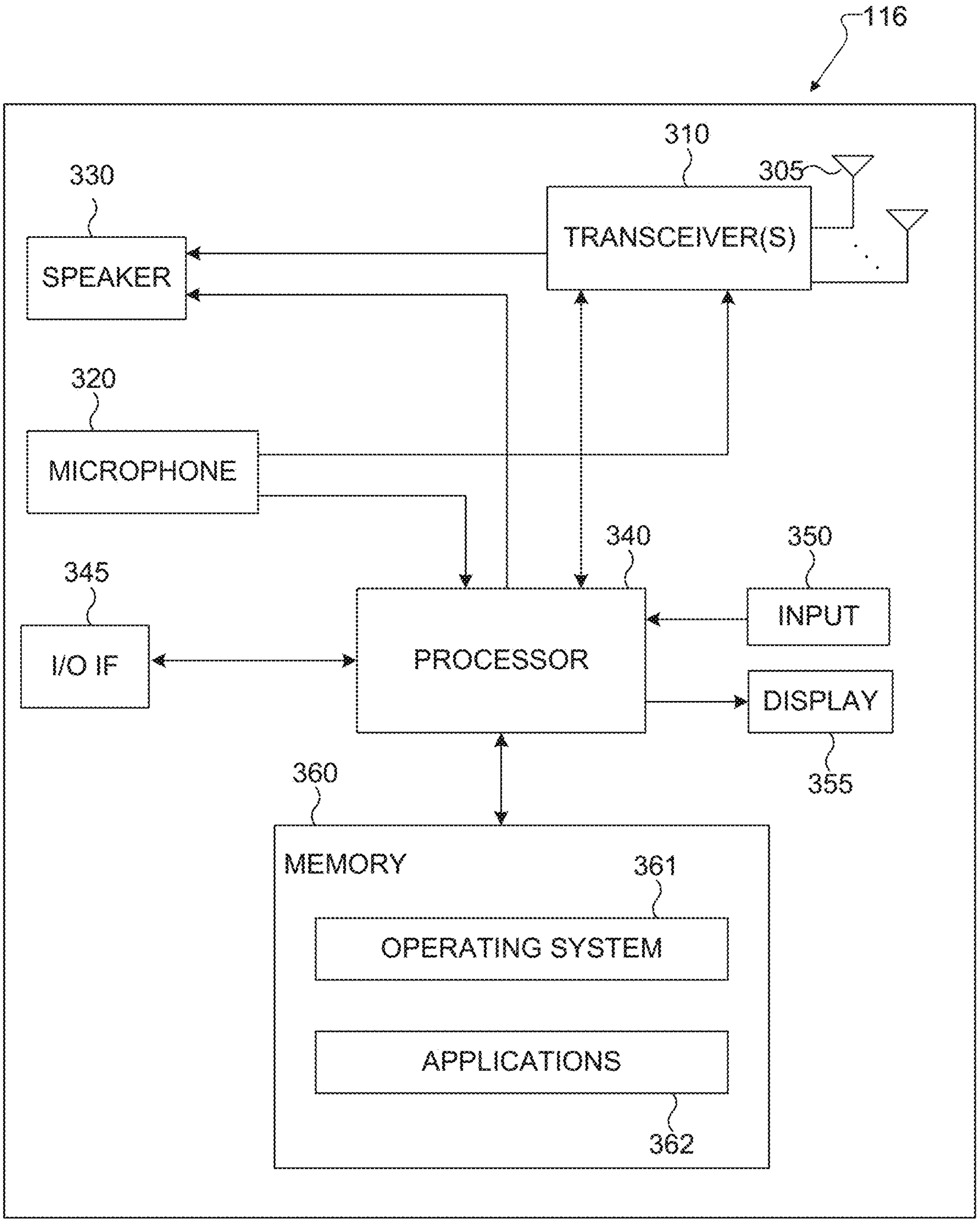
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for performing beam failure declaration, new beam identification, and recovery in multi-TRP operation. In certain embodiments, one or more of the BSs 101-103 include circuitry, programing, or a combination thereof to support beam failure declaration, new beam identification, and recovery in multi-TRP operation.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for beam failure declaration, new beam identification, and recovery in multi-TRP operation. Any of a wide variety of other functions could be supported in the gNB 102 by the controller/processor 225.

The controller/processor 225 is also capable of executing programs and other processes resident in the memory 230, such as to support beam failure declaration, new beam identification, and recovery in multi-TRP operation. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for performing beam failure declaration, new beam identification, and recovery in multi-TRP operation as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
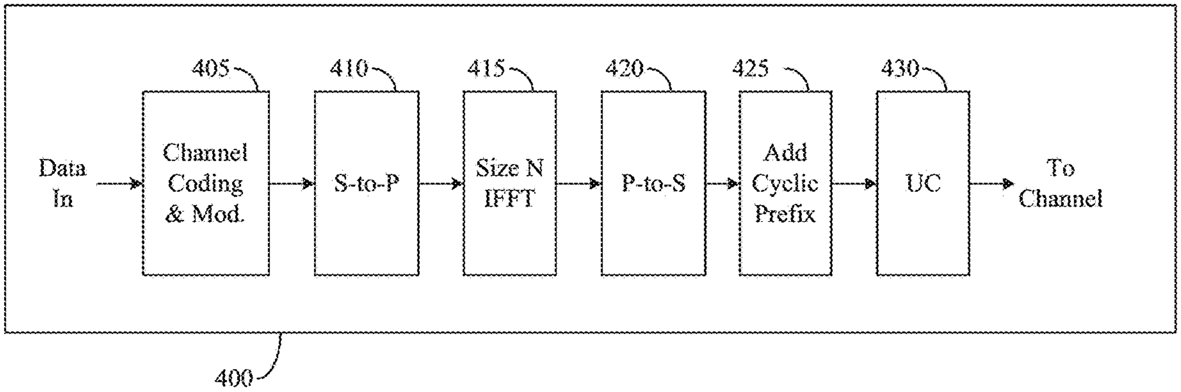
FIGS. 4A and 4B illustrate an example of a wireless transmit and receive paths according to embodiments of the present disclosure.
Figure 4B:
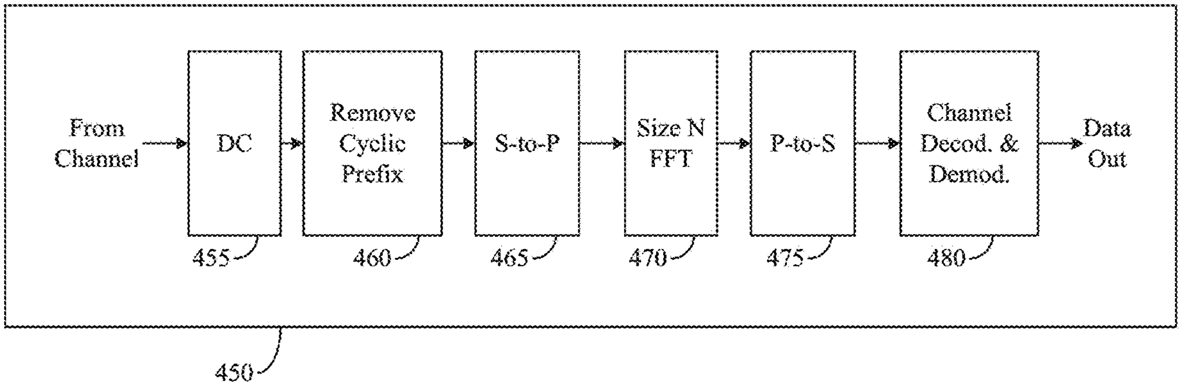

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to support beam failure declaration, new beam identification, and recovery in multi-TRP operation as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In embodiments of the present disclosure, a beam is determined by either a transmission configuration indicator (TCI) state that establishes a quasi-colocation (QCL) relationship between a source reference signal (RS) (e.g., single sideband (SSB) and/or Channel State Information Reference Signal (CSI-RS)) and a target RS or a spatial relation information that establishes an association to a source RS, such as SSB or CSI-RS or sounding reference signal (SRS). In either case, the ID of the source reference signal identifies the beam. The TCI state and/or the spatial relation reference RS can determine a spatial RX filter for reception of downlink channels at the UE 116, or a spatial TX filter for transmission of uplink channels from the UE 116.

Figure 5A:
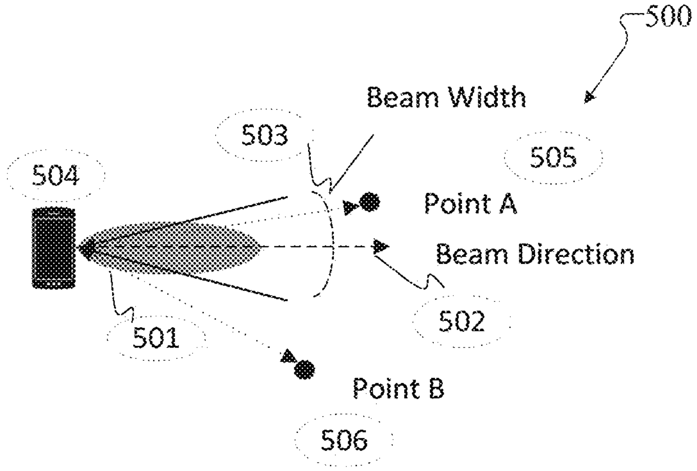
FIG. 5A illustrates an example of a wireless system according to embodiments of the present disclosure.

As illustrated in FIG. 5A, in a wireless system 500, a beam 501 for a device 504 can be characterized by a beam direction 502 and a beam width 503. For example, the device 504 (or UE 116) transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 506 cannot receive from and transmit to device 504 as Point B 506 is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

Figure 5B:
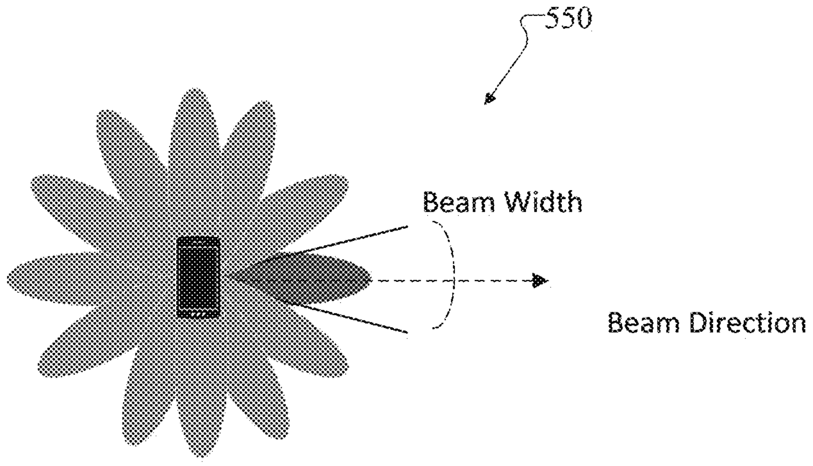
FIG. 5B illustrates an example of a multi-beam operation according to embodiments of the present disclosure.

FIG. 5B illustrates an example of a multi-beam operation 550 according to embodiments of the present disclosure. For example, the multi-beam operation 550 can be utilized by gNB 102 of FIG. 2. This example is for illustration only and other embodiments can be used without departing from the scope of the present disclosure.

In a wireless system, a device can transmit and/or receive on multiple beams. This is known as "multi-beam operation". While FIG. 5B, for illustrative purposes, a beam is in 2D, it should be apparent to those skilled in the art, that a beam can be 3D, where a beam can be transmitted to or received from any direction in space.

Figure 6:
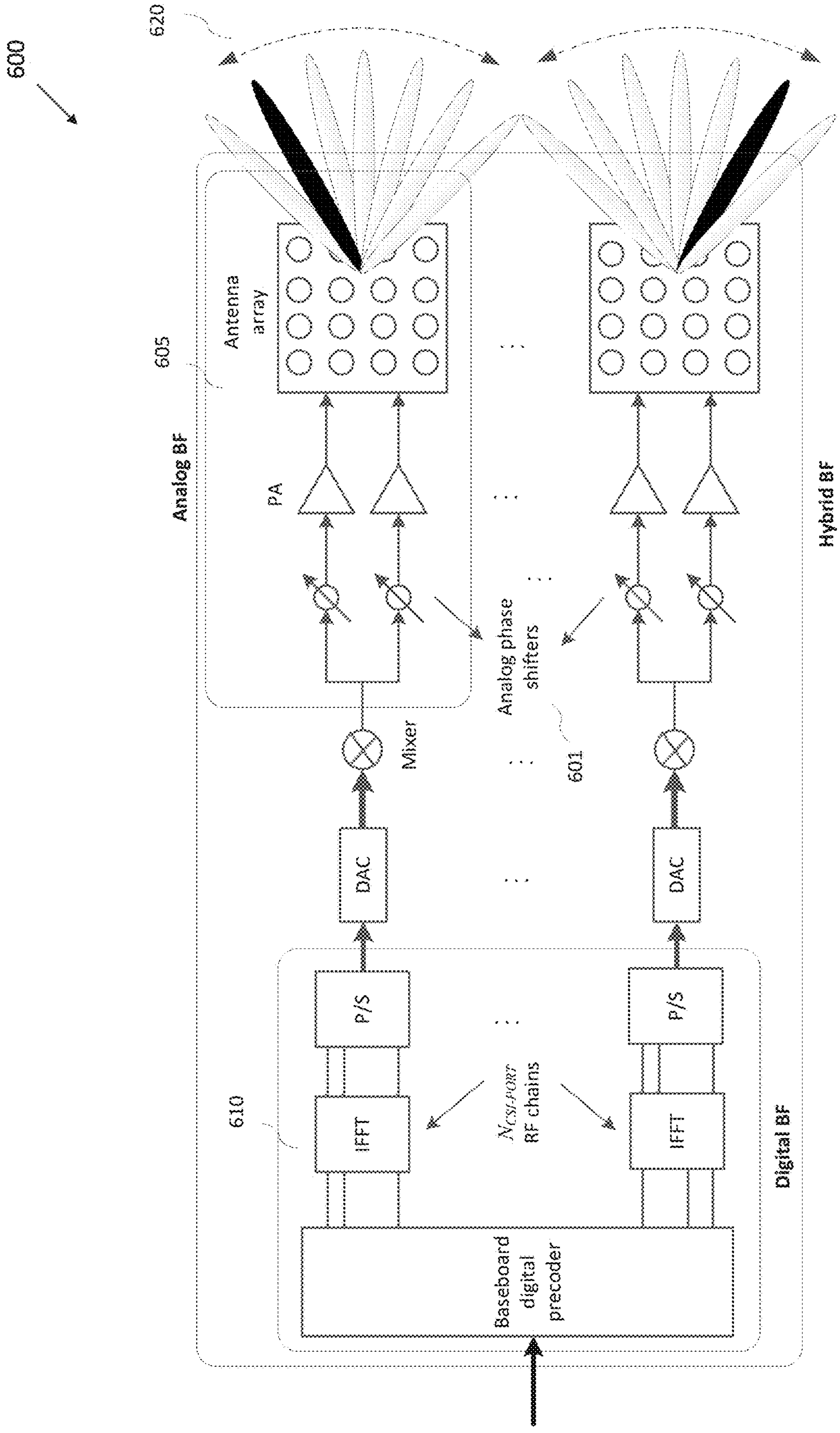
FIG. 6 illustrates an example of a transmitter structure for beamforming according to embodiments of the present disclosure.

FIG. 6 illustrates an example of a transmitter structure 600 for beamforming according to embodiments of the present disclosure. In certain embodiments, one or more of gNB 102 or UE 116 includes the transmitter structure 600. For example, one or more of antenna 205 and its associated systems or antenna 305 and its associated systems can be included in transmitter structure 600. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI\text{-}PORT}$. A digital beamforming unit 610 performs a linear combination across $N_{CSI\text{-}PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 600 of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 6 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 600 for beamforming is for illustration only and other embodiments can be used without departing from the scope of the present disclosure.

The flowcharts herein illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Figure 7:
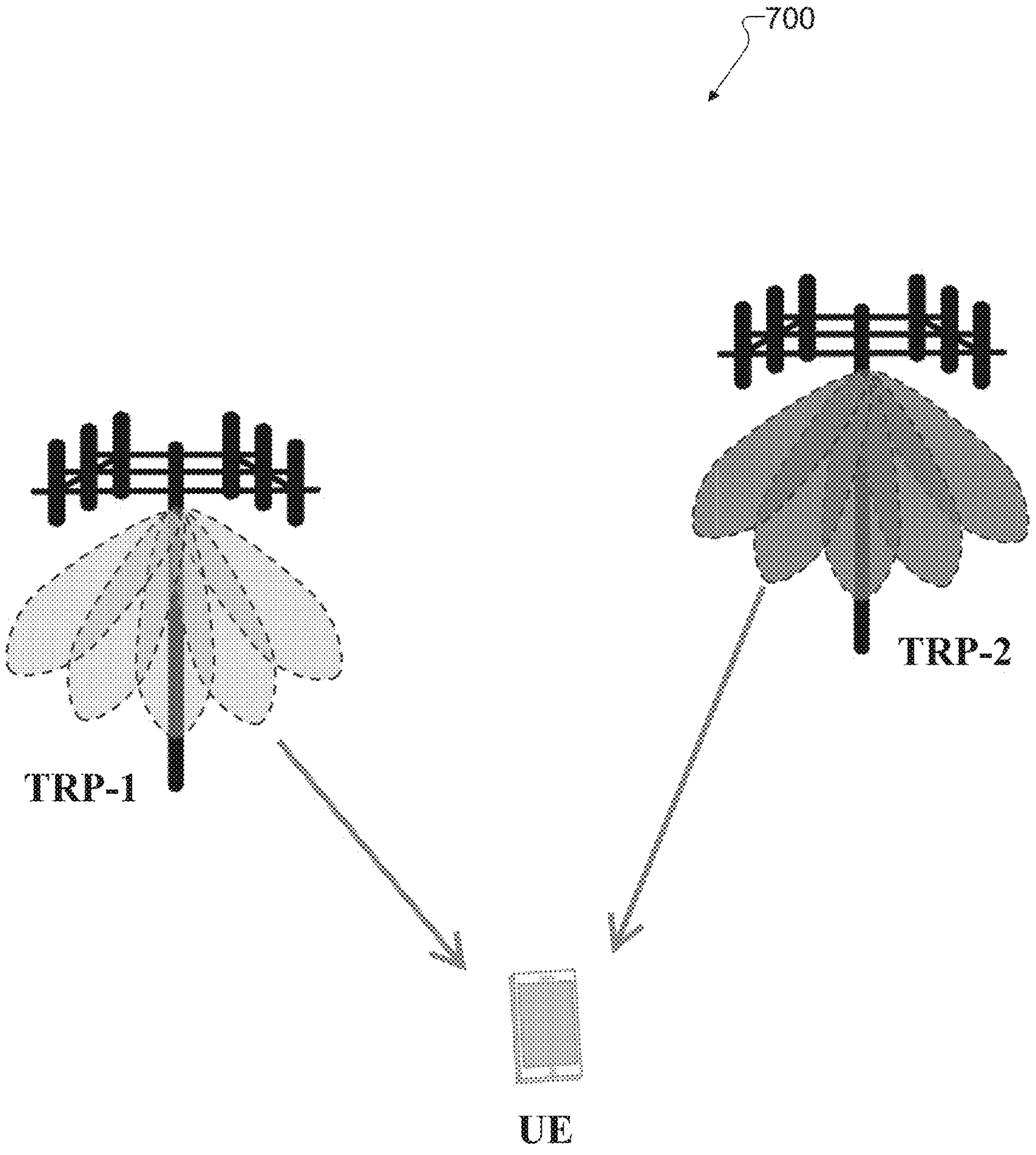
FIG. 7 illustrates an example system of a multi-TRP according to embodiments of the present disclosure.

FIG. 7 illustrates an example system 700 of a multi-TRP according to embodiments of the present disclosure. For example, the system 700 may operate within the wireless network 100 in FIG. 1. This example is for illustration only and other embodiments can be used without departing from the scope of the present disclosure.

With reference to FIG. 7, a UE could simultaneously receive from multiple physically non-co-located TRPs various channels/RSs such as PDCCHs and/or PDSCHs using either a single receive (RX) panel or multiple RX panels. In this disclosure, a RX panel could correspond to a set of RX antenna elements/ports at the UE, a set of measurement RS resources such as SRS resources, a spatial domain RX filter or etc. Furthermore, a TRP in the multi-TRP system can represent a collection of measurement antenna ports, measurement RS resources and/or control resource sets (CORESETs). For example, a TRP could be associated with one or more of:

- A plurality of CSI-RS resources
- A plurality of CRIs (CSI-RS resource indices/indicators)
- A measurement RS resource set, for example, a CSI-RS resource set along with its indicator
- A plurality of CORESETs associated with a CORESETPoolIndex
- A plurality of CORESETs associated with a TRP-specific index/indicator/identity A cell/TRP could be a non-serving cell/TRP. In this disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation evaluated in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI, or a different PCI (with respect to the serving cell PCI).

Furthermore, in a wireless communications system, a radio link failure (RLF) could occur if a significant/sudden link quality drop is observed at the UE side. Therefore, if a RLF occurs, fast RLF recovery mechanisms become essential to promptly re-establish the communication link(s) and avoid severe service interruption. At higher frequencies, e.g., millimeter-wave (mmWave) frequencies or FR2 in the 3GPP NR, both the transmitter and receiver could use directional (analog) beams to transmit and receive various RSs/channels such as SSBs, CSI-RSs, PDCCHs, or PDSCHs. Hence, embodiments of the present disclosure recognize prior to declaring a full RLF, the UE could first detect and recover a potential beam failure if the signal qualities/strengths of certain beam pair links (BPLs) are below a certain threshold for a certain period of time.

Figure 8:
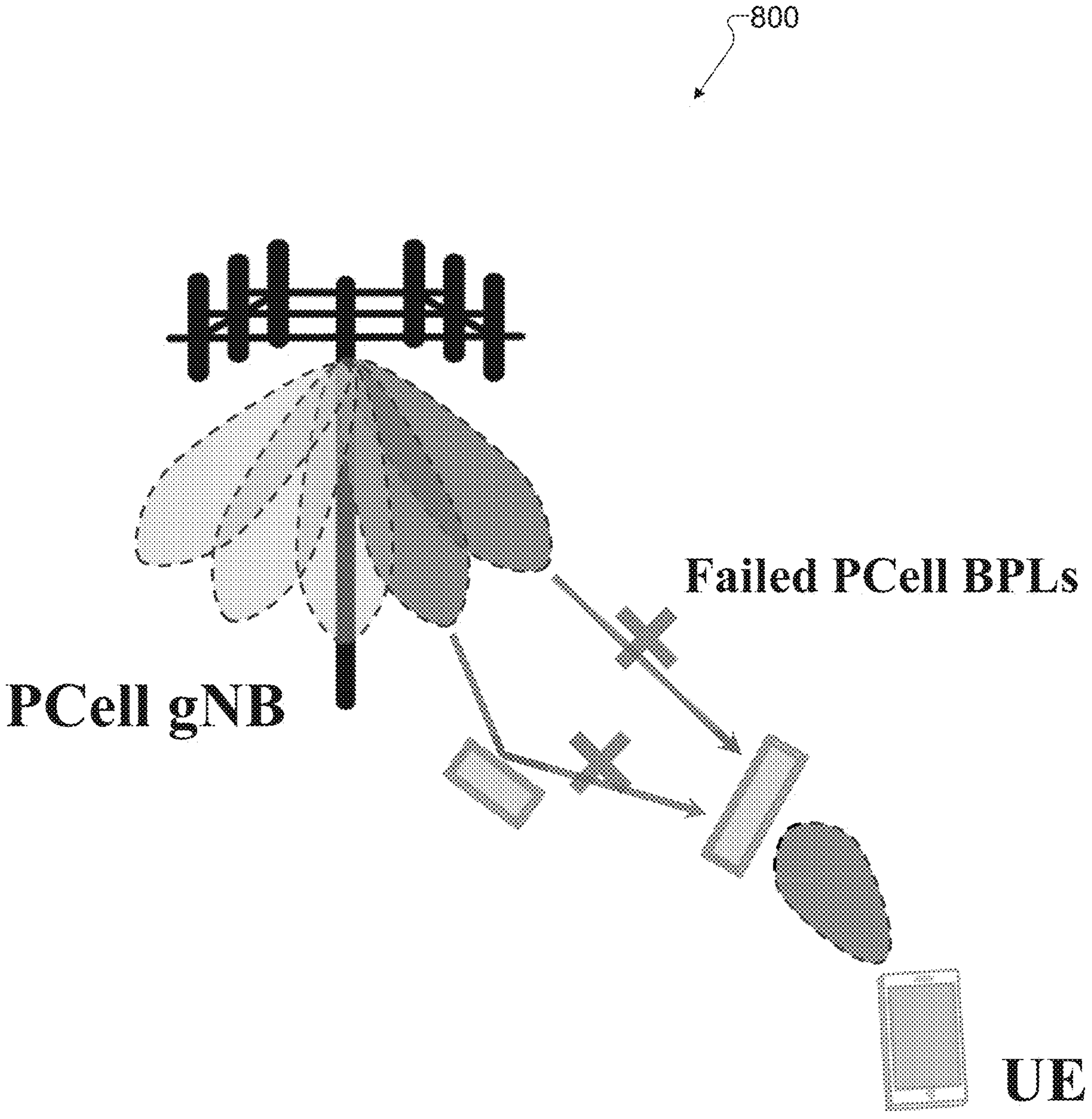
FIG. 8 illustrates an example system of a primary cell (PCell) beam failure according to embodiments of the present disclosure.

FIG. 8 illustrates an example system 800 of a PCell according to embodiments of the present disclosure. For example, system 800 may operate within the wireless network 100 in FIG. 1. This example is for illustration only and other embodiments can be used without departing from the scope of the present disclosure.

The 3GPP Rel. 15 beam failure recovery (BFR) procedure mainly targets for a primary cell (PCell or PSCell) under the carrier aggregation (CA) framework (FIG. 8). The BFR procedure in the 3GPP Rel. 15 comprises the following key components:

Beam failure detection (BFD)

New beam identification (NBI)

BFR request (BFRQ)

BFRQ response (BFRR)

The UE is first configured by the gNB a set of BFD RS resources to monitor the link qualities between the gNB and the UE. One BFD RS resource could correspond to one (periodic) CSI-RS/SSB RS resource, which could be a quasi-co-located (QCL) source RS with typeD in a TCI state for a CORESET. If the received signal qualities of all the BFD RS resources are below a given threshold (implying that the hypothetical block error rates (BLERs) of the corresponding CORESETs/PDCCHs are above a given threshold), the UE could declare a beam failure instance (BFI). Furthermore, if the UE has declared N_BFI consecutive BFIs within a given time period, the UE would declare a beam failure.

After declaring/detecting the beam failure, the UE would transmit the BFRQ to the gNB via a contention-free (CF) physical random access channel (PRACH) (CF BFR-PRACH) resource, whose index is associated with a new beam identified by the UE. Specifically, to determine a potential new beam, the UE could be first configured by the network a set of SSB and/or CSI-RS resources (NBI RS resources) via a higher layer parameter candidateBeamRSList. The UE would then measure the NBI RSs and calculate their layer 1 receive signal receive powers (L1-RSRPs). If at least one of the measured L1-RSRPs of the NBI RSs is beyond a given threshold, the UE would select the beam that corresponds to the NBI RS with the highest L1-RSRP as the new beam q_new. To determine a CF BFR-PRACH resource to convey the BFRQ, the UE could be first configured by the network a set of PRACH resources, each associated with a NBI RS resource. The UE could then select the PRACH resource that has the one-to-one correspondence to the selected NBI RS resource (and therefore, the new beam index q_new) to send the BFRQ to the gNB. From the index of the selected CF PRACH resource, the gNB could also know which beam is selected by the UE as the new beam.

Four slots after the UE has transmitted the BFRQ, the UE could start to monitor a dedicated CORESET/search space for BFRQ response. The dedicated CORESET is addressed to the UE-specific cell-radio network temporary identifier (C-RNTI) and would be transmitted by the gNB using the newly identified beam. If the UE detects a valid UE-specific downlink control information (DCI) in the dedicated CORESET for BFRR, the UE assumes that the beam failure recovery request has been successfully received by the network and the UE would complete the BFR process. Otherwise, if the UE does not receive the BFRR within a configured time window, the UE would initiate a contention based (CB) random access (RA) process to reconnect to the network.

Figure 9:
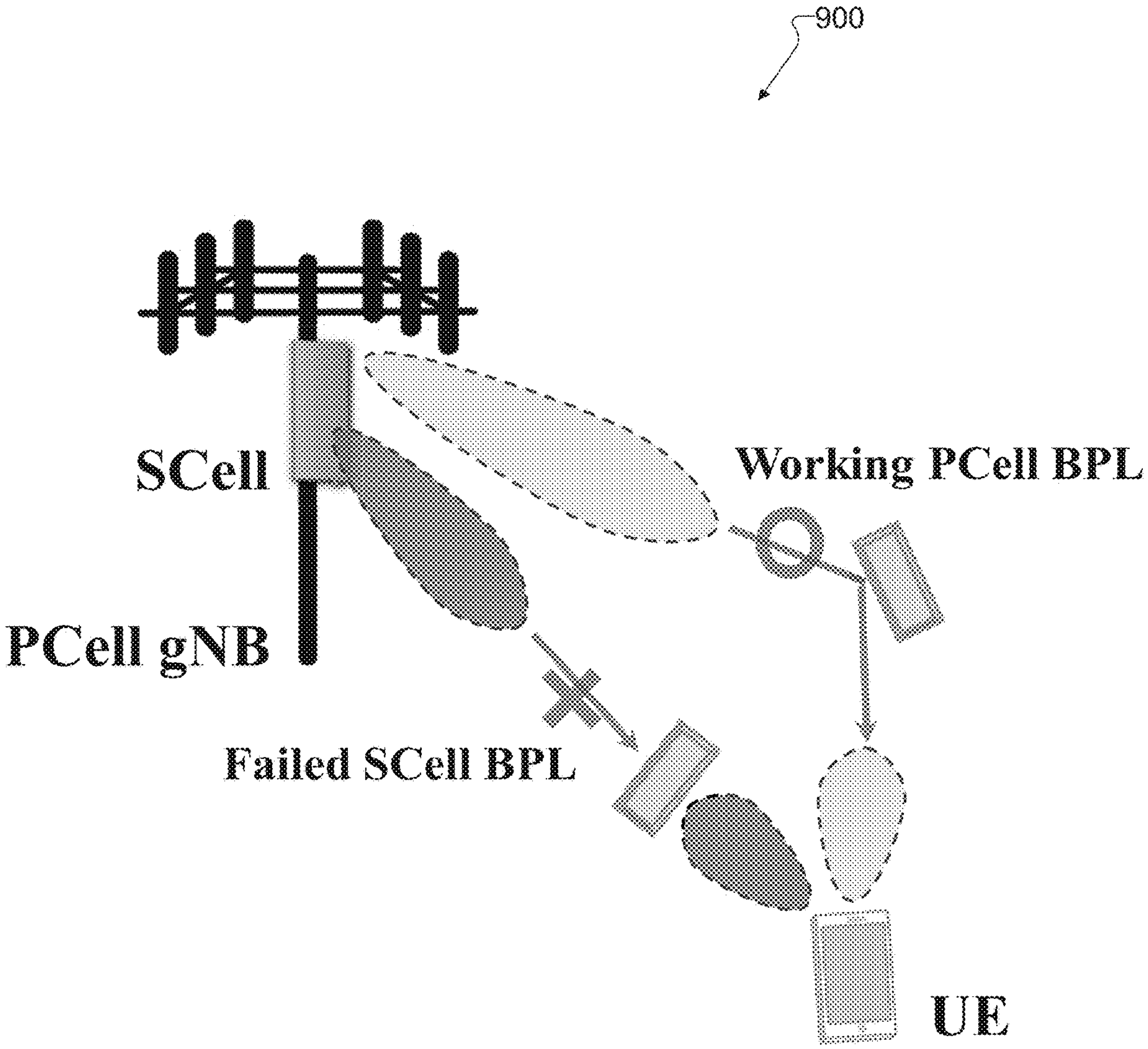
FIG. 9 illustrates an example system of a secondary cell (SCell) beam failure according to embodiments of the present disclosure.

FIG. 9 illustrates an example system 900 of a secondary cell (SCell) according to embodiments of the present disclosure. For example, system 900 may operate within the wireless network 100 in FIG. 1. This example is for illustration only and other embodiments can be used without departing from the scope of the present disclosure.

In the 3GPP Rel. 16, the BFR procedures were customized for the secondary cell (SCell) under the CA framework, in which the BPL(s) between the PCell and the UE is assumed to be always working.

After declaring/detecting the beam failure for the SCell, the UE would transmit the BFRQ in form of a scheduling request (SR) over a PUCCH for the working PCell. Furthermore, the UE could only transmit the BFRQ at this stage without indicating any new beam index, failed SCell index or other information to the network. This is different from the Rel. 15 PCell/PSCell procedure, in which the UE would indicate both the BFRQ and the identified new beam index to the network at the same time. Allowing the gNB to quickly know the beam failure status of the SCell without waiting for the UE to identify a new beam could be beneficial. For instance, the gNB could deactivate the failed SCell and allocate the resources to other working SCells.

The UE could be indicated by the network an uplink grant in response to the BFRQ SR, which would allocate necessary resources for the MAC CE to carry new beam index q_new (if identified), failed SCell index, etc. over the PUSCH for the working PCell. After transmitting the MAC CE for BFR to the working PCell, the UE would start to monitor the BFRR. The BFRR could be a TCI state indication for a CORESET for the corresponding SCell. The BFRR to the MAC CE for BFR could also be a normal uplink grant for scheduling a new transmission for the same HARQ process as the PUSCH carrying the MAC CE for BFR. If the UE could not receive the BFRR within a configured time window, the UE could transmit BFR-PUCCH again or fall back to contention based random access (CBRA) process.

This disclosure evaluates various design aspects related to beam failure detection, declaration, and recovery in a multi-TRP system, wherein beams/TRPs selection is conducted under the unified TCI framework.

As specified in Rel-17, a unified TCI framework could indicate/include $N \geq 1$ DL TCI states and/or $M \geq 1$ UL TCI states, wherein the indicated TCI state could be at least one of:

A DL TCI state and/or its corresponding/associated TCI state ID

An UL TCI state and/or its corresponding/associated TCI state ID

A joint DL and UL TCI state and/or its corresponding/associated TCI state ID

Separate DL TCI state and UL TCI state and/or their corresponding/associated TCI state ID(s)

There could be various design options/channels to indicate to the UE 116 a beam (i.e., a TCI state) for the transmission/reception of a PDCCH or a PDSCH. As described in the 3GPP Rel-17:

In one example, a MAC CE could be used to indicate to the UE 116 a beam (i.e., a TCI state and/or a TCI state ID) for the transmission/reception of a PDCCH or a PDSCH.

In another example, a DCI could be used to indicate to the UE 116 a beam (i.e., a TCI state and/or a TCI state ID) for the transmission/reception of a PDCCH or a PDSCH.

For example, a DL related DCI (e.g., DCI format 1_0, DCI format 1_1 or DCI format 1_2) could be used to indicate to the UE 116 a beam (i.e., a TCI state and/or a TCI state ID) for the transmission/reception of a PDCCH or a PDSCH, wherein the DL related DCI may or may not include a DL assignment.

For another example, an UL related DCI (e.g., DCI format 0_0, DCI format 0_1, DCI format 0_2) could be used to indicate to the UE 116 a beam (i.e., a TCI state and/or a TCI state ID) for the transmission/reception of a PDCCH or a PDSCH, wherein the UL related DCI may or may not include an UL scheduling grant.

Yet for another example, a custom/purpose designed DCI format could be used to indicate to the UE 116 a beam (i.e., a TCI state and/or a TCI state ID) for the transmission/reception of a PDCCH or a PDSCH.

Rel-17 introduced the unified TCI framework, where a unified or master or main TCI state is signaled to the UE. The unified or master or main TCI state can be one of:

In case of joint TCI state indication, wherein a same beam is used for DL and UL channels, a joint TCI state that can be used at least for UE-dedicated DL channels and UE-dedicated UL channels.

In case of separate TCI state indication, wherein different beams are used for DL and UL channels, a DL TCI state can be used at least for UE-dedicated DL channels.

In case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

In a (single-DCI based) multi-TRP system, a UE could be indicated/provided/configured by the network 130, e.g., via a beam indication MAC CE or a DCI (e.g., via one or more TCI codepoints of one or more TCI fields in the corresponding DCI 1_1/1_2 with or without DL assignment), a set of one or more (e.g., N>1) TCI states/pairs of TCI states, wherein a TCI state could be a joint DL and UL TCI state or a separate DL TCI state provided by TCI-State/DLorJointTCI-State, or a separate UL TCI state provided by TCI-State/UL-TCI-State, under the unified TCI framework.

For PDCCH reception or PDCCH candidate monitoring in a (single-DCI based) multi-TRP system, a UE could be configured/provided/indicated by the network 130 via higher layer RRC signaling/parameter and/or MAC CE command and/or dynamic DCI based L1 signaling—e.g., in higher layer RRC signaling/parameter ControlResourceSet that configures a CORESET—a first indicator to indicate which one or more of the set of TCI states/pairs of TCI states indicated, e.g., by a TCI codepoint, in a beam indication DCI or MAC CE as specified herein in the present disclosure, to use/apply for receiving/monitoring the PDCCH(s)/PDCCH candidate(s) in the corresponding CORESET. For instance, for N=2 (i.e., a set of two TCI states/pairs of TCI states are indicated), the first indicator could be a two-bit indicator with '00' indicating that the first TCI state among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '01' indicates that the second TCI state among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving/monitoring the PDCCH(s)/PDCCH candidate(s)—e.g., first and second PDCCH candidates—in the corresponding CORESET(s). '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for receiving/monitoring the PDCCH(s)/PDCCH candidate(s)—e.g., first and second PDCCH candidates—in the corresponding CORESET(s), wherein the first and second PDCCH candidates could be received in search space sets that are higher layer linked via SearchSpaceLinking and/or the first and second PDCCH candidates carry the same/identical DCI payload.

For PDSCH reception in a (single-DCI based) multi-TRP system, a UE could be configured/provided/indicated by the network 130 via higher layer RRC signaling/parameter and/or MAC CE command and/or dynamic DCI based L1 signaling—e.g., in a DL DCI (e.g., DCI format 1_0/1_1/1_2) that schedules the PDSCH—a second indicator to indicate which one or more of the set of TCI states/pairs of TCI states indicated, e.g., by a TCI codepoint, in a beam indication DCI or MAC CE as specified herein in the present disclosure, to use/apply for receiving the PDSCH(s). For instance, for N=2 (i.e., a set of two TCI states/pairs of TCI states are indicated), the second indicator could be a two-bit indicator with '00' indicating that the first TCI state among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '01' indicates that the second TCI state among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH, wherein the first and second PDSCHs could correspond to two PDSCH transmission occasions or repetition in space, time and/or frequency.

For PUCCH transmission in a (single-DCI based) multi-TRP system, a UE could be configured/provided/indicated by the network 130 via higher layer RRC signaling/parameter and/or MAC CE command and/or dynamic DCI based L1 signaling—e.g., in higher layer RRC signaling/parameter PUCCH-Config that configures PUCCH(s)/PUCCH resource(s)—a third indicator to indicate which one or more of the set of TCI states/pairs of TCI states indicated, e.g., by a TCI codepoint, in a beam indication DCI or MAC CE as specified herein in the present disclosure, to use/apply for transmitting the PUCCH(s)/PUCCH resource(s). For instance, for N=2 (i.e., a set of two TCI states/pairs of TCI states are indicated), the third indicator could be a two-bit indicator with '00' indicating that the first TCI state among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '01' indicates that the second TCI state among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the PUCCH(s)/PUCCH resource(s)—e.g., first PUCCH/PUCCH resource and second PUCCH/PUCCH resource. '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for transmitting the PUCCH(s)/PUCCH resource(s)—e.g., first PUCCH/PUCCH resource and second PUCCH/PUCCH resource, wherein the first and second PUCCHs/PUCCH resources could correspond to two PUCCH transmission occasions or repetitions in space, time and/or frequency.

For PUSCH transmission in a (single-DCI based) multi-TRP system, a UE could be configured/provided/indicated by the network 130 via higher layer RRC signaling/parameter and/or MAC CE command and/or dynamic DCI based L1 signaling—e.g., in an UL DCI (e.g., DCI format 0_0/0_1/0_2) that schedules the PUSCH—a fourth indicator to indicate which one or more of the set of TCI states/pairs of TCI states indicated, e.g., by a TCI codepoint, in a beam indication DCI or MAC CE as specified herein in the present disclosure, to use/apply for transmitting the PUSCH(s). For instance, for N=2 (i.e., a set of two TCI states/pairs of TCI states are indicated), the fourth indicator could be a two-bit indicator with '00' indicating that the first TCI state among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '01' indicates that the second TCI state among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH, wherein the first and second PUSCHs could correspond to two PUSCH transmission occasions or repetition in space, time and/or frequency.

Figure 10:
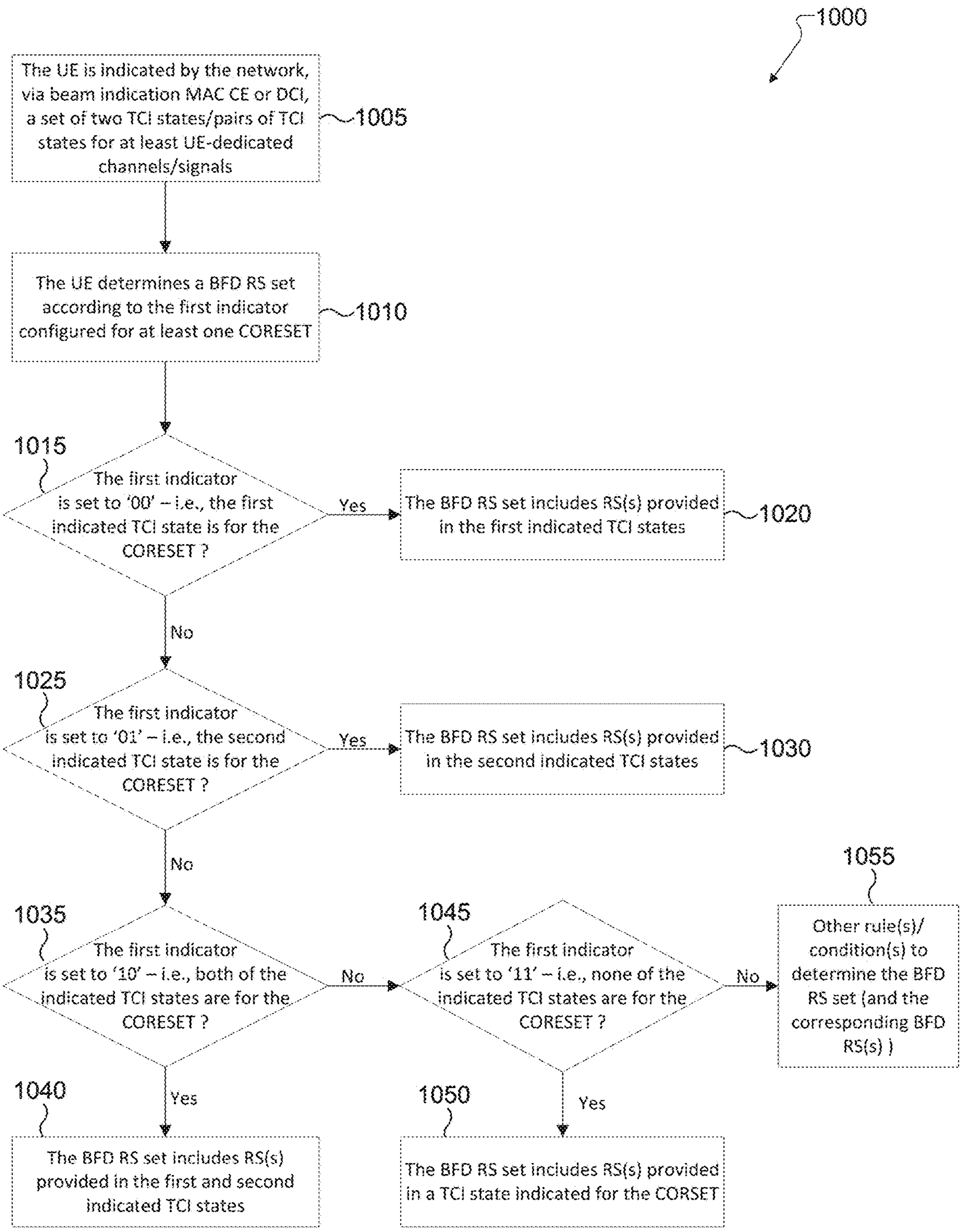
FIG. 10 illustrates a flowchart of an example UE procedure for determining beam failure detection (BFD) reference signal (RS) set(s) according to embodiments of the present disclosure.

FIG. 10 illustrates a flowchart of an example UE procedure 1000 for determining BFD RS set(s) according to embodiments of the present disclosure. For example, procedure 1000 can be performed by the UE 116 of FIG. 3. This example is for illustration only and other embodiments can be used without departing from the scope of the present disclosure.

The procedure begins in 1005, the UE 116 is indicated by the network 130, via beam indication MAC CE or DCI, a set of two TCI states/pairs of TCI states for at least UE-dedicated channels/signals. In 1010, the UE 116 determines a BFD RS set according to the first indicator configured for at least one CORSET. In 1015, the first indicator may be set to '00'—i.e., the first indicated TCI state is for the CORSET. If the value is '00', in 1020, the BFD RS set includes RS(s) provided in the first indicated TCI state. If the value is not '00', in 1025, the first indicator may be set to '01'—i.e., the second indicated TCI state is for the CORSET. If the value is '01', in 1030, the BFD includes RS(s) provided in the second indicated TCI state. If the value is not '01', in 1035, the first indicator may be set to '10'—i.e., both of the indicated TCI states are for the CORSET. If the value is '10', in 1040, the BFD RS set includes RS(s) provided in the first and second indicated TCI states. If the value is not '10', in 1045, the indicator may be set to '11'—i.e., none of the indicated TCI states are for the CORSET. If the value is '11', in 1050, the BFD RS set includes RS(s) provided in a TCI state indicated for the CORSET. If the value is not set to '11', in 1055, other rule(s)/condition(s) to determine the BFD RS set (and the corresponding BFD RS(s)) are used.

In one embodiment, for implicit BFD RS determination:

In one example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure.

In another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure.

In yet another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in both of the first and second TCI states among the set of one or more (e.g., N=2) TCI states/pairs of TCI states indicated, e.g., by a TCI codepoint, in a beam indication DCI or MAC CE as specified herein in the present disclosure.

In yet another example, the UE 116 could determine two BFD RS sets. For instance, the UE 116 could determine a first BFD RS set—e.g., denoted by q0_0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure, and a second BFD RS set—e.g., denoted by q0_1—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure.

When a UE receives the first indicator for one or more CORESETs as specified herein in the present disclosure, the UE 116 would determine one or more BFD RS sets (and therefore, BFD RSs determined therein) according to one or more of the following.

In one example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '00' as specified herein in the present disclosure, wherein the first TCI state is for the one or more CORESETs.

In another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '01' as specified herein in the present disclosure, wherein the second TCI state is for the one or more CORESETs.

In yet another example, the UE 116 could determine two BFD RS sets. For instance, the UE 116 could determine a first BFD RS set—e.g., denoted by q0_0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more first CORESETs configured/associated with the first indicator set to '00' as specified herein in the present disclosure, wherein the first TCI state is for the one or more first CORESETs, and a second BFD RS set—e.g., denoted by q0_1—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more second CORESETs configured/associated with the first indicator set to '01' as specified herein in the present disclosure, wherein the second TCI state is for the one or more second CORESETs.

In yet another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first and second TCI states among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

In yet another example, the UE 116 could determine two BFD RS sets. For instance, the UE 116 could determine a first BFD RS set—e.g., denoted by q0_0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, and a second BFD RS set—e.g., denoted by q0_1—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

In yet another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in a TCI state indicated for receiving/monitoring PDCCH/PDCCH candidate(s) in one or more CORESETs configured/associated with the first indicator set to '11' as specified herein in the present disclosure, wherein (i) the TCI state could be provided by TCI-State and for the one or more CORESETs and/or (ii) the TCI state is not in the set of indicated TCI states/pairs of TCI states as specified herein in the present disclosure.

With reference to FIG. 10, when/if the first indicator is not present or configured as an invalid value, the UE 116 could follow other rules/conditions to determine the BFD RS set(s)—and therefore, the corresponding BFD RS(s).

According to one or more examples described herein, the UE 116 could determine a BFD RS set—e.g., denoted by q0 or q0_0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure, when/if one or more of the following conditions are satisfied/achieved.

In one example, the first TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '00' or '10' or '11'.

In another example, the first TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PDSCH reception, wherein as specified herein in the present disclosure, the second indicator indicated in a DL DCI that schedules the PDSCH could be set to '00' or '10' or '11'.

In yet another example, the first TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUCCH transmission, wherein as specified herein in the present disclosure, the third indicator configured for or associated to the PUCCH transmission could be set to '00' or '10' or '11'.

In yet another example, the first TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUSCH transmission, wherein as specified herein in the present disclosure, the fourth indicator indicated in an UL DCI that schedules the PUSCH could be set to '00' or '10' or '11'.

According to one or more examples described herein, the UE 116 could determine a BFD RS set—e.g., denoted by q1 or q0_1—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure, when/if one or more of the following conditions are satisfied/achieved.

In one example, the second TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '01' or '10' or '11'.

In another example, the second TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PDSCH reception, wherein as specified herein in the present disclosure, the second indicator indicated in a DL DCI that schedules the PDSCH could be set to '01' or '10' or '11'.

In yet another example, the second TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUCCH transmission, wherein as specified herein in the present disclosure, the third indicator configured for or associated to the PUCCH transmission could be set to '01' or '10' or '11'.

In yet another example, the second TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUSCH transmission, wherein as specified herein in the present disclosure, the fourth indicator indicated in an UL DCI that schedules the PUSCH could be set to '01' or '10' or '11'.

According to one or more examples described herein, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first and second TCI states among the set of one or more (e.g., N=2) TCI states/pairs of TCI states indicated, e.g., by a TCI codepoint, in a beam indication DCI or MAC CE as specified herein in the present disclosure, when/if one or more of the following conditions are satisfied/achieved.

In one example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated for at least one CORESET or used/applied for PDCCH reception, wherein as specified herein in the present disclosure, the first indicator configured for or associated to PDCCH(s)/PDCCH candidate(s)—e.g., the first and second PDCCH candidates-received in the CORESET(s) could be set to '10' or '11'.

In another example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated or used/applied for PDSCH reception, wherein as specified herein in the present disclosure, the second indicator indicated in a DL DCI that schedules the PDSCH(s)—e.g., the first and second PDSCHs-could be set to '10' or '11'.

In yet another example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated or used/applied for PUCCH transmission, wherein as specified herein in the present disclosure, the third indicator configured for or associated to the PUCCH transmission—e.g., the first and second PUCCHs/PUCCH resources-could be set to '10' or '11'.

In yet another example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated or used/applied for PUSCH transmission, wherein as specified herein in the present disclosure, the fourth indicator indicated in an UL DCI that schedules the PUSCH(s)—e.g., the first and second PUSCHs—could be set to '10' or '11'.

Figure 11:
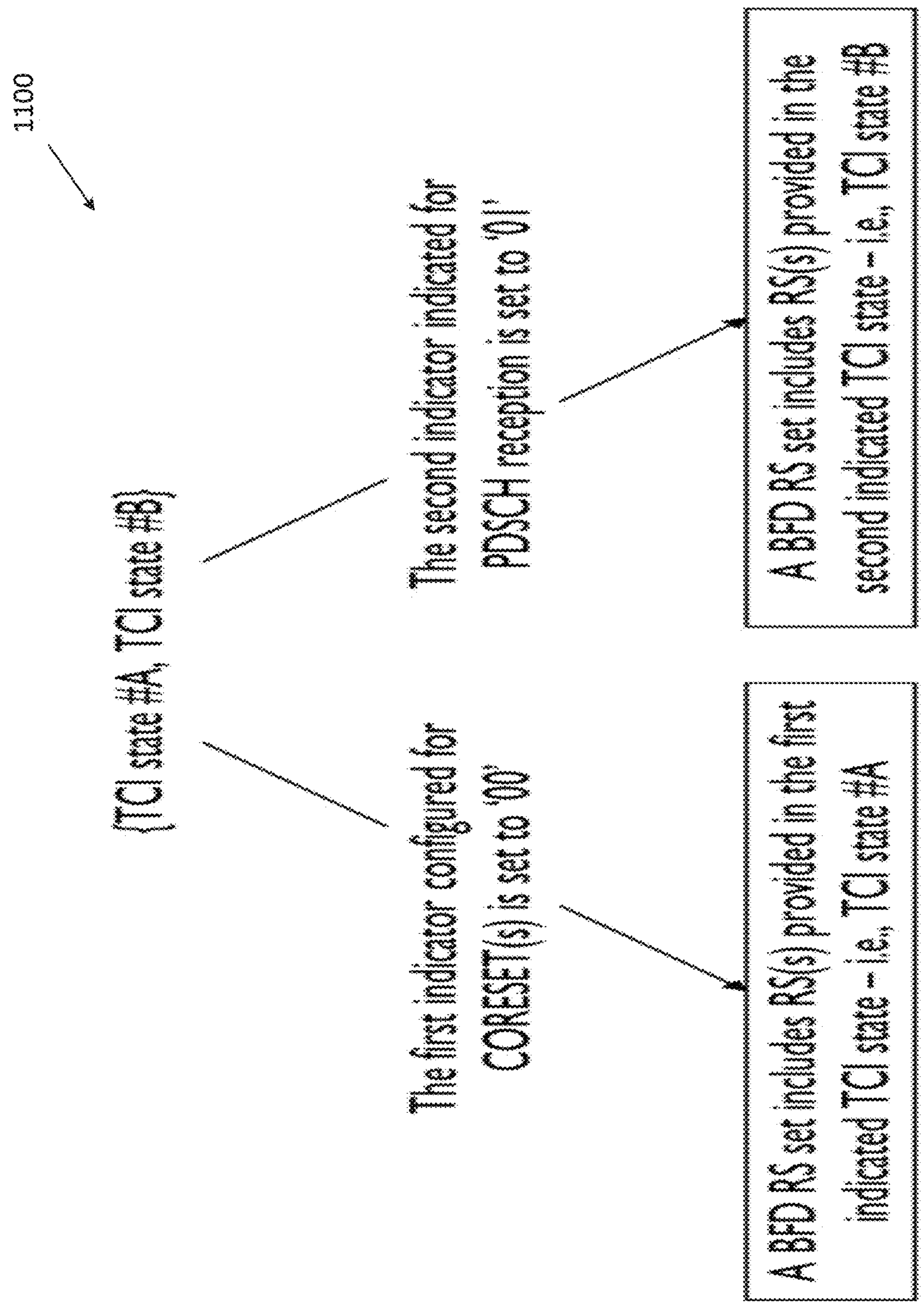
FIG. 11 illustrates a flow diagram for determining BFD RS set(s) according to embodiments of the present disclosure.

FIG. 11 illustrates a flow diagram 1100 for determining BFD RS set(s) according to embodiments of the present disclosure. For example, flow diagram 1100 can be followed by any of the UEs 111-116 of FIG. 1. This example is for illustration only and other embodiments can be used without departing from the scope of the present disclosure.

A UE could follow certain priority rule(s) to determine which one or more of the first, second, third, and/or fourth indicators to follow to determine the BFD RS set(s). The priority rule(s) could be fixed in the system specification(s). Alternatively, the UE 116 could be indicated/configured/provided by the network 130, e.g., via higher layer RRC signaling/parameter and/or MAC CE command and/or dynamic DCI based L1 signaling, the priority rule(s).

In one example, the UE 116 could only use/apply the QCL source RS(s) that is provided/indicated in the (active) TCI state(s) indicated for the CORESET(s) to determine the BFD RS set(s). In the present disclosure, the UE 116 could first follow the first indicator configured for one or more CORESETs as specified herein in the present disclosure, and therefore, the QCL source RS(s) provided in the TCI state(s)—among the set of one or more (e.g., N=2) TCI states/pairs of TCI states indicated, e.g., by a TCI codepoint, in a beam indication DCI or MAC CE as specified herein in the present disclosure-identified by the first indicator as those indicated for the one or more CORESETs, to determine the BFD RS set(s) as specified herein in the present disclosure. When/if the first indicator is not present/configured for the CORESET(s) and/or the first indicator indicates that none of the set of TCI states/pairs of TCI states are indicated for PDCCH reception in the CORESET(s), the UE 116 could follow the QCL source RS(s) provided in one or more TCI states (e.g., each provided by TCI-State) indicated for the respective CORESET(s) to determine the BFD RS set(s) as specified herein in the present disclosure. Note that the one or more TCI states here may not belong to the set of unified TCI states/pairs of TCI states.

In another example, the UE 116 could first follow the first indicator—i.e., with the highest priority—configured for one or more CORESETs as specified herein in the present disclosure, and therefore, the QCL source RS(s) provided in the TCI state(s)—among the set of one or more (e.g., N=2) TCI states/pairs of TCI states indicated, e.g., by a TCI codepoint, in a beam indication DCI or MAC CE as specified herein in the present disclosure—identified by the first indicator as those indicated for the one or more CORESETs, to determine the BFD RS set(s) as specified herein in the present disclosure. The UE 116 could then follow the second indicator, the third indicator, and/or the fourth indicator-their priorities could be ordered from high to low, low to high, or configured by the network 130 via higher layer RRC signaling/parameter and MAC CE command and/or dynamic DCI based L1 signaling—to determine the BFD RS set(s) as specified herein in the present disclosure according to one or more of the following.

For example, when/if the first indicator indicates that both of the TCI states-among the set of one or more (e.g., N=2) TCI states/pairs of TCI states indicated, e.g., by a TCI codepoint, in a beam indication DCI or MAC CE as specified herein in the present disclosure—are indicated for the CORESET(s), the UE 116 may not need to follow the second indicator, the third indicator, and/or the fourth indicator to determine the BFD RS set(s) as specified herein in the present disclosure anymore.

For another example, when/if the first indicator is not present/configured for the CORESET(s) and/or the first indicator indicates that none of the set of TCI states/pairs of TCI states are indicated for PDCCH reception in the CORESET(s), the UE 116 could first follow the QCL source RS(s) provided in one or more TCI states (e.g., each provided by TCI-State) indicated for the respective CORESET(s) to determine the BFD RS set(s) as specified herein in the present disclosure. Note that the one or more TCI states here may not belong to the set of unified TCI states/pairs of TCI states. For this case:

In one example, the UE 116 could then follow the second indicator, the third indicator, and/or the fourth indicator-their priorities could be ordered from high to low, low to high, or configured by the network 130 via higher layer RRC signaling/parameter and MAC CE command and/or dynamic DCI based L1 signaling—to determine the BFD RS set(s) according to the design examples specified herein in the present disclosure.

In another example, the UE 116 may not need to follow the second indicator, the third indicator, and/or the fourth indicator to determine the BFD RS set(s) as specified herein in the present disclosure anymore.

Yet for another example, when/if the first indicator is not present/configured for the CORESET(s) and/or the first indicator indicates that none of the set of TCI states/pairs of TCI states are indicated for PDCCH reception in the CORESET(s), the UE 116 could then follow the second indicator, the third indicator, and/or the fourth indicator-their priorities could be ordered from high to low, low to high, or configured by the network 130 via higher layer RRC signaling/parameter and MAC CE command and/or dynamic DCI based L1 signaling—to determine the BFD RS set(s) according to the design examples specified herein in the present disclosure.

Yet for another example, when/if the first indicator indicates that one of the TCI states, e.g., the first (or second) TCI state-among the set of one or more (e.g., N=2) TCI states/pairs of TCI states indicated, e.g., by a TCI codepoint, in a beam indication DCI or MAC CE as specified herein in the present disclosure—is indicated for the CORESET(s), the UE 116 could then follow the second indicator, the third indicator, and/or the fourth indicator (if applicable)—their priorities could be ordered from high to low, low to high, or configured by the network 130 via higher layer RRC signaling/parameter and MAC CE command and/or dynamic DCI based L1 signaling—to identify that the other TCI state(s), e.g., the second (or first) TCI state-among the set of one or more (e.g., N=2) TCI states/pairs of TCI states indicated, e.g., by a TCI codepoint, in a beam indication DCI or MAC CE as specified herein in the present disclosure—is used/applied for the respective channel(s)/signal(s), and use/apply the QCL source RS(s) provided in the other TCI state(s)—among the set of one or more (e.g., N=2) TCI states/pairs of TCI states indicated, e.g., by a TCI codepoint, in a beam indication DCI or MAC CE as specified herein in the present disclosure-identified by the second, third, and/or fourth indicators as that for the respective channel(s)/signal(s), to determine the BFD RS set(s) as specified herein in the present disclosure.

In yet another example, the first, second, third, and fourth indicators could have the same or equal priority. That is, the UE 116 could follow one or more or all of the first, second, third and fourth indicators-if applicable—and therefore, the QCL source RS(s) provided in the TCI state(s)—among the set of one or more (e.g., N=2) TCI states/pairs of TCI states indicated, e.g., by a TCI codepoint, in a beam indication DCI or MAC CE as specified herein in the present disclosure-identified by the indicator(s) as those indicated for the one or more channels/signals, to determine the BFD RS set(s) as specified herein in the present disclosure.

Figure 12:
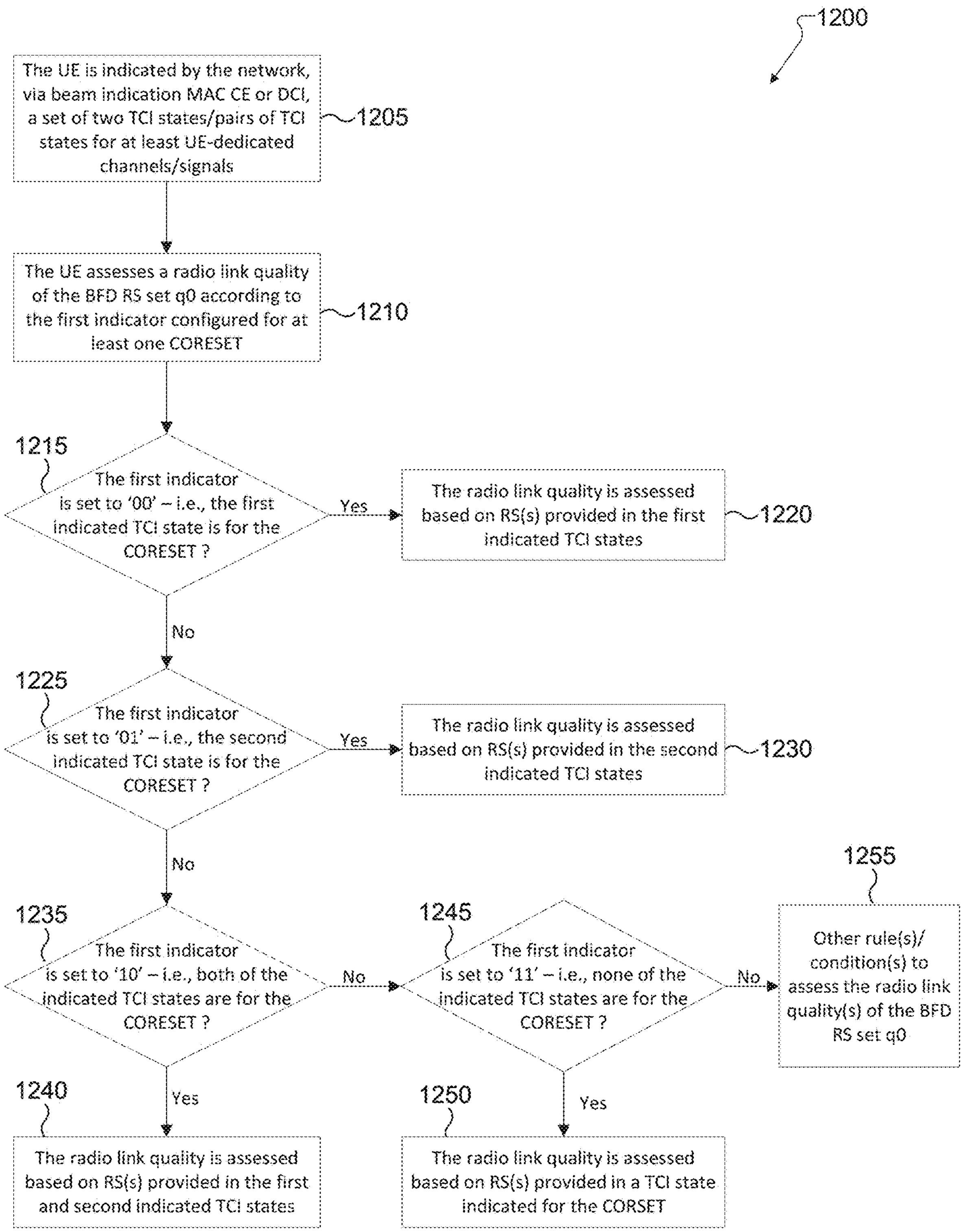
FIG. 12 illustrates a flowchart of an example UE procedure for determining radio link quality of BFD RS set(s) according to embodiments of the present disclosure.

FIG. 12 illustrates a flowchart of an example UE procedure 1200 for determining radio link quality of BFD RS set(s) according to embodiments of the present disclosure. For example, procedure 1200 can be performed by any of the UEs 111-116 of FIG. 1, such as the UE 116. This example is for illustration only and other embodiments can be used without departing from the scope of the present disclosure.

The procedure begins in 1205, the UE 116 is indicated by the network 130, via beam indication MAC CE or DCI, a set of two TCI states/pairs of TCI states for at least UE dedicated channels/signals. In 1210, the UE 116 assesses a radio link quality of the BFD RS set q0 according to the first indicator configured for at least one CORSET. In 1215, the first indicator may be set to '00'—i.e., the first indicated TCI state is for the CORSET. If the value is set to '00', in 1220, the radio link quality is assessed based on RS(s) provided in the first indicated TCI state. If the value is not set to '00', in 1225, the value of the first indicator may be set to '01'—i.e., the second indicated TCI state is for the CORSET. If the value is set to '01', in 1230, the radio link quality is assessed based on the provided RS(s) provided in the second indicated TCI state. If the value is not set to '01', in 1235, the value of first indicator may be set to '10'—i.e., both of the indicated TCI states are for the CORSET. If the value is set to '10', in 1240, the radio link is assessed based on the RS(s) provided in the first and second indicated TCI states. If the value is not set to '10', in 1245, the value of the first indicator may be set to '11'—i.e., none of the indicated TCI states are for the CORSET. If the value is set to '11', in 1250, the radio link quality assessed based on the RS(s) provided in a TCI state indicated for the CORSET. If the value is not set to '11', in 1255, other rule(s)/condition(s) to assess the radio link quality(s) of the BFD RS set q0 are used.

For explicit BFD RS configuration, activation or indication, a UE could be configured/provided/indicated by the network 130, e.g., via higher layer RRC signaling/parameter and/or MAC CE command and/or dynamic DCI based L1 signaling, one or more BFD RS sets for radio link quality monitoring each comprising one or more BFD RSs, wherein a BFD RS could correspond to a periodic CSI-RS resource or a SSB. For instance, the UE 116 could be first configured by the network 130, e.g., via higher layer RRC signaling/parameter, one or more sets of BFD RSs or BFD RS IDs. The UE 116 could then receive from the network 130, one or more BFD RS MAC CE activation/subselection commands (or BFD RS indication MAC CEs) that activate/subselect one or more BFD RSs or BFD RS IDs from the one or more sets, to update one or more BFD RSs in one or more BFD RS sets.

In one embodiment, a UE could use/apply a single BFD RS set—e.g., denoted by q0—to monitor radio link quality for (single-DCI based) multi-TRP operation. As specified herein in the present disclosure, the UE 116 could be first configured by the network 130, e.g., via higher layer RRC signaling/parameter, a set of BFD RSs or BFD RS IDs. The UE 116 could then receive from the network 130, e.g., a BFD RS MAC CE activation/subselection command (or a BFD RS indication MAC CE) that activates/subselects one or more BFD RSs or BFD RS IDs from the set, to update one or more BFD RSs in the BFD RS set (e.g., q0). For N=2, the BFD RS indication MAC CE could comprise/indicate two sets of BFD RSs or BFD RS IDs. The UE 116 could determine which one or more of the two sets to use to update the BFD RS set q0 according to one or more of the following.

In one example, the UE 116 could use/apply the BFD RS(s) or BFD RS ID(s) provided in the first set in the BFD RS indication MAC CE to update one or more BFD RSs in the BFD RS set q0.

In another example, the UE 116 could use/apply the BFD RS(s) or BFD RS ID(s) provided in the second set in the BFD RS indication MAC CE to update one or more BFD RSs in the BFD RS set q0.

In yet another example, the UE 116 could use/apply the BFD RS(s) or BFD RS ID(s) provided in both of the first and second sets in the BFD RS indication MAC CE to update one or more BFD RSs in the BFD RS set q0.

In yet another example, the UE 116 could be configured/provided/indicated by the network 130, e.g., via higher layer RRC signaling/parameter and/or MAC CE command and/or dynamic DCI based L1 signaling, which one or more of the two sets (and therefore, the BFD RS(s) or BFD RS ID(s) provided therein) to use/apply to update the BFD RS set q0.

For example, the UE 116 could be configured/provided/indicated by the network 130, e.g., via higher layer RRC signaling/parameter and/or MAC CE command (e.g., in the BFD RS indication MAC CE) and/or dynamic DCI based L1 signaling, a one-bit or two-bit indicator with '0'/'00' ('1', '01', '10' or '11') indicating that the BFD RS(s) or BFD RS ID(s) provided in the first set in the BFD RS indication MAC CE could be used/applied to update one or more BFD RSs in the BFD RS set q0, '1'/'01' ('0', '00', '10' or '11') indicating that the BFD RS(s) or BFD RS ID(s) provided in the second set in the BFD RS indication MAC CE could be used/applied to update one or more BFD RSs in the BFD RS set q0, and '0'/'1'/'10'/'11' ('00' or '01') indicating that the BFD RS(s) or BFD RS ID(s) provided in both of the first and second sets in the BFD RS indication MAC CE could be used/applied to update one or more BFD RSs in the BFD RS set q0.

For another example, the UE 116 could be configured/provided/indicated by the network 130, e.g., via higher layer RRC signaling/parameter and/or MAC CE command (e.g., in the BFD RS indication MAC CE) and/or dynamic DCI based L1 signaling, a bitmap (e.g., of length 2). When/if the first entry/bit position of the bitmap is set to '1' while the second entry/bit position of the bitmap is set to '0', the BFD RS(s) or BFD RS ID(s) provided in the first set in the BFD RS indication MAC CE could be used/applied to update one or more BFD RSs in the BFD RS set q0; when/if the first entry/bit position of the bitmap is set to '0' while the second entry/bit position of the bitmap is set to '1', the BFD RS(s) or BFD RS ID(s) provided in the second set in the BFD RS indication MAC CE could be used/applied to update one or more BFD RSs in the BFD RS set q0; when/if both of the first and second entries/bit positions of the bitmap are set to '1's, the BFD RS(s) or BFD RS ID(s) provided in both of the first and second sets in the BFD RS indication MAC CE could be used/applied to update one or more BFD RSs in the BFD RS set q0.

In yet another example, the UE 116 could follow one or more of the first, second, third, and/or fourth indicators specified herein in the present disclosure to determine which one or more of the two sets (and therefore, the BFD RS(s) or BFD RS ID(s) provided therein) indicated in the BFD RS indication MAC CE to use/apply to update the BFD RS set q0, according to one or more of the following.

For example, when/if the first indicator configured for the CORESET(s) is set to '00' as specified herein in the present disclosure, the BFD RS(s) or BFD RS ID(s) provided in the first set in the BFD RS indication MAC CE could be used/applied to update one or more BFD RSs in the BFD RS set q0; when/if the first indicator configured for the CORESET(s) is set to '01' as specified herein in the present disclosure, the BFD RS(s) or BFD RS ID(s) provided in the second set in the BFD RS indication MAC CE could be used/applied to update one or more BFD RSs in the BFD RS set q0; when/if the first indicator configured for the CORESET(s) is set to '10' or '11' as specified herein in the present disclosure, the BFD RS(s) or BFD RS ID(s) provided in both of the first and second sets in the BFD RS indication MAC CE could be used/applied to update one or more BFD RSs in the BFD RS set q0.

For another example, when/if the second indicator indicated for the PDSCH reception is set to '00' as specified herein in the present disclosure, the BFD RS(s) or BFD RS ID(s) provided in the first set in the BFD RS indication MAC CE could be used/applied to update one or more BFD RSs in the BFD RS set q0; when/if the second indicator indicated for the PDSCH reception is set to '01' as specified herein in the present disclosure, the BFD RS(s) or BFD RS ID(s) provided in the second set in the BFD RS indication MAC CE could be used/applied to update one or more BFD RSs in the BFD RS set q0; when/if the second indicator indicated for the PDSCH reception is set to '10' or '11' as specified herein in the present disclosure, the BFD RS(s) or BFD RS ID(s) provided in both of the first and second sets in the BFD RS indication MAC CE could be used/applied to update one or more BFD RSs in the BFD RS set q0.

Yet for another example, when/if the third indicator configured for the PUCCH transmission is set to '00' as specified herein in the present disclosure, the BFD RS(s) or BFD RS ID(s) provided in the first set in the BFD RS indication MAC CE could be used/applied to update one or more BFD RSs in the BFD RS set q0; when/if the third indicator configured for the PUCCH transmission is set to '01' as specified herein in the present disclosure, the BFD RS(s) or BFD RS ID(s) provided in the second set in the BFD RS indication MAC CE could be used/applied to update one or more BFD RSs in the BFD RS set q0; when/if the third indicator configured for the PUCCH transmission is set to '10' or '11' as specified herein in the present disclosure, the BFD RS(s) or BFD RS ID(s) provided in both of the first and second sets in the BFD RS indication MAC CE could be used/applied to update one or more BFD RSs in the BFD RS set q0.

Yet for another example, when/if the fourth indicator indicated for the PUSCH transmission is set to '00' as specified herein in the present disclosure, the BFD RS(s) or BFD RS ID(s) provided in the first set in the BFD RS indication MAC CE could be used/applied to update one or more BFD RSs in the BFD RS set q0; when/if the fourth indicator indicated for the PUSCH transmission is set to '01' as specified herein in the present disclosure, the BFD RS(s) or BFD RS ID(s) provided in the second set in the BFD RS indication MAC CE could be used/applied to update one or more BFD RSs in the BFD RS set q0; when/if the fourth indicator indicated for the PUSCH transmission is set to '10' or '11' as specified herein in the present disclosure, the BFD RS(s) or BFD RS ID(s) provided in both of the first and second sets in the BFD RS indication MAC CE could be used/applied to update one or more BFD RSs in the BFD RS set q0.

For monitoring the radio link quality over the BFD RS set q0:

In one example, the UE 116 could assess the radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure.

In another example, the UE 116 could assess the radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure.

In yet another example, the UE 116 could assess the radio link quality of the BFD RS set q0 according to SSBs on the PCell or the PSCell or periodic CSI-RS resource configurations that are in both of the first and second TCI states among the set of one or more (e.g., N=2) TCI states/pairs of TCI states indicated, e.g., by a TCI codepoint, in a beam indication DCI or MAC CE as specified herein in the present disclosure.

In yet another example, the UE 116 could assess a first radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, and a second radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure.

When a UE receives the first indicator for one or more CORESETs as specified herein in the present disclosure, the UE 116 would determine or assess one or more radio link qualities of the BFD RS set q0 according to one or more of the following.

In one example, the UE 116 could assess the radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '00' as specified herein in the present disclosure, wherein the first TCI state is for the one or more CORESETs.

In another example, the UE 116 could assess the radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '01' as specified herein in the present disclosure, wherein the second TCI state is for the one or more CORESETs.

In yet another example, the UE 116 could determine or access two radio link qualities of the BFD RS set q0. For instance, the UE 116 could assess a first radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more first CORESETs configured/associated with the first indicator set to '00' as specified herein in the present disclosure, wherein the first TCI state is for the one or more first CORESETs, and a second radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more second CORESETs configured/associated with the first indicator set to '01' as specified herein in the present disclosure, wherein the second TCI state is for the one or more second CORESETs.

In yet another example, the UE 116 could assess the radio link quality of the BFD RS set q0 according to SSBs on the PCell or the PSCell or periodic CSI-RS resource configurations that are in the first and second TCI states among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

In yet another example, the UE 116 could determine or access two radio link qualities of the BFD RS set q0. For instance, the UE 116 could assess a first radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, and a second radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

In yet another example, the UE 116 could assess the radio link quality of the BFD RS set q0 according to SSBs on the PCell or the PSCell or periodic CSI-RS resource configurations that are in a TCI state indicated for receiving/monitoring PDCCH/PDCCH candidate(s) in one or more CORESETs configured/associated with the first indicator set to '11' as specified herein in the present disclosure, wherein (i) the TCI state could be provided by TCI-State and for the one or more CORESETs, and/or (ii) the TCI state is not in the set of indicated TCI states/pairs of TCI states as specified herein in the present disclosure.

With reference to FIG. 12, when/if the first indicator is not present or configured as an invalid value, the UE 116 could follow other rules/conditions to assess the radio link quality(s) of the BFD RS set.

According to one or more examples described herein, the UE 116 could assess the radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, when/if one or more of the following conditions are satisfied/achieved.

In one example, the first TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '00' or '10' or '11'.

In another example, the first TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PDSCH reception, wherein as specified herein in the present disclosure, the second indicator indicated in a DL DCI that schedules the PDSCH could be set to '00' or '10' or '11'.

In yet another example, the first TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUCCH transmission, wherein as specified herein in the present disclosure, the third indicator configured for or associated to the PUCCH transmission could be set to '00' or '10' or '11'.

In yet another example, the first TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUSCH transmission, wherein as specified herein in the present disclosure, the fourth indicator indicated in an UL DCI that schedules the PUSCH could be set to '00' or '10' or '11'.

According to one or more examples described herein, the UE 116 could assess the radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, when/if one or more of the following conditions are satisfied/achieved.

In one example, the second TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '01' or '10' or '11'.

In another example, the second TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PDSCH reception, wherein as specified herein in the present disclosure, the second indicator indicated in a DL DCI that schedules the PDSCH could be set to '01' or '10' or '11'.

In yet another example, the second TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUCCH transmission, wherein as specified herein in the present disclosure, the third indicator configured for or associated to the PUCCH transmission could be set to '01' or '10' or '11'.

In yet another example, the second TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUSCH transmission, wherein as specified herein in the present disclosure, the fourth indicator indicated in an UL DCI that schedules the PUSCH could be set to '01' or '10' or '11'.

According to one or more examples described herein, the UE 116 could assess the radio link quality of the BFD RS set q0 according to SSBs on the PCell or the PSCell or periodic CSI-RS resource configurations that are in the first and second TCI states among the set of one or more (e.g., N=2) TCI states/pairs of TCI states indicated, e.g., by a TCI codepoint, in a beam indication DCI or MAC CE as specified herein in the present disclosure, when/if one or more of the following conditions are satisfied/achieved.

In one example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated for at least one CORESET or used/applied for PDCCH reception, wherein as specified herein in the present disclosure, the first indicator configured for or associated to PDCCH(s)/PDCCH candidate(s)—e.g., the first and second PDCCH candidates-received in the CORESET(s) could be set to '10' or '11'.

In another example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated or used/applied for PDSCH reception, wherein as specified herein in the present disclosure, the second indicator indicated in a DL DCI that schedules the PDSCH(s)—e.g., the first and second PDSCHs-could be set to '10' or '11'.

In yet another example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated or used/applied for PUCCH transmission, wherein as specified herein in the present disclosure, the third indicator configured for or associated to the PUCCH transmission—e.g., the first and second PUCCHs/PUCCH resources-could be set to '10' or '11'.

In yet another example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated or used/applied for PUSCH transmission, wherein as specified herein in the present disclosure, the fourth indicator indicated in an UL DCI that schedules the PUSCH(s)—e.g., the first and second PUSCHs-could be set to '10' or '11'.

A UE could follow certain priority rule(s) to determine which one or more of the first, second, third, and/or fourth indicators to follow to assess the radio link quality(s) of the BFD RS set q0 according to the design examples specified herein in the present disclosure. The priority rule(s) could be fixed in the system specification(s). Alternatively, the UE 116 could be indicated/configured/provided by the network 130, e.g., via higher layer RRC signaling/parameter and/or MAC CE command and/or dynamic DCI based L1 signaling, the priority rule(s).

In one example, the UE 116 could only use/apply the QCL source RS(s) that is provided/indicated in the (active) TCI state(s) indicated for the CORESET(s) to assess the radio link quality(s) of the BFD RS set q0. In the present disclosure, the UE 116 could first follow the first indicator configured for one or more CORESETs as specified herein in the present disclosure, and therefore, the QCL source RS(s) provided in the TCI state(s)—among the set of one or more (e.g., N=2) TCI states/pairs of TCI states indicated, e.g., by a TCI codepoint, in a beam indication DCI or MAC CE as specified herein in the present disclosure—identified by the first indicator as those indicated for the one or more CORESETs, to determine or assess the radio link quality(s) of the BFD RS set as specified herein in the present disclosure. When/if the first indicator is not present/configured for the CORESET(s) and/or the first indicator indicates that none of the set of TCI states/pairs of TCI states are indicated for PDCCH reception in the CORESET(s), the UE 116 could follow the QCL source RS(s) provided in one or more TCI states (e.g., each provided by TCI-State) indicated for the respective CORESET(s) to determine or assess the radio link quality(s) of the BFD RS set q0 as specified herein in the present disclosure. Note that the one or more TCI states here may not belong to the set of unified TCI states/pairs of TCI states.

In another example, the UE 116 could first follow the first indicator—i.e., with the highest priority—configured for one or more CORESETs as specified herein in the present disclosure, and therefore, the QCL source RS(s) provided in the TCI state(s)—among the set of one or more (e.g., N=2) TCI states/pairs of TCI states indicated, e.g., by a TCI codepoint, in a beam indication DCI or MAC CE as specified herein in the present disclosure-identified by the first indicator as those indicated for the one or more CORESETs, to determine or assess the radio link quality(s) of the BFD RS set q0 as specified herein in the present disclosure. The UE 116 could then follow the second indicator, the third indicator, and/or the fourth indicator-their priorities could be ordered from high to low, low to high, or configured by the network 130 via higher layer RRC signaling/parameter and MAC CE command and/or dynamic DCI based L1 signaling—to determine or assess the radio link quality(s) of the BFD RS set q0 as specified herein in the present disclosure according to one or more of the following.

For example, when/if the first indicator indicates that both of the TCI states-among the set of one or more (e.g., N=2) TCI states/pairs of TCI states indicated, e.g., by a TCI codepoint, in a beam indication DCI or MAC CE as specified herein in the present disclosure—are indicated for the CORESET(s), the UE 116 may not need to follow the second indicator, the third indicator, and/or the fourth indicator to determine or assess the radio link quality(s) of the BFD RS set q0 as specified herein in the present disclosure anymore.

For another example, when/if the first indicator is not present/configured for the CORESET(s) and/or the first indicator indicates that none of the set of TCI states/pairs of TCI states are indicated for PDCCH reception in the CORESET(s), the UE 116 could first follow the QCL source RS(s) provided in one or more TCI states (e.g., each provided by TCI-State) indicated for the respective CORESET(s) to determine or assess the radio link quality(s) of the BFD RS set as specified herein in the present disclosure. Note that the one or more TCI states here may not belong to the set of unified TCI states/pairs of TCI states. For this case:

In one example, the UE 116 could then follow the second indicator, the third indicator, and/or the fourth indicator-their priorities could be ordered from high to low, low to high, or configured by the network 130 via higher layer RRC signaling/parameter and MAC CE command and/or dynamic DCI based L1 signaling—to determine or assess the radio link quality(s) of the BFD RS set q0 according to the design examples specified herein in the present disclosure.

In another example, the UE 116 may not need to follow the second indicator, the third indicator, and/or the fourth indicator to determine or assess the radio link quality(s) of the BFD RS set q0 as specified herein in the present disclosure anymore.

Yet for another example, when/if the first indicator is not present/configured for the CORESET(s) and/or the first indicator indicates that none of the set of TCI states/pairs of TCI states are indicated for PDCCH reception in the CORESET(s), the UE 116 could then follow the second indicator, the third indicator, and/or the fourth indicator-their priorities could be ordered from high to low, low to high, or configured by the network 130 via higher layer RRC signaling/parameter and MAC CE command and/or dynamic DCI based L1 signaling—to determine or assess the radio link quality(s) of the BFD RS set q0 according to the design examples specified herein in the present disclosure.

Yet for another example, when/if the first indicator indicates that one of the TCI states, e.g., the first (or second) TCI state-among the set of one or more (e.g., N=2) TCI states/pairs of TCI states indicated, e.g., by a TCI codepoint, in a beam indication DCI or MAC CE as specified herein in the present disclosure—is indicated for the CORESET(s), the UE 116 could then follow the second indicator, the third indicator, and/or the fourth indicator (if applicable)—their priorities could be ordered from high to low, low to high, or configured by the network 130 via higher layer RRC signaling/parameter and MAC CE command and/or dynamic DCI based L1 signaling—to identify that the other TCI state(s), e.g., the second (or first) TCI state-among the set of one or more (e.g., N=2) TCI states/pairs of TCI states indicated, e.g., by a TCI codepoint, in a beam indication DCI or MAC CE as specified herein in the present disclosure—is used/applied for the respective channel(s)/signal(s), and use/apply the QCL source RS(s) provided in the other TCI state(s)—among the set of one or more (e.g., N=2) TCI states/pairs of TCI states indicated, e.g., by a TCI codepoint, in a beam indication DCI or MAC CE as specified herein in the present disclosure-identified by the second, third, and/or fourth indicators as that for the respective channel(s)/signal(s), to determine or assess the radio link quality(s) of the BFD RS set q0 as specified herein in the present disclosure.

In yet another example, the first, second, third, and fourth indicators could have the same or equal priority. That is, the UE 116 could follow one or more or all of the first, second, third, and fourth indicators-if applicable—and therefore, the QCL source RS(s) provided in the TCI state(s)—among the set of one or more (e.g., N=2) TCI states/pairs of TCI states indicated, e.g., by a TCI codepoint, in a beam indication DCI or MAC CE as specified herein in the present disclosure-identified by the indicator(s) as those indicated for the one or more channels/signals, to determine or assess the radio link quality(s) of the BFD RS set q0 as specified herein in the present disclosure.

In one embodiment, a UE could use/apply one or more of S>1 (e.g., two) BFD RS sets—e.g., denoted by q0_0 and q0_1—to monitor radio link quality(s) for (single-DCI based) multi-TRP operation. As specified herein in the present disclosure, the UE 116 could be first configured by the network 130, e.g., via higher layer RRC signaling/parameter, one or more (e.g., two) sets of BFD RSs or BFD RS IDs. The UE 116 could then receive from the network 130, e.g., one or more (e.g., two) BFD RS MAC CE activation/subselection commands (or one or more BFD RS indication MAC CEs) that respectively activate/subselect one or more BFD RSs or BFD RS IDs from the one or more sets, to respectively update one or more BFD RSs in one or more of the S>1 BFD RS sets (e.g., q0_0 and q0_1). In the present disclosure, various design examples and methods are presented under S=2; they can be extended to system settings and/or assumptions with S>2.

For S=2 or N=2, the two BFD RS sets q0_0 and q0_1 could be (one-to-one) mapped/associated to the (set of) two TCI states/pairs of TCI states indicated, e.g., by a TCI codepoint, in a beam indication DCI or MAC CE as specified herein in the present disclosure.

For example, the first BFD RS set q0_0 could be mapped/associated to the first TCI state-identified among the set of one or more (e.g., N=2) TCI states/pairs of TCI states indicated, e.g., by a TCI codepoint, in a beam indication DCI or MAC CE as specified herein in the present disclosure, and the second BFD RS set q0_0 could be mapped/associated to the second TCI state-identified among the set of one or more (e.g., N=2) TCI states/pairs of TCI states indicated, e.g., by a TCI codepoint, in a beam indication DCI or MAC CE as specified herein in the present disclosure.

For another example, the first BFD RS set q0_0 could be mapped/associated to the second TCI state—identified among the set of one or more (e.g., N=2) TCI states/pairs of TCI states indicated, e.g., by a TCI codepoint, in a beam indication DCI or MAC CE as specified herein in the present disclosure, and the second BFD RS set q0_0 could be mapped/associated to the first TCI state-identified among the set of one or more (e.g., N=2) TCI states/pairs of TCI states indicated, e.g., by a TCI codepoint, in a beam indication DCI or MAC CE as specified herein in the present disclosure.

Yet for another example, the UE 116 could be indicated/configured/provided by the network 130, e.g., via higher layer RRC signaling/parameter and/or MAC CE command and/or dynamic DCI based L1 signaling, the mapping/association relationship between the two BFD RS sets q0_0 and q0_1 and the (set of) two TCI states/pairs of TCI states indicated, e.g., by a TCI codepoint, in a beam indication DCI or MAC CE as specified herein in the present disclosure.

Depending on which one or more of the TCI states-among the set of one or more (e.g., N=2) TCI states/pairs of TCI states indicated, e.g., by a TCI codepoint, in a beam indication DCI or MAC CE as specified herein in the present disclosure—are used/applied for transmitting or receiving channels/signals (e.g., indicated by the first, second, third and/or fourth indicators as specified herein in the present disclosure), the UE 116 could assess the radio link quality(s) of the associated/corresponding BFD RS set(s)—e.g., q0_0 and/or q0_1—as specified herein in the present disclosure, to detect potential beam failure(s). In the following design examples, the first BFD RS set q0_0 is mapped/associated to the first indicated TCI state and the second BFD RS set q0_1 is mapped/associated to the second indicated TCI state. The design examples specified in the present disclosure can be extended/applied to when the first BFD RS set q0_0 is mapped/associated to the second indicated TCI state and the second BFD RS set q0_1 is mapped/associated to the first indicated TCI state.

In one example, the UE 116 could assess the radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure.

In another example, the UE 116 could assess the radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure.

In yet another example, the UE 116 could assess a first radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, and a second radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure.

When a UE receives the first indicator for one or more CORESETs as specified herein in the present disclosure, the UE 116 would determine or assess radio link quality(s) of the first BFD RS set q0_0 and/or the second BFD RS set q0_1 according to one or more of the following.

In one example, the UE 116 could assess the radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '00' as specified herein in the present disclosure, wherein the first TCI state is for the one or more CORESETs.

In another example, the UE 116 could assess the radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '01' as specified herein in the present disclosure, wherein the second TCI state is for the one or more CORESETs.

In yet another example, the UE 116 could assess a first radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more first CORESETs configured/associated with the first indicator set to '00' as specified herein in the present disclosure, wherein the first TCI state is for the one or more first CORESETs, and a second radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more second CORESETs configured/associated with the first indicator set to '01' as specified herein in the present disclosure, wherein the second TCI state is for the one or more second CORESETs.

In yet another example, the UE 116 could assess a first radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, and a second radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

According to one or more examples described herein, the UE 116 could assess the radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, when/if one or more of the following conditions are satisfied/achieved.

In one example, the first TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '00' or '10' or '11'.

In another example, the first TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PDSCH reception, wherein as specified herein in the present disclosure, the second indicator indicated in a DL DCI that schedules the PDSCH could be set to '00' or '10' or '11'.

In yet another example, the first TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUCCH transmission, wherein as specified herein in the present disclosure, the third indicator configured for or associated to the PUCCH transmission could be set to '00' or '10' or '11'.

In yet another example, the first TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUSCH transmission, wherein as specified herein in the present disclosure, the fourth indicator indicated in an UL DCI that schedules the PUSCH could be set to '00' or '10' or '11'.

According to one or more examples described herein, the UE 116 could assess the radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, when/if one or more of the following conditions are satisfied/achieved.

In one example, the second TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '01' or '10' or '11'.

In another example, the second TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PDSCH reception, wherein as specified herein in the present disclosure, the second indicator indicated in a DL DCI that schedules the PDSCH could be set to '01' or '10' or '11'.

In yet another example, the second TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUCCH transmission, wherein as specified herein in the present disclosure, the third indicator configured for or associated to the PUCCH transmission could be set to '01' or '10' or '11'.

In yet another example, the second TCI state, among the set of one or more (e.g., N=2) TCI states/pairs of TCI states indicated, e.g., by a TCI codepoint, in a beam indication DCI or MAC CE as specified herein in the present disclosure, is indicated or used/applied for PUSCH transmission, wherein as specified herein in the present disclosure, the fourth indicator indicated in an UL DCI that schedules the PUSCH could be set to '01' or '10' or '11'.

According to one or more examples described herein, the UE 116 could assess a first radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, and a second radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, when/if one or more of the following conditions are satisfied/achieved.

In one example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated for at least one CORESET or used/applied for PDCCH reception, wherein as specified herein in the present disclosure, the first indicator configured for or associated to PDCCH(s)/PDCCH candidate(s)—e.g., the first and second PDCCH candidates-received in the CORESET(s) could be set to '10' or '11'.

In another example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated or used/applied for PDSCH reception, wherein as specified herein in the present disclosure, the second indicator indicated in a DL DCI that schedules the PDSCH(s)—e.g., the first and second PDSCHs-could be set to '10' or '11'.

In yet another example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated or used/applied for PUCCH transmission, wherein as specified herein in the present disclosure, the third indicator configured for or associated to the PUCCH transmission—e.g., the first and second PUCCHs/PUCCH resources-could be set to '10' or '11'.

In yet another example, both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated or used/applied for PUSCH transmission, wherein as specified herein in the present disclosure, the fourth indicator indicated in an UL DCI that schedules the PUSCH(s)—e.g., the first and second PUSCHs-could be set to '10' or '11'.

A UE could follow certain priority rule(s) to determine which one or more of the first, second, third and/or fourth indicators to follow to assess the radio link quality(s) of the first BFD RS set q0_0 and/or the second BFD RS set q0_1 according to the design examples specified herein in the present disclosure. The priority rule(s) could be fixed in the system specification(s). Alternatively, the UE 116 could be indicated/configured/provided by the network 130, e.g., via higher layer RRC signaling/parameter and/or MAC CE command and/or dynamic DCI based L1 signaling, the priority rule(s).

In one example, the UE 116 could only use/apply the QCL source RS(s) that is provided/indicated in the (active) TCI state(s) indicated for the CORESET(s) to assess the radio link quality(s) of the first BFD RS set q0_0 and/or the second BFD RS set q0_1. In the present disclosure, the UE 116 could first follow the first indicator configured for one or more CORESETs as specified herein in the present disclosure, and therefore, the QCL source RS(s) provided in the TCI state(s)—among the set of one or more (e.g., N=2) TCI states/pairs of TCI states indicated, e.g., by a TCI codepoint, in a beam indication DCI or MAC CE as specified herein in the present disclosure-identified by the first indicator as those indicated for the one or more CORESETs, to determine or assess the radio link quality(s) of the first BFD RS set q0_0 and/or the second BFD RS set q0_1 as specified herein in the present disclosure. When/if the first indicator is not present/configured for the CORESET(s) and/or the first indicator indicates that none of the set of TCI states/pairs of TCI states are indicated for PDCCH reception in the CORESET(s), the UE 116 could follow the QCL source RS(s) provided in one or more TCI states (e.g., each provided by TCI-State) indicated for the respective CORESET(s) to determine or assess the radio link quality(s) of the first BFD RS set q0_0 and/or the second BFD RS set q0_1 as specified herein in the present disclosure. Note that the one or more TCI states here may not belong to the set of unified TCI states/pairs of TCI states.

In another example, the UE 116 could first follow the first indicator—i.e., with the highest priority—configured for one or more CORESETs as specified herein in the present disclosure, and therefore, the QCL source RS(s) provided in the TCI state(s)—among the set of one or more (e.g., N=2) TCI states/pairs of TCI states indicated, e.g., by a TCI codepoint, in a beam indication DCI or MAC CE as specified herein in the present disclosure-identified by the first indicator as those indicated for the one or more CORESETs, to determine or assess the radio link quality(s) of the first BFD RS set q0_0 and/or the second BFD RS set q0_1 as specified herein in the present disclosure. The UE 116 could then follow the second indicator, the third indicator, and/or the fourth indicator-their priorities could be ordered from high to low, low to high, or configured by the network 130 via higher layer RRC signaling/parameter and MAC CE command and/or dynamic DCI based L1 signaling—to determine or assess the radio link quality(s) of the first BFD RS set q0_0 and/or the second BFD RS set q0_1 as specified herein in the present disclosure according to one or more of the following.

For example, when/if the first indicator indicates that both of the TCI states-among the set of one or more (e.g., N=2) TCI states/pairs of TCI states indicated, e.g., by a TCI codepoint, in a beam indication DCI or MAC CE as specified herein in the present disclosure—are indicated for the CORESET(s), the UE 116 may not need to follow the second indicator, the third indicator, and/or the fourth indicator to determine or assess the radio link quality(s) of the first BFD RS set q0_0 and/or the second BFD RS set q0_1 as specified herein in the present disclosure anymore.

For another example, when/if the first indicator is not present/configured for the CORESET(s) and/or the first indicator indicates that none of the set of TCI states/pairs of TCI states are indicated for PDCCH reception in the CORESET(s), the UE 116 could first follow the QCL source RS(s) provided in one or more TCI states (e.g., each provided by TCI-State) indicated for the respective CORESET(s) to determine or assess the radio link quality(s) of the first BFD RS set q0_0 and/or the second BFD RS set q0_1 as specified herein in the present disclosure. Note that the one or more TCI states here may not belong to the set of unified TCI states/pairs of TCI states. For this case:

In one example, the UE 116 could then follow the second indicator, the third indicator, and/or the fourth indicator-their priorities could be ordered from high to low, low to high, or configured by the network 130 via higher layer RRC signaling/parameter and MAC CE command and/or dynamic DCI based L1 signaling—to determine or assess the radio link quality(s) of the first BFD RS set q0_0 and/or the second BFD RS set q0_1 according to the design examples specified herein in the present disclosure.

In another example, the UE 116 may not need to follow the second indicator, the third indicator and/or the fourth indicator to determine or assess the radio link quality(s) of the BFD RS sets q0_0 and/or q0_1 as specified herein in the present disclosure anymore.

Yet for another example, when/if the first indicator is not present/configured for the CORESET(s) and/or the first indicator indicates that none of the set of TCI states/pairs of TCI states are indicated for PDCCH reception in the CORESET(s), the UE 116 could then follow the second indicator, the third indicator, and/or the fourth indicator-their priorities could be ordered from high to low, low to high, or configured by the network 130 via higher layer RRC signaling/parameter and MAC CE command and/or dynamic DCI based L1 signaling—to determine or assess the radio link quality(s) of the first BFD RS set q0_0 and/or the second BFD RS set q0_1 according to the design examples specified herein in the present disclosure.

Yet for another example, when/if the first indicator indicates that one of the TCI states, e.g., the first (or second) TCI state-among the set of one or more (e.g., N=2) TCI states/pairs of TCI states indicated, e.g., by a TCI codepoint, in a beam indication DCI or MAC CE as specified herein in the present disclosure—is indicated for the CORESET(s), the UE 116 could then follow the second indicator, the third indicator, and/or the fourth indicator (if applicable)—their priorities could be ordered from high to low, low to high, or configured by the network 130 via higher layer RRC signaling/parameter and MAC CE command and/or dynamic DCI based L1 signaling—to identify that the other TCI state(s), e.g., the second (or first) TCI state-among the set of one or more (e.g., N=2) TCI states/pairs of TCI states indicated, e.g., by a TCI codepoint, in a beam indication DCI or MAC CE as specified herein in the present disclosure—is used/applied for the respective channel(s)/signal(s), and use/apply the QCL source RS(s) provided in the other TCI state(s), e.g., the second (or first) TCI state-among the set of one or more (e.g., N=2) TCI states/pairs of TCI states indicated, e.g., by a TCI codepoint, in a beam indication DCI or MAC CE as specified herein in the present disclosure-identified by the second, third, and/or fourth indicators as that for the respective channel(s)/signal(s), to determine or assess the radio link quality(s) of the second BFD RS set q0_1 (or the first BFD RS set q0_0) as specified herein in the present disclosure.

In yet another example, the first, second, third, and fourth indicators could have the same or equal priority. That is, the UE 116 could follow one or more or all of the first, second, third, and fourth indicators—if applicable—and therefore, the QCL source RS(s) provided in the TCI state(s)—among the set of one or more (e.g., N=2) TCI states/pairs of TCI states indicated, e.g., by a TCI codepoint, in a beam indication DCI or MAC CE as specified herein in the present disclosure-identified by the indicator(s) as those indicated for the one or more channels/signals, to determine or assess the radio link quality(s) of the first BFD RS set q0_0 and/or the second BFD RS set q0_1 as specified herein in the present disclosure.

As specified herein in the present disclosure, one or more BFD RSs or entries in a BFD RS set, e.g., the first BFD RS set q0_0 or the second BFD RS set q0_1 as discussed herein in the present disclosure, could be updated/indicated by one or more BFD RS indication MAC CEs, wherein each BFD RS indication MAC CE could activate or subselect one or more BFD RSs or BFD RS IDs from one or more higher layer RRC configured sets of BFD RSs or BFD RS IDs. For the first BFD RS set q0_0 (or the second BFD RS set q0_1):

In one example, the UE 116 could receive from the network 130 a BFD RS indication MAC CE that is associated to or dedicated for the first BFD RS set q0_0 (or the second BFD RS set q0_1)—e.g., the BFD RS indication MAC CE could include/contain/provide the ID/index of the first BFD RS set q0_0 (or the second BFD RS set q0_1). The BFD RS indication MAC CE could include/comprise/contain a set of BFD RS(s) or BFD RS ID(s), which could be activated/subselected from a first higher layer RRC configured list/set of BFD RSs or BFD RS IDs, a second higher layer RRC configured list/set of BFD RSs or BFD RS IDs, or the first and/or second higher layer RRC configured lists/sets of BFD RSs or BFD RS IDs depending on the network 130's configuration/indication via higher layer RRC signaling/parameter and/or MAC CE command and/or dynamic DCI based L1 signaling. The UE 116 could use/apply the BFD RS(s) or BFD RS ID(s) provided in the BFD RS indication MAC CE to update one or more BFD RSs in the first BFD RS set q0_0 (or the second BFD RS set q0_1).

In another example, the UE 116 could receive from the network 130 a BFD RS indication MAC CE including/comprising/containing two sets of BFD RS(s) or BFD RS ID(s)—denoted by the first set of BFD RS(s) or BFD RS ID(s) and the second set of BFD RS(s) or BFD RS ID(s), respectively. For this design example, the first set of BFD RS(s) or BFD RS ID(s) could be activated/subselected from a first higher layer RRC configured list/set of BFD RSs or BFD RS IDs, a second higher layer RRC configured list/set of BFD RSs or BFD RS IDs, or the first and/or second higher layer RRC configured lists/sets of BFD RSs or BFD RS IDs depending on the network 130's configuration/indication via higher layer RRC signaling/parameter and/or MAC CE command and/or dynamic DCI based L1 signaling. The second set of BFD RS(s) or BFD RS ID(s) could be activated/subselected from the first higher layer RRC configured list/set of BFD RSs or BFD RS IDs, the second higher layer RRC configured list/set of BFD RSs or BFD RS IDs, or the first and/or second higher layer RRC configured lists/sets of BFD RSs or BFD RS IDs depending on the network 130's configuration/indication via higher layer RRC signaling/parameter and/or MAC CE command and/or dynamic DCI based L1 signaling.

For example, the UE 116 could use/apply the BFD RS(s) or BFD RS ID(s) provided in the first set of BFD RS(s) or BFD RS ID(s) in the BFD RS indication MAC CE to update one or more BFD RSs in the first BFD RS set q0_0 (or in the second BFD RS set q0_1).

For another example, the UE 116 could use/apply the BFD RS(s) or BFD RS ID(s) provided in the second set of BFD RS(s) or BFD RS ID(s) in the BFD RS indication MAC CE to update one or more BFD RSs in the first BFD RS set q0_0 (or in the second BFD RS set q0_1).

Yet for another example, the UE 116 could use/apply the BFD RS(s) or BFD RS ID(s) provided in both of the first and second sets of BFD RS(s) or BFD RS ID(s) in the BFD RS indication MAC CE to update one or more BFD RSs in the first BFD RS set q0 (or in the second BFD RS set q0_1).

Yet for another example, the UE 116 could be configured/provided/indicated by the network 130, e.g., via higher layer RRC signaling/parameter and/or MAC CE command and/or dynamic DCI based L1 signaling, which one or more of the two sets (and therefore, the BFD RS(s) or BFD RS ID(s) provided therein) to use/apply to update the first BFD RS set q0_0 (or the second BFD RS set q0_1).

For example, the UE 116 could be configured/provided/indicated by the network 130, e.g., via higher layer RRC signaling/parameter and/or MAC CE command (e.g., in the BFD RS indication MAC CE) and/or dynamic DCI based L1 signaling, a one-bit or two-bit indicator with '0'/'00' ('1', '01', '10', or '11') indicating that the BFD RS(s) or BFD RS ID(s) provided in the first set of BFD RS(s) or BFD RS ID(s) in the BFD RS indication MAC CE could be used/applied to update one or more BFD RSs in the first BFD RS set q0_0 (or in the second BFD RS set q0_1). '1'/'01' ('0', '00', '10', or '11') indicating that the BFD RS(s) or BFD RS ID(s) provided in the second set of BFD RS(s) or BFD RS ID(s) in the BFD RS indication MAC CE could be used/applied to update one or more BFD RSs in the first BFD RS set q0_0 (or in the second BFD RS set q0_1). '0'/'1'/'10'/'11' ('00' or '01') indicating that the BFD RS(s) or BFD RS ID(s) provided in both of the first and second sets of BFD RS(s) or BFD RS ID(s) in the BFD RS indication MAC CE could be used/applied to update one or more BFD RSs in the first BFD RS set q0_0 (or in the second BFD RS set q0_1).

For another example, the UE 116 could be configured/provided/indicated by the network 130, e.g., via higher layer RRC signaling/parameter and/or MAC CE command (e.g., in the BFD RS indication MAC CE) and/or dynamic DCI based L1 signaling, a bitmap (e.g., of length 2). When/if the first entry/bit position of the bitmap is set to '1' while the second entry/bit position of the bitmap is set to '0', the BFD RS(s) or BFD RS ID(s) provided in the first set of BFD RS(s) or BFD RS ID(s) in the BFD RS indication MAC CE could be used/applied to update one or more BFD RSs in the first BFD RS set q0_0 (or in the second BFD RS set q0_1); when/if the first entry/bit position of the bitmap is set to '0' while the second entry/bit position of the bitmap is set to '1', the BFD RS(s) or BFD RS ID(s) provided in the second set of BFD RS(s) or BFD RS ID(s) in the BFD RS indication MAC CE could be used/applied to update one or more BFD RSs in the first BFD RS set q0_0 (or in the second BFD RS set q0_1); when/if both of the first and second entries/bit positions of the bitmap are set to '1's, the BFD RS(s) or BFD RS ID(s) provided in both of the first and second sets of BFD RS(s) or BFD RS ID(s) in the BFD RS indication MAC CE could be used/applied to update one or more BFD RSs in the first BFD RS set q0_0 (or in the second BFD RS set q0_1).

Yet for another example, the UE 116 could follow one or more of the first, second, third, and/or fourth indicators specified herein in the present disclosure to determine which one or more of the two sets (and therefore, the BFD RS(s) or BFD RS ID(s) provided therein) indicated in the BFD RS indication MAC CE to use/apply to update the first BFD RS set q0_0 (or the second BFD RS set q0_1), according to one or more of the following.

For example, when/if the first indicator configured for the CORESET(s) is set to '00' as specified herein in the present disclosure, the BFD RS(s) or BFD RS ID(s) provided in the first set of BFD RS(s) or BFD RS ID(s) in the BFD RS indication MAC CE could be used/applied to update one or more BFD RSs in the first BFD RS set q0_0 (or in the second BFD RS set q0_1); when/if the first indicator configured for the CORESET(s) is set to '01' as specified herein in the present disclosure, the BFD RS(s) or BFD RS ID(s) provided in the second set of BFD RS(s) or BFD RS ID(s) in the BFD RS indication MAC CE could be used/applied to update one or more BFD RSs in the first BFD RS set q0_0 (or in the second BFD RS set q0_1); when/if the first indicator configured for the CORESET(s) is set to '10' or '11' as specified herein in the present disclosure, the BFD RS(s) or BFD RS ID(s) provided in both of the first and second sets of BFD RS(s) or BFD RS ID(s) in the BFD RS indication MAC CE could be used/applied to update one or more BFD RSs in the first BFD RS set q0_0 (or in the second BFD RS set q0_1).

For another example, when/if the second indicator indicated for the PDSCH reception is set to '00' as specified herein in the present disclosure, the BFD RS(s) or BFD RS ID(s) provided in the first set of BFD RS(s) or BFD RS ID(s) in the BFD RS indication MAC CE could be used/applied to update one or more BFD RSs in the first BFD RS set q0_0 (or in the second BFD RS set q0_1); when/if the second indicator indicated for the PDSCH reception is set to '01' as specified herein in the present disclosure, the BFD RS(s) or BFD RS ID(s) provided in the second set of BFD RS(s) or BFD RS ID(s) in the BFD RS indication MAC CE could be used/applied to update one or more BFD RSs in the first BFD RS set q0_0 (or in the second BFD RS set q0_1); when/if the second indicator indicated for the PDSCH reception is set to '10' or '11' as specified herein in the present disclosure, the BFD RS(s) or BFD RS ID(s) provided in both of the first and second sets of BFD RS(s) or BFD RS ID(s) in the BFD RS indication MAC CE could be used/applied to update one or more BFD RSs in the first BFD RS set q0_0 (or in the second BFD RS set q0_1).

Yet for another example, when/if the third indicator configured for the PUCCH transmission is set to '00' as specified herein in the present disclosure, the BFD RS(s) or BFD RS ID(s) provided in the first set of BFD RS(s) or BFD RS ID(s) in the BFD RS indication MAC CE could be used/applied to update one or more BFD RSs in the first BFD RS set q0_0 (or in the second BFD RS set q0_1); when/if the third indicator configured for the PUCCH transmission is set to '01' as specified herein in the present disclosure, the BFD RS(s) or BFD RS ID(s) provided in the second set of BFD RS(s) or BFD RS ID(s) in the BFD RS indication MAC CE could be used/applied to update one or more BFD RSs in the first BFD RS set q0_0 (or in the second BFD RS set q0_1); when/if the third indicator configured for the PUCCH transmission is set to '10' or '11' as specified herein in the present disclosure, the BFD RS(s) or BFD RS ID(s) provided in both of the first and second sets of BFD RS(s) or BFD RS ID(s) in the BFD RS indication MAC CE could be used/applied to update one or more BFD RSs in the first BFD RS set q0_0 (or in the second BFD RS set q0_1).

Yet for another example, when/if the fourth indicator indicated for the PUSCH transmission is set to '00' as specified herein in the present disclosure, the BFD RS(s) or BFD RS ID(s) provided in the first set of BFD RS(s) or BFD RS ID(s) in the BFD RS indication MAC CE could be used/applied to update one or more BFD RSs in the first BFD RS set q0_0 (or in the second BFD RS set q0_1); when/if the fourth indicator indicated for the PUSCH transmission is set to '01' as specified herein in the present disclosure, the BFD RS(s) or BFD RS ID(s) provided in the second set of BFD RS(s) or BFD RS ID(s) in the BFD RS indication MAC CE could be used/applied to update one or more BFD RSs in the first BFD RS set q0_0 (or in the second BFD RS set q0_1); when/if the fourth indicator indicated for the PUSCH transmission is set to '10' or '11' as specified herein in the present disclosure, the BFD RS(s) or BFD RS ID(s) provided in both of the first and second sets of BFD RS(s) or BFD RS ID(s) in the BFD RS indication MAC CE could be used/applied to update one or more BFD RSs in the first BFD RS set q0_0 (or in the second BFD RS set q0_1).

For a (or any or every) BFD RS set specified herein in the present disclosure, the higher layers in the UE 116 would increment beam failure instance (BFI) count (by one) in the BFI counter (denoted by BFI_COUNTER) associated/corresponding to the BFD RS set if the higher layers receive from the physical layer in the UE 116 that the radio link quality of the BFD RS set is worse than a threshold Qout. The UE 116 would declare a beam failure for the BFD RS set if the BFI count in the BFI counter BFI_COUNTER for the BFD RS set reaches the maximum number of BFI counts (e.g., provided by the higher layer parameter maxBFIcount) before a BFD timer expires. After the higher layers in the UE 116 declare the beam failure for the BFD RS set, the higher layers in the UE 116 would reset the BFI count in the corresponding/associated BFI counter BFI_COUNTER or the BFD timer to zero.

For a (or any or every) BFD RS set specified herein in the present disclosure, the UE 116 could be configured with/provided by the network 130, e.g., via the higher layer parameter candidateBeamRSList, a new beam identification (NBI) RS set of periodic CSI-RS resource configuration indexes or SSB indexes—corresponding/associated to the BFD RS set—for radio link quality measurement. The NBI RS set—as discussed herein, corresponding/associated to the BFD RS set—is used for identifying potential new beam(s) to recover the failed beam(s)/link(s) for the BFD RS set (and therefore, the corresponding channel(s)/signal(s) or TRP). The UE 116 expects single-port or two-port CSI-RS with frequency density equal to 1 or 3 REs per resource block (RB) in the NBI RS set. The UE 116 could assess the radio link quality according to the NBI RS set of resource configurations against a threshold Qin. The UE 116 would apply the Qin threshold to the L1-RSRP measurement obtained from a SSB in the NBI RS set and apply the Qin threshold to the L1-RSRP measurement obtained from a CSI-RS resource in the NBI RS set after scaling a respective CSI-RS reception power with a value provided by powerControlOffset. According to the L1-RSRP measurements, the UE 116 could identify the periodic CSI-RS resource configuration index or SSB index in the NBI RS set, denoted by q_new, that corresponds to the largest/highest measured L1-RSRP among those larger than or equal to the Qin threshold.

This disclosure evaluates various design aspects related to sending beam failure recovery request (BFRQ) and information related to beams having radio link quality worse than a threshold in a multi-TRP system, wherein beams/TRPs selection is conducted under the unified TCI framework.

As specified in Rel-17, a unified TCI framework could indicate/include N≥1 DL TCI states and/or M≥1 UL TCI states, wherein the indicated TCI state could be at least one of:

- A DL TCI state and/or its corresponding/associated TCI state ID
- An UL TCI state and/or its corresponding/associated TCI state ID
- A joint DL and UL TCI state and/or its corresponding/associated TCI state ID
- Separate DL TCI state and UL TCI state and/or their corresponding/associated TCI state ID(s)

There could be various design options/channels to indicate to the UE 116 a beam (i.e., a TCI state) for the transmission/reception of a PDCCH or a PDSCH. As described in the 3GPP Rel-17:

- In one example, a MAC CE could be used to indicate to the UE 116 a beam (i.e., a TCI state and/or a TCI state ID) for the transmission/reception of a PDCCH or a PDSCH.
- In another example, a DCI could be used to indicate to the UE 116 a beam (i.e., a TCI state and/or a TCI state ID) for the transmission/reception of a PDCCH or a PDSCH.
  - For example, a DL related DCI (e.g., DCI format 1_0, DCI format 1_1 or DCI format 1_2) could be used to indicate to the UE 116 a beam (i.e., a TCI state and/or a TCI state ID) for the transmission/reception of a PDCCH or a PDSCH, wherein the DL related DCI may or may not include a DL assignment.
  - For another example, an UL related DCI (e.g., DCI format 0_0, DCI format 0_1, DCI format 0_2) could be used to indicate to the UE 116 a beam (i.e., a TCI state and/or a TCI state ID) for the transmission/reception of a PDCCH or a PDSCH, wherein the UL related DCI may or may not include an UL scheduling grant.
  - Yet for another example, a custom/purpose designed DCI format could be used to indicate to the UE 116 a beam (i.e., a TCI state and/or a TCI state ID) for the transmission/reception of a PDCCH or a PDSCH.

Rel-17 introduced the unified TCI framework, where a unified or master or main TCI state is signaled to the UE 116. The unified or master or main TCI state can be one of:

- In case of joint TCI state indication, wherein a same beam is used for DL and UL channels, a joint TCI state that can be used at least for UE-dedicated DL channels and UE-dedicated UL channels.
- In case of separate TCI state indication, wherein different beams are used for DL and UL channels, a DL TCI state can be used at least for UE-dedicated DL channels.
- In case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

In a (single-DCI based) multi-TRP system, a UE could be indicated/provided/configured by the network 130, e.g., via a beam indication MAC CE or a DCI (e.g., via one or more TCI codepoints of one or more TCI fields in the corresponding DCI 1_1/1_2 with or without DL assignment), a set of one or more (e.g., N>1) TCI states/pairs of TCI states, wherein a TCI state could be a joint DL and UL TCI state or a separate DL TCI state provided by TCI-State/DLorJointTCI-State, or a separate UL TCI state provided by TCI-State/UL-TCI-State, and a pair of TCI states could include/contain a separate DL TCI state provided by TCI-State/DLorJointTCI-State or a separate UL TCI State provided by TCI-State/UL-TCIState, under the unified TCI framework.

For PDCCH reception or PDCCH candidate monitoring in a (single-DCI based) multi-TRP system, a UE could be configured/provided/indicated by the network 130 via higher layer RRC signaling/parameter and/or MAC CE command and/or dynamic DCI based L1 signaling—e.g., in higher layer RRC signaling/parameter ControlResourceSet that configures a CORESET—a first indicator to indicate which one or more of the set of TCI states/pairs of TCI states indicated, e.g., by a TCI codepoint, in a beam indication DCI or MAC CE as specified herein in the present disclosure, to use/apply for receiving/monitoring the PDCCH(s)/PDCCH candidate(s) in the corresponding CORESET. For instance, for N=2 (i.e., a set of two TCI states/pairs of TCI states are indicated), the first indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '01' indicates that the second TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving/monitoring the PDCCH(s)/PDCCH candidate(s)—e.g., first and second PDCCH candidates—in the corresponding CORESET(s). '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for receiving/monitoring the PDCCH(s)/PDCCH candidate(s)—e.g., first and second PDCCH candidates—in the corresponding CORESET(s), wherein the first and second PDCCH candidates could be received in search space sets that are higher layer linked via SearchSpaceLinking and/or the first and second PDCCH candidates carry the same/identical DCI payload. Furthermore, throughout the present disclosure, the first TCI state(s) or the second TCI state(s)—specified herein in the present disclosure-could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

For PDSCH reception in a (single-DCI based) multi-TRP system, a UE could be configured/provided/indicated by the network 130 via higher layer RRC signaling/parameter and/or MAC CE command and/or dynamic DCI based L1 signaling—e.g., in a DL DCI (e.g., DCI format 1_0/1_1/1_2) that schedules the PDSCH-a second indicator to indicate which one or more of the set of TCI states/pairs of TCI states indicated, e.g., by a TCI codepoint, in a beam indication DCI or MAC CE as specified herein in the present disclosure, to use/apply for receiving the PDSCH(s). For instance, for N=2 (i.e., a set of two TCI states/pairs of TCI states are indicated), the second indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '01' indicates that the second TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH, wherein the first and second PDSCHs could correspond to two PDSCH transmission occasions or repetition in space, time and/or frequency. Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCI-State, or a pair of separate DL and separate UL TCI states.

For PUCCH transmission in a (single-DCI based) multi-TRP system, a UE could be configured/provided/indicated by the network 130 via higher layer RRC signaling/parameter and/or MAC CE command and/or dynamic DCI based L1 signaling—e.g., in higher layer RRC signaling/parameter PUCCH-Config that configures PUCCH(s)/PUCCH resource(s)—a third indicator to indicate which one or more of the set of TCI states/pairs of TCI states indicated, e.g., by a TCI codepoint, in a beam indication DCI or MAC CE as specified herein in the present disclosure, to use/apply for transmitting the PUCCH(s)/PUCCH resource(s). For instance, for N=2 (i.e., a set of two TCI states/pairs of TCI states are indicated), the third indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '01' indicates that the second TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the PUCCH(s)/PUCCH resource(s)—e.g., first PUCCH/PUCCH resource and second PUCCH/PUCCH resource. '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for transmitting the PUCCH(s)/PUCCH resource(s)—e.g., first PUCCH/PUCCH resource and second PUCCH/PUCCH resource, wherein the first and second PUCCHs/PUCCH resources could correspond to two PUCCH transmission occasions or repetitions in space, time and/or frequency. Furthermore, throughout the present disclosure, the first TCI state(s) or the second TCI state(s)—specified herein in the present disclosure-could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

For PUSCH transmission in a (single-DCI based) multi-TRP system, a UE could be configured/provided/indicated by the network 130 via higher layer RRC signaling/parameter and/or MAC CE command and/or dynamic DCI based L1 signaling—e.g., in an UL DCI (e.g., DCI format 0_0/0_1/0_2) that schedules the PUSCH-a fourth indicator to indicate which one or more of the set of TCI states/pairs of TCI states indicated, e.g., by a TCI codepoint, in a beam indication DCI or MAC CE as specified herein in the present disclosure, to use/apply for transmitting the PUSCH(s). For instance, for N=2 (i.e., a set of two TCI states/pairs of TCI states are indicated), the fourth indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '01' indicates that the second TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH, wherein the first and second PUSCHs could correspond to two PUSCH transmission occasions or repetition in space, time and/or frequency. Furthermore, throughout the present disclosure, the first TCI state(s) or the second TCI state(s)—specified herein in the present disclosure-could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

In one embodiment, for implicit BFD RS determination:

In one example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure.

In another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure.

In yet another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in both of the first and second TCI states among the set of one or more (e.g., N=2) TCI states/pairs of TCI states indicated, e.g., by a TCI codepoint, in a beam indication DCI or MAC CE as specified herein in the present disclosure.

In yet another example, the UE 116 could determine two BFD RS sets. For instance, the UE 116 could determine a first BFD RS set—e.g., denoted by q0_0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure, and a second BFD RS set—e.g., denoted by q0_1—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure.

When a UE receives the first indicator for one or more CORESETs as specified herein in the present disclosure, the UE 116 would determine one or more BFD RS sets (and therefore, BFD RSs determined therein) according to one or more of the following.

In one example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '00' as specified herein in the present disclosure, wherein the first TCI state is for the one or more CORESETs.

In another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '01' as specified herein in the present disclosure, wherein the second TCI state is for the one or more CORESETs.

In yet another example, the UE 116 could determine two BFD RS sets. For instance, the UE 116 could determine a first BFD RS set—e.g., denoted by q0_0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more first CORESETs configured/associated with the first indicator set to '00' as specified herein in the present disclosure, wherein the first TCI state is for the one or more first CORESETs, and a second BFD RS set—e.g., denoted by q0_1—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more second CORESETs configured/associated with the first indicator set to '01' as specified herein in the present disclosure, wherein the second TCI state is for the one or more second CORESETs.

In yet another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first and second TCI states among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

In yet another example, the UE 116 could determine two BFD RS sets. For instance, the UE 116 could determine a first BFD RS set—e.g., denoted by q0_0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, and a second BFD RS set—e.g., denoted by q0_1—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

In yet another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in a TCI state indicated for receiving/monitoring PDCCH/PDCCH candidate(s) in one or more CORESETs configured/associated with the first indicator set to '11' as specified herein in the present disclosure, wherein (i) the TCI state could be provided by TCI-State and for the one or more CORESETs and/or (ii) the TCI state is not in the set of indicated TCI states/pairs of TCI states as specified herein in the present disclosure.

According to one or more examples described herein, the UE 116 could determine a BFD RS set—e.g., denoted by q0 or q0_0—to include periodic CSI-RS resource configuration indexes or SSB indexes (also referred to as BFD RS resource indexes) with same values as the RS indexes in the RS sets in the first TCI state among the set of one or more (e.g., N=2) TCI states/pairs of TCI states indicated, e.g., by a TCI codepoint, in a beam indication DCI or MAC CE as specified herein in the present disclosure, when/if the first TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '00' or '10' or '11'.

According to one or more examples described herein, the UE 116 could determine a BFD RS set—e.g., denoted by q1 or q0_1—to include periodic CSI-RS resource configuration indexes or SSB indexes (also referred to as BFD RS resource indexes) with same values as the RS indexes in the RS sets in the second TCI state among the set of one or more (e.g., N=2) TCI states/pairs of TCI states indicated, e.g., by a TCI codepoint, in a beam indication DCI or MAC CE as specified herein in the present disclosure, when/if the second TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '01' or '10' or '11'.

According to one or more examples described herein, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first and second TCI states among the set of one or more (e.g., N=2) TCI states/pairs of TCI states indicated, e.g., by a TCI codepoint, in a beam indication DCI or MAC CE as specified herein in the present disclosure, when/if both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated for at least one CORESET or used/applied for PDCCH reception, wherein as specified herein in the present disclosure, the first indicator configured for or associated to PDCCH(s)/PDCCH candidate(s)—e.g., the first and second PDCCH candidates-received in the CORESET(s) could be set to '10' or '11'.

For explicit BFD RS configuration, activation or indication, a UE could be configured/provided/indicated by the network 130, e.g., via higher layer RRC signaling/parameter and/or MAC CE command and/or dynamic DCI based L1 signaling, one or more BFD RS sets for radio link quality monitoring each comprising one or more BFD RSs, wherein a BFD RS could correspond to a periodic CSI-RS resource or a SSB. For instance, the UE 116 could be first configured by the network 130, e.g., via higher layer RRC signaling/parameter, one or more sets of BFD RSs or BFD RS IDs. The UE 116 could then receive from the network 130, one or more BFD RS MAC CE activation/subselection commands (or BFD RS indication MAC CEs) that activate/subselect one or more BFD RSs or BFD RS IDs from the one or more sets, to update one or more BFD RSs in one or more BFD RS sets.

In one embodiment, a UE could use/apply a single BFD RS set—e.g., denoted by q0—to monitor radio link quality for (single-DCI based) multi-TRP operation. As specified herein in the present disclosure, the UE 116 could be first configured by the network 130, e.g., via higher layer RRC signaling/parameter, a set of BFD RSs or BFD RS IDs. The UE 116 could then receive from the network 130, e.g., a BFD RS MAC CE activation/subselection command (or a BFD RS indication MAC CE) that activates/subselects one or more BFD RSs or BFD RS IDs from the set, to update one or more BFD RSs in the BFD RS set (e.g., q0).

For monitoring the radio link quality over the BFD RS set q0:

In one example, the UE 116 could assess the radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure.

In another example, the UE 116 could assess the radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure.

In yet another example, the UE 116 could assess the radio link quality of the BFD RS set q0 according to SSBs on the PCell or the PSCell or periodic CSI-RS resource configurations that are in both of the first and second TCI states among the set of one or more (e.g., N=2) TCI states/pairs of TCI states indicated, e.g., by a TCI codepoint, in a beam indication DCI or MAC CE as specified herein in the present disclosure.

In yet another example, the UE 116 could assess a first radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, and a second radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure.

When a UE receives the first indicator for one or more CORESETs as specified herein in the present disclosure, the UE 116 would determine or assess one or more radio link qualities of the BFD RS set q0 according to one or more of the following.

In one example, the UE 116 could assess the radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '00' as specified herein in the present disclosure, wherein the first TCI state is for the one or more CORESETs.

In another example, the UE 116 could assess the radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '01' as specified herein in the present disclosure, wherein the second TCI state is for the one or more CORESETs.

In yet another example, the UE 116 could determine or access two radio link qualities of the BFD RS set q0. For instance, the UE 116 could assess a first radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more first CORESETs configured/associated with the first indicator set to '00' as specified herein in the present disclosure, wherein the first TCI state is for the one or more first CORESETs, and a second radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more second CORESETs configured/associated with the first indicator set to '01' as specified herein in the present disclosure, wherein the second TCI state is for the one or more second CORESETs.

In yet another example, the UE 116 could assess the radio link quality of the BFD RS set q0 according to SSBs on the PCell or the PSCell or periodic CSI-RS resource configurations that are in the first and second TCI states among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

In yet another example, the UE 116 could determine or access two radio link qualities of the BFD RS set q0. For instance, the UE 116 could assess a first radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, and a second radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

In yet another example, the UE 116 could assess the radio link quality of the BFD RS set q0 according to SSBs on the PCell or the PSCell or periodic CSI-RS resource configurations that are in a TCI state indicated for receiving/monitoring PDCCH/PDCCH candidate(s) in one or more CORESETs configured/associated with the first indicator set to '11' as specified herein in the present disclosure, wherein (i) the TCI state could be provided by TCI-State and for the one or more CORESETs and/or (ii) the TCI state is not in the set of indicated TCI states/pairs of TCI states as specified herein in the present disclosure.

According to one or more examples described herein, the UE 116 could assess the radio link quality of the BFD RS set q0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, when/if the first TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '00' or '10' or '11'.

According to one or more examples described herein, the UE 116 could assess the radio link quality of the BFD RS set q0 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, when/if the second TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '01' or '10' or '11'.

According to one or more examples described herein, the UE 116 could assess the radio link quality of the BFD RS set q0 according to SSBs on the PCell or the PSCell or periodic CSI-RS resource configurations that are in the first and second TCI states among the set of one or more (e.g., N=2) TCI states/pairs of TCI states indicated, e.g., by a TCI codepoint, in a beam indication DCI or MAC CE as specified herein in the present disclosure, when/if both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated for at least one CORESET or used/applied for PDCCH reception, wherein as specified herein in the present disclosure, the first indicator configured for or associated to PDCCH(s)/PDCCH candidate(s)—e.g., the first and second PDCCH candidates-received in the CORESET(s) could be set to '10' or '11'.

In one embodiment, a UE could use/apply one or more of S>1 (e.g., two) BFD RS sets—e.g., denoted by q0_0 and q0_1—to monitor radio link quality(s) for (single-DCI based) multi-TRP operation. As specified herein in the present disclosure, the UE 116 could be first configured by the network 130, e.g., via higher layer RRC signaling/parameter, one or more (e.g., two) sets of BFD RSs or BFD RS IDs. The UE 116 could then receive from the network 130, e.g., one or more (e.g., two) BFD RS MAC CE activation/subselection commands (or one or more BFD RS indication MAC CEs) that respectively activate/subselect one or more BFD RSs or BFD RS IDs from the one or more sets, to respectively update one or more BFD RSs in one or more of the S>1 BFD RS sets (e.g., q0_0 and q0_1). In the present disclosure, various design examples and methods are presented under S=2; they can be extended to system settings and/or assumptions with S>2.

For S=2 or N=2, the two BFD RS sets q0_0 and q0_1 could be (one-to-one) mapped/associated to the (set of) two TCI states/pairs of TCI states indicated, e.g., by a TCI codepoint, in a beam indication DCI or MAC CE as specified herein in the present disclosure.

For example, the first BFD RS set q0_0 could be mapped/associated to the first TCI state-identified among the set of one or more (e.g., N=2) TCI states/pairs of TCI states indicated, e.g., by a TCI codepoint, in a beam indication DCI or MAC CE as specified herein in the present disclosure, and the second BFD RS set q0_0 could be mapped/associated to the second TCI state-identified among the set of one or more (e.g., N=2) TCI states/pairs of TCI states indicated, e.g., by a TCI codepoint, in a beam indication DCI or MAC CE as specified herein in the present disclosure.

For another example, the first BFD RS set q0_0 could be mapped/associated to the second TCI state—identified among the set of one or more (e.g., N=2) TCI states/pairs of TCI states indicated, e.g., by a TCI codepoint, in a beam indication DCI or MAC CE as specified herein in the present disclosure, and the second BFD RS set q0_0 could be mapped/associated to the first TCI state-identified among the set of one or more (e.g., N=2) TCI states/pairs of TCI states indicated, e.g., by a TCI codepoint, in a beam indication DCI or MAC CE as specified herein in the present disclosure.

Yet for another example, the UE 116 could be indicated/configured/provided by the network 130, e.g., via higher layer RRC signaling/parameter and/or MAC CE command and/or dynamic DCI based L1 signaling, the mapping/association relationship between the two BFD RS sets q0_0 and q0_1 and the (set of) two TCI states/pairs of TCI states indicated, e.g., by a TCI codepoint, in a beam indication DCI or MAC CE as specified herein in the present disclosure.

Depending on which one or more of the TCI states-among the set of one or more (e.g., N=2) TCI states/pairs of TCI states indicated, e.g., by a TCI codepoint, in a beam indication DCI or MAC CE as specified herein in the present disclosure—are used/applied for transmitting or receiving channels/signals (e.g., indicated by the first, second, third and/or fourth indicators as specified herein in the present disclosure), the UE 116 could assess the radio link quality(s) of the associated/corresponding BFD RS set(s)—e.g., q0_0 and/or q0_1—as specified herein in the present disclosure, to detect potential beam failure(s). In the following design examples, the first BFD RS set q0_0 is mapped/associated to the first indicated TCI state and the second BFD RS set q0_1 is mapped/associated to the second indicated TCI state. The design examples specified in the present disclosure can be extended/applied to when the first BFD RS set q0_0 is mapped/associated to the second indicated TCI state and the second BFD RS set q0_1 is mapped/associated to the first indicated TCI state.

In one example, the UE 116 could assess the radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure.

In another example, the UE 116 could assess the radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure.

In yet another example, the UE 116 could assess a first radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, and a second radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure.

When a UE receives the first indicator for one or more CORESETs as specified herein in the present disclosure, the UE 116 would determine or assess radio link quality(s) of the first BFD RS set q0_0 and/or the second BFD RS set q0_1 according to one or more of the following.

In one example, the UE 116 could assess the radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '00' as specified herein in the present disclosure, wherein the first TCI state is for the one or more CORESETs.

In another example, the UE 116 could assess the radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '01' as specified herein in the present disclosure, wherein the second TCI state is for the one or more CORESETs.

In yet another example, the UE 116 could assess a first radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more first CORESETs configured/associated with the first indicator set to '00' as specified herein in the present disclosure, wherein the first TCI state is for the one or more first CORESETs, and a second radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more second CORESETs configured/associated with the first indicator set to '01' as specified herein in the present disclosure, wherein the second TCI state is for the one or more second CORESETs.

In yet another example, the UE 116 could assess a first radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, and a second radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

According to one or more examples described herein, the UE 116 could assess the radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, when/if the first TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '00' or '10' or '11'.

According to one or more examples described herein, the UE 116 could assess the radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, when/if the second TCI state, among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '01' or '10' or '11'.

According to one or more examples described herein, the UE 116 could assess a first radio link quality of the first BFD RS set q0_0 according to SSBs on the PCell or the PSCell or periodic CSI-RS resource configurations that are in the first TCI state among the set of one or more (e.g., N=2) TCI states/pairs of TCI states indicated, e.g., by a TCI codepoint, in a beam indication DCI or MAC CE as specified herein in the present disclosure, and a second radio link quality of the second BFD RS set q0_1 according to SSBs on the PCell or the PSCell or periodic CSI-RS resource configurations that are in the second TCI state among the set of one or more (e.g., N=2) TCI states/pairs of TCI states indicated, e.g., by a TCI codepoint, in a beam indication DCI or MAC CE as specified herein in the present disclosure, when/if both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated for at least one CORESET or used/applied for PDCCH reception, wherein as specified herein in the present disclosure, the first indicator configured for or associated to PDCCH(s)/PDCCH candidate(s)—e.g., the first and second PDCCH candidates-received in the CORESET(s) could be set to '10' or '11'.

For a (or any or every) BFD RS set specified herein in the present disclosure, the higher layers in the UE 116 would increment beam failure instance (BFI) count (by one) in the BFI counter (denoted by BFI_COUNTER) associated/corresponding to the BFD RS set if the higher layers receive from the physical layer in the UE 116 that the radio link quality of the BFD RS set is worse than a threshold Qout. The UE 116 would declare a beam failure for the BFD RS set if the BFI count in the BFI counter BFI_COUNTER for the BFD RS set reaches the maximum number of BFI counts (e.g., provided by the higher layer parameter maxBFIcount) before a BFD timer expires. After the higher layers in the UE 116 declare the beam failure for the BFD RS set, the higher layers in the UE 116 would reset the BFI count in the corresponding/associated BFI counter BFI_COUNTER or the BFD timer to zero.

A BFD RS set could be associated/corresponding to one or more TCI states-among the set of one or more (e.g., N=2) TCI states/pairs of TCI states indicated, e.g., by a TCI codepoint, in a beam indication DCI or MAC CE as specified herein in the present disclosure-indicated for at least UE-dedicated DL and/or UL channels/signals. For example, a BFD RS set could include periodic CSI-RS resource configuration indexes or SSB indexes (also referred to as BFD RS resource indexes) with same values as the RS indexes in the RS sets in the first TCI state(s) and/or the second TCI state(s) (e.g., for N=2)—among the set of one or more (e.g., N=2) TCI states/pairs of TCI states indicated, e.g., by a TCI codepoint, in a beam indication DCI or MAC CE as specified herein in the present disclosure; for this case, whether the first TCI state(s) and/or the second TCI state(s) are used/applied could be determined according to one or more of the following: (1) fixed in the system specification(s), (2) configured/provided/indicated by the network 130, e.g., via higher layer RRC signaling/parameter and/or MAC CE command and/or dynamic DCI based L1 signaling, and (3) depending on the first, second, third, and/or fourth indicators as specified herein in the present disclosure and/or their association(s) to the first, second, third, and/or fourth indicators. For another example, the UE 116 could assess the radio link quality(s) of a RRC configured and/or MAC CE indicated BFD RS set according to the RS indexes in the RS sets in the first TCI state(s) and/or the second TCI state(s) (e.g., for N=2)—among the set of one or more (e.g., N=2) TCI states/pairs of TCI states indicated, e.g., by a TCI codepoint, in a beam indication DCI or MAC CE as specified herein in the present disclosure; for this case, whether the first TCI state(s) and/or the second TCI state(s) are used/applied could be determined according to one or more of the following: (1) fixed in the system specification(s), (2) configured/provided/indicated by the network 130, e.g., via higher layer RRC signaling/parameter and/or MAC CE command and/or dynamic DCI based L1 signaling, and (3) depending on the first, second, third, and/or fourth indicators as specified herein in the present disclosure and/or their association(s) to the first, second, third, and/or fourth indicators. For configuring/determining one or more BFD RSs in one or more BFD RS sets as specified herein in the present disclosure, the first TCI state(s) or the second TCI state(s)—as specified herein in the present disclosure-could correspond to a joint DL and UL TCI state provided by TCI-State/DLorJointTCI-State, a separate DL TCI state provided by TCI-State/DLorJointTCI-State, or the separate DL TCI state in a pair of DL and UL TCI states. Throughout the present disclosure, if the radio link quality of one or more BFD RSs in one or more BFD RS sets (or equivalently, the radio link quality of one or more BFD RS sets) is worse than a threshold (e.g., Qout, LR), the (higher layers of) UE could declare beam failure(s) for the one or more BFD RSs in the one or more BFD RS sets (or equivalently, for the one or more BFD RS sets).

Figure 13:
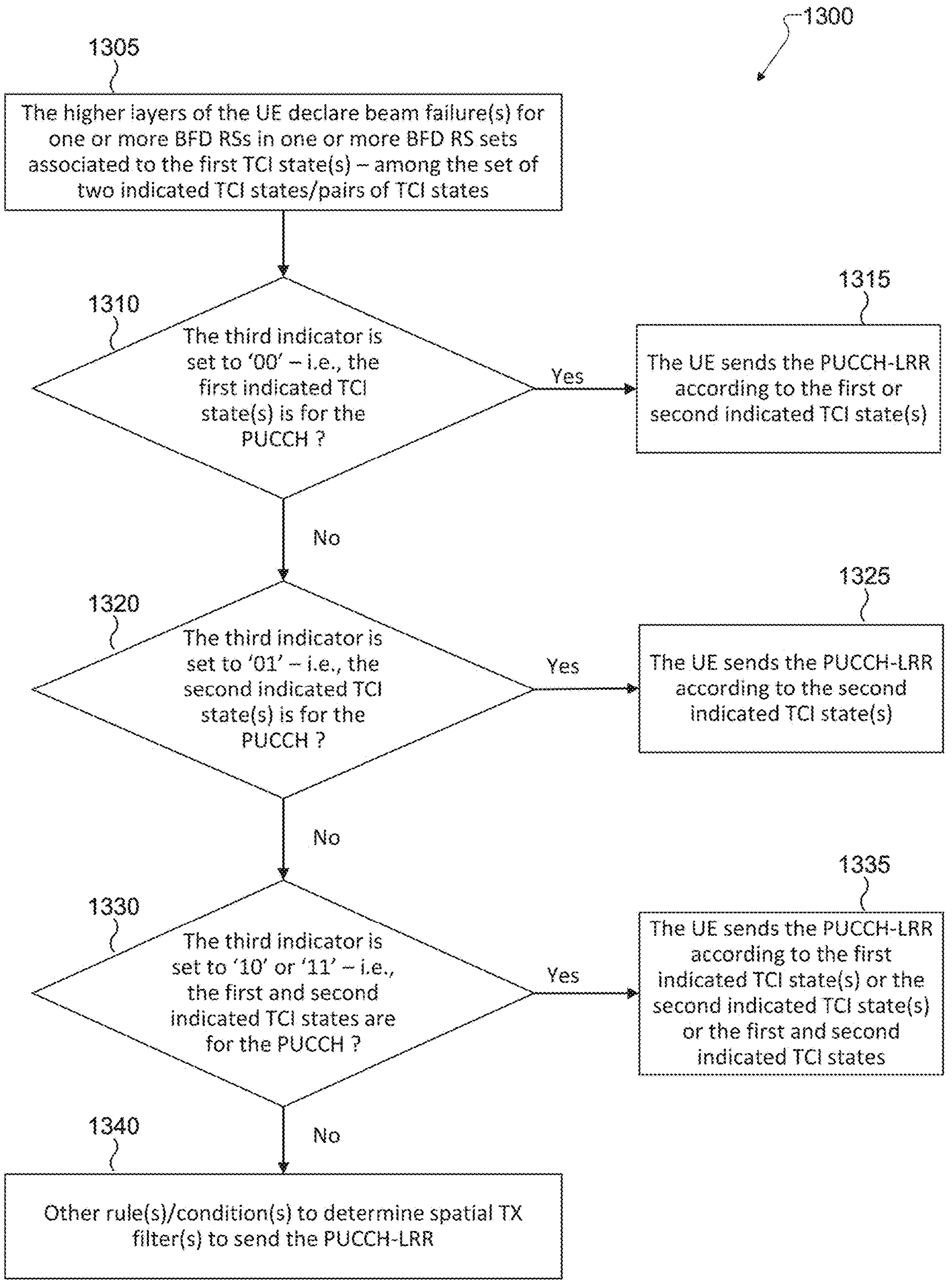
FIG. 13 illustrates a flowchart of an example UE procedure for transmitting a PUCCH-LRR according to embodiments of the present disclosure.

FIG. 13 illustrates a flowchart of an example UE procedure 1300 for transmitting a PUCCH-LRR according to embodiments of the present disclosure. For example, procedure 1300 can be performed by the UE 112 of FIG. 1. This example is for illustration only and other embodiments can be used without departing from the scope of the present disclosure.

The procedure begins in 1305, the higher layers if the UE 116 declare beam failure(s) for one or more BFD RSs in one or more BFD RS sets associated to the first TCI state(s)—among the set of the two indicated TCI states/pairs of TCI states. In 1310, the value of the third indicator may be set to '00'—i.e., the first indicated TCI state(s) is for the PUCCH. If the value is set to '00', in 1315, the UE 116 sends the PUCCH-LRR according to the first or second indicated TCI state(s). If the value is not set to '00', in 1320, the value of the third indicator may be set to '01'—i.e., the second indicated TCI state(s) is for the PUCCH. If the value is set to '01', in 1325, the UE 116 sends the PUCCH-LRR according to the second indicated TCI state(s). If the value in not set to '01', in 1330, the value of the third indicator may be set to '10' or '11'—i.e., the first and second indicated TCI states are for the PUCCH. If the value is set to '10' or '11', in 1335, the UE 116 sends the PUCCH-LRR according to the first indicated TCI state(s) or the second indicated TCI state(s) or the first and second indicated TCI states. If the value is not set to '10' nor '11', in 1340, other rule(s)/condition(s) to determine spatial TX filter(s) to send the PUCCH-LRR are used.

In one embodiment, a UE could be provided/configured/indicated by the network 130, e.g., via higher layer RRC signaling/parameter and/or MAC CE command and/or dynamic DCI based L1 signaling, a configuration for PUCCH transmission with a link recovery request (LRR) for the UE 116 to transmit PUCCH, e.g., when the UE 116 has declared beam failure for one or more BFD RSs in one or more BFD RS sets associated to one or more of the indicated TCI states as specified herein in the present disclosure. As specified herein in the present disclosure, a UE could determine the spatial-domain transmit filter(s) to transmit an uplink signal/data on a PUCCH resource according to the third indicator provided/configured/indicated to the UE 116 for the PUCCH resource, e.g., in the higher layer parameter PUCCH-Config that configures the PUCCH resource, and the set of TCI states/pairs of TCI states indicated, e.g., by a TCI codepoint, in a beam indication DCI or MAC CE as specified herein in the present disclosure. For instance, for N=2 (i.e., a set of two TCI states/pairs of TCI states are indicated), the third indicator could be a two-bit indicator with '00' indicating that the UE 116 could determine or spatially relate the spatial-domain transmit filter(s) for transmitting the corresponding PUCCH(s)/PUCCH resource(s)—i.e., associated/configured with the third indicator-according to the RS indexes in the RS sets in the first TCI state(s) among the set of TCI states/pairs of TCI states indicated, e.g., by a TCI codepoint, in a beam indication DCI or MAC CE as specified herein in the present disclosure. '01' indicates that the UE 116 could determine or spatially relate the spatial-domain transmit filter(s) for transmitting the corresponding PUCCH(s)/PUCCH resource(s)—i.e., associated/configured with the third indicator-according to the RS indexes in the RS sets in the second TCI state(s) among the set of TCI states/pairs of TCI states indicated, e.g., by a TCI codepoint, in a beam indication DCI or MAC CE as specified herein in the present disclosure. ‘10’ indicates that the UE 116 could determine or spatially relate the spatial-domain transmit filter(s) for transmitting the corresponding PUCCH(s)/PUCCH resource(s)—i.e., associated/configured with the third indicator-according to the RS indexes in the RS sets in the first and second TCI states respectively among the set of TCI states/pairs of TCI states indicated, e.g., by a TCI codepoint, in a beam indication DCI or MAC CE as specified herein in the present disclosure. ‘11’ indicates that the UE 116 could determine or spatially relate the spatial-domain transmit filter(s) for transmitting the corresponding PUCCH(s)/PUCCH resource(s)—i.e., associated/configured with the third indicator-according to the RS indexes in the RS sets in the second and first TCI states respectively among the set of TCI states/pairs of TCI states indicated, e.g., by a TCI codepoint, in a beam indication DCI or MAC CE as specified herein in the present disclosure, or none of the indicated TCI states; in the present disclosure, the first and second PUCCHs/PUCCH resources could correspond to two PUCCH transmission occasions or repetitions in space, time and/or frequency.

In one example, the UE 116 could determine the spatial-domain transmit filter(s) for transmitting/sending the PUCCH-LRR according to the third indicator provided/configured/indicated to the UE 116 for the PUCCH-LRR, e.g., in the higher layer parameter PUCCH-Config that configures the PUCCH-LRR resource. For N=2 (i.e., a set of two TCI states/pairs of TCI states are indicated according to those specified herein in the present disclosure), the third indicator could be a two-bit indicator.

For example, when the third indicator provided/configured/indicated for the PUCCH-LRR resource (e.g., in the higher layer parameter PUCCH-Config that configures the PUCCH-LRR resource) is set to ‘00’, the UE 116 could determine or spatially relate the spatial-domain transmit filter(s) for transmitting the corresponding PUCCH-LRR—i.e., associated/configured with the third indicator—according to the RS indexes in the RS sets in the first TCI state(s) among the set of TCI states/pairs of TCI states indicated, e.g., by a TCI codepoint, in a beam indication DCI or MAC CE as specified herein in the present disclosure.

For another example, when the third indicator provided/configured/indicated for the PUCCH-LRR resource (e.g., in the higher layer parameter PUCCH-Config that configures the PUCCH-LRR resource) is set to ‘01’, the UE 116 could determine or spatially relate the spatial-domain transmit filter(s) for transmitting the corresponding PUCCH-LRR—i.e., associated/configured with the third indicator-according to the RS indexes in the RS sets in the second TCI state(s) among the set of TCI states/pairs of TCI states indicated, e.g., by a TCI codepoint, in a beam indication DCI or MAC CE as specified herein in the present disclosure.

Yet for another example, when the third indicator provided/configured/indicated for the PUCCH-LRR resource (e.g., in the higher layer parameter PUCCH-Config that configures the PUCCH-LRR resource) is set to ‘10’, the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or the first and second TCI states respectively among the set of TCI states/pairs of TCI states indicated, e.g., by a TCI codepoint, in a beam indication DCI or MAC CE as specified herein in the present disclosure.

Yet for another example, when the third indicator provided/configured/indicated for the PUCCH-LRR resource (e.g., in the higher layer parameter PUCCH-Config that configures the PUCCH-LRR resource) is set to ‘11’, the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or the second and first TCI states respectively among the set of TCI states/pairs of TCI states indicated, e.g., by a TCI codepoint, in a beam indication DCI or MAC CE as specified herein in the present disclosure.

For transmitting/sending the PUCCH-LRR, the first TCI state(s) or the second TCI state(s) could correspond to a joint DL and UL TCI state provided by TCI-State/DLorJointTCI-State, a separate UL TCI state provided by TCI-State/UL-TCIState, or the separate UL TCI state in a pair of DL and UL TCI states.

In another example, as specified herein in the present disclosure, the higher layers of the UE 116 could declare beam failure(s) for one or more BFD RSs in one or more BFD RS sets associated/corresponding to one or more of the (set of) TCI states/pairs of TCI states indicated, e.g., by a TCI codepoint, in a beam indication DCI or MAC CE as specified herein in the present disclosure. For this example, the UE 116 could determine the spatial-domain transmit filter(s) for transmitting/sending the PUCCH-LRR according to the third indicator provided/configured/indicated to the UE 116 for the PUCCH-LRR, e.g., in the higher layer parameter PUCCH-Config that configures the PUCCH-LRR resource, and also the TCI state(s) associated to the failed BFD RS(s)/BFD RS set(s). For N=2 (i.e., a set of two TCI states/pairs of TCI states are indicated according to those specified herein in the present disclosure), the third indicator could be a two-bit indicator.

For example, when the higher layers of the UE 116 declare beam failure(s) for one or more BFD RSs in one or more BFD RS sets associated/corresponding to the first TCI state(s) among the set of TCI states/pairs of TCI states indicated, e.g., by a TCI codepoint, in a beam indication DCI or MAC CE as specified herein in the present disclosure, and when the first TCI state(s) corresponds to a joint DL and UL TCI state provided by TCI-State/DLorJoint-TCIState or a pair of separate DL and UL TCI states:

In one example, when the third indicator provided/configured/indicated for the PUCCH-LRR resource (e.g., in the higher layer parameter PUCCH-Config that configures the PUCCH-LRR resource) is set to ‘00’, the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the first TCI state(s) could be the joint DL and UL TCI state, or the separate UL TCI state in the pair of DL and UL TCI states, while the second TCI state(s) could be a joint DL and UL TCI state, a separate UL TCI state, or the separate UL TCI state in a pair of DL and UL TCI states.

In another example, when the third indicator provided/configured/indicated for the PUCCH-LRR resource (e.g., in the higher layer parameter PUCCH-Config that configures the PUCCH-LRR resource) is set to '01', the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the first TCI state(s) could be the joint DL and UL TCI state, or the separate UL TCI state in the pair of DL and UL TCI states, while the second TCI state(s) could be a joint DL and UL TCI state, a separate UL TCI state, or the separate UL TCI state in a pair of DL and UL TCI states.

In yet another example, when the third indicator provided/configured/indicated for the PUCCH-LRR resource (e.g., in the higher layer parameter PUCCH-Config that configures the PUCCH-LRR resource) is set to '10', the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or the first and second TCI states respectively among the set of TCI states/pairs of TCI states indicated, e.g., by a TCI codepoint, in a beam indication DCI or MAC CE as specified herein in the present disclosure. For this design example, the first TCI state(s) could be the joint DL and UL TCI state, or the separate UL TCI state in the pair of DL and UL TCI states, while the second TCI state(s) could be a joint DL and UL TCI state, a separate UL TCI state, or the separate UL TCI state in a pair of DL and UL TCI states.

In yet another example, when the third indicator provided/configured/indicated for the PUCCH-LRR resource (e.g., in the higher layer parameter PUCCH-Config that configures the PUCCH-LRR resource) is set to '11', the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or the second and first TCI states respectively among the set of TCI states/pairs of TCI states indicated, e.g., by a TCI codepoint, in a beam indication DCI or MAC CE as specified herein in the present disclosure. For this design example, the first TCI state(s) could be the joint DL and UL TCI state, or the separate UL TCI state in the pair of DL and UL TCI states, while the second TCI state(s) could be a joint DL and UL TCI state, a separate UL TCI state, or the separate UL TCI state in a pair of DL and UL TCI states.

In addition, when the higher layers of the UE 116 declare beam failure(s) for one or more BFD RSs in one or more BFD RS sets associated/corresponding to the first TCI state(s) among the set of TCI states/pairs of TCI states indicated, e.g., by a TCI codepoint, in a beam indication DCI or MAC CE as specified herein in the present disclosure, and when the first TCI state(s) is a separate DL TCI state provided by DLorJoint-TCI-State or TCI-State, the UE 116 could determine or spatially relate the spatial-domain transmit filter(s) for transmitting the corresponding PUCCH-LRR—i.e., associated/configured with the third indicator-according to the RS indexes in the RS sets in the second TCI state(s) among the set of TCI states/pairs of TCI states indicated, e.g., by a TCI codepoint, in a beam indication DCI or MAC CE as specified herein in the present disclosure, regardless of the value of the third indicator provided/configured/indicated for the PUCCH-LRR resource (e.g., in the higher layer parameter PUCCH-Config that configures the PUCCH-LRR resource) or when the third indicator provided/configured/indicated for the PUCCH-LRR resource (e.g., in the higher layer parameter PUCCH-Config that configures the PUCCH-LRR resource) is set to '00', '01', '10', or '11', wherein the second TCI state(s) could be a joint DL and UL TCI state, a separate UL TCI state, or the separate UL TCI state in a pair of DL and UL TCI states.

For another example, when the higher layers of the UE 116 declare beam failure(s) for one or more BFD RSs in one or more BFD RS sets associated/corresponding to the second TCI state(s) among the set of TCI states/pairs of TCI states indicated, e.g., by a TCI codepoint, in a beam indication DCI or MAC CE as specified herein in the present disclosure, and when the second TCI state(s) corresponds to a joint DL and UL TCI state provided by TCI-State/DLorJoint-TCIState or a pair of separate DL and UL TCI states:

In one example, when the third indicator provided/configured/indicated for the PUCCH-LRR resource (e.g., in the higher layer parameter PUCCH-Config that configures the PUCCH-LRR resource) is set to '01', the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the second TCI state(s) could be the joint DL and UL TCI state, or the separate UL TCI state in the pair of DL and UL TCI states, while the first TCI state(s) could be a joint DL and UL TCI state, a separate UL TCI state, or the separate UL TCI state in a pair of DL and UL TCI states.

In another example, when the third indicator provided/configured/indicated for the PUCCH-LRR resource (e.g., in the higher layer parameter PUCCH-Config that configures the PUCCH-LRR resource) is set to '00', the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the second TCI state(s) could be the joint DL and UL TCI state, or the separate UL TCI state in the pair of DL and UL TCI states, while the first TCI state(s) could be a joint DL and UL TCI state, a separate UL TCI state, or the separate UL TCI state in a pair of DL and UL TCI states.

In yet another example, when the third indicator provided/configured/indicated for the PUCCH-LRR resource (e.g., in the higher layer parameter PUCCH-Config that configures the PUCCH-LRR resource) is set to '10', the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or the first and second TCI states respectively among the set of TCI states/pairs of TCI states indicated, e.g., by a TCI codepoint, in a beam indication DCI or MAC CE as specified herein in the present disclosure. For this design example, the second TCI state(s) could be the joint DL and UL TCI state, or the separate UL TCI state in the pair of DL and UL TCI states, while the first TCI state(s) could be a joint DL and UL TCI state, a separate UL TCI state, or the separate UL TCI state in a pair of DL and UL TCI states.

In yet another example, when the third indicator provided/configured/indicated for the PUCCH-LRR resource (e.g., in the higher layer parameter PUCCH-Config that configures the PUCCH-LRR resource) is set to '11', the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or the second and first TCI states respectively among the set of TCI states/pairs of TCI states indicated, e.g., by a TCI codepoint, in a beam indication DCI or MAC CE as specified herein in the present disclosure. For this design example, the second TCI state(s) could be the joint DL and UL TCI state, or the separate UL TCI state in the pair of DL and UL TCI states, while the first TCI state(s) could be a joint DL and UL TCI state, a separate UL TCI state, or the separate UL TCI state in a pair of DL and UL TCI states.

In addition, when the higher layers of the UE 116 declare beam failure(s) for one or more BFD RSs in one or more BFD RS sets associated/corresponding to the second TCI state(s) among the set of TCI states/pairs of TCI states indicated, e.g., by a TCI codepoint, in a beam indication DCI or MAC CE as specified herein in the present disclosure, and when the second TCI state(s) is a separate DL TCI state provided by DLorJoint-TCIState or TCI-State, the UE 116 could determine or spatially relate the spatial-domain transmit filter(s) for transmitting the corresponding PUCCH-LRR—i.e., associated/configured with the third indicator—according to the RS indexes in the RS sets in the first TCI state(s) among the set of TCI states/pairs of TCI states indicated, e.g., by a TCI codepoint, in a beam indication DCI or MAC CE as specified herein in the present disclosure, regardless of the value of the third indicator provided/configured/indicated for the PUCCH-LRR resource (e.g., in the higher layer parameter PUCCH-Config that configures the PUCCH-LRR resource) or when the third indicator provided/configured/indicated for the PUCCH-LRR resource (e.g., in the higher layer parameter PUCCH-Config that configures the PUCCH-LRR resource) is set to '00', '01', '10', or '11', wherein the first TCI state(s) could be a joint DL and UL TCI state, a separate UL TCI state, or the separate UL TCI state in a pair of DL and UL TCI states.

Yet for another example, when the higher layers of the UE 116 declare beam failure(s) for one or more BFD RSs in one or more BFD RS sets associated/corresponding to the first TCI state(s) and the second TCI state(s) among the set of TCI states/pairs of TCI states indicated, e.g., by a TCI codepoint, in a beam indication DCI or MAC CE as specified herein in the present disclosure, and when the first TCI state(s) or the second TCI state(s) corresponds to a joint DL and UL TCI state provided by TCI-State/DLorJoint-TCI-State or a separate DL TCI state provided by TCI-State/DLorJoint-TCIState or a pair of separate DL and UL TCI states:

In one example, when the third indicator provided/configured/indicated for the PUCCH-LRR resource (e.g., in the higher layer parameter PUCCH-Config that configures the PUCCH-LRR resource) is set to '00', the UE 116 could determine or spatially relate the spatial-domain transmit filter(s) for transmitting the corresponding PUCCH-LRR—i.e., associated/configured with the third indicator—according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the first TCI state(s) or the second TCI state(s) could be the joint DL and UL TCI state or the separate UL TCI state in the pair of DL and UL TCI states.

In another example, when the third indicator provided/configured/indicated for the PUCCH-LRR resource (e.g., in the higher layer parameter PUCCH-Config that configures the PUCCH-LRR resource) is set to '01', the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the first TCI state(s) or the second TCI state(s) could be the joint DL and UL TCI state or the separate UL TCI state in the pair of DL and UL TCI states.

In yet another example, when the third indicator provided/configured/indicated for the PUCCH-LRR resource (e.g., in the higher layer parameter PUCCH-Config that configures the PUCCH-LRR resource) is set to '10', the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or the first and second TCI states respectively among the set of TCI states/pairs of TCI states indicated, e.g., by a TCI codepoint, in a beam indication DCI or MAC CE as specified herein in the present disclosure. For this design example, the first TCI state(s) or the second TCI state(s) could be the joint DL and UL TCI state or the separate UL TCI state in the pair of DL and UL TCI states.

In yet another example, when the third indicator provided/configured/indicated for the PUCCH-LRR resource (e.g., in the higher layer parameter PUCCH-Config that configures the PUCCH-LRR resource) is set to '11', the UE 116 could determine or spatially relate the spatial-domain transmit filter(s) for transmitting the corresponding PUCCH-LRR—i.e., associated/configured with the third indicator-according to the RS indexes in the RS sets in the first TCI state(s) or the second TCI state(s) or the second and first TCI states respectively among the set of TCI states/pairs of TCI states indicated, e.g., by a TCI codepoint, in a beam indication DCI or MAC CE as specified herein in the present disclosure. For this design example, the first TCI state(s) or the second TCI state(s) could be the joint DL and UL TCI state, or the separate UL TCI state in the pair of DL and UL TCI states.

In yet another example, as specified herein in the present disclosure, the higher layers of the UE 116 could declare beam failure(s) for one or more BFD RSs in one or more BFD RS sets associated/corresponding to one or more of the (set of) TCI states/pairs of TCI states indicated, e.g., by a TCI codepoint, in a beam indication DCI or MAC CE as specified herein in the present disclosure. For this example, the UE 116 could determine the spatial-domain transmit filter(s) for transmitting/sending the PUCCH-LRR according to the spatial relation(s) configured/indicated/provided for the PUCCH-LRR resource according to one or more of the following.

For example, when the third indicator provided/configured/indicated for the PUCCH-LRR resource (e.g., in the higher layer parameter PUCCH-Config that configures the PUCCH-LRR resource) is set to '11' or 'none', which indicates that none of the indicated TCI states could be used/applied for the PUCCH transmission(s), the UE 116 could determine the spatial-domain transmit filter(s) for transmitting/sending the PUCCH-LRR according to the spatial relation(s)—e.g., the RS(s) in the RS set(s) provided/configured/indicated in the higher layer parameter PUCCH-SpatialRelationInfo—for the PUCCH-LRR resource.

For another example, when both of the first and second TCI states among the set of TCI states/pairs of TCI states indicated, e.g., by a TCI codepoint, in a beam indication DCI or MAC CE as specified herein in the present disclosure correspond to separate DL TCI states each provided by TCI-State/DLorJoint-TCI-State, regardless of the value of the third indicator provided/configured/indicated for the PUCCH-LRR resource (e.g., in the higher layer parameter PUCCH-Config that configures the PUCCH-LRR resource) or when the third indicator provided/configured/indicated for the PUCCH-LRR resource (e.g., in the higher layer parameter PUCCH-Config that configures the PUCCH-LRR resource) is set to '00', '01', '10' or '11', the UE 116 could determine the spatial-domain transmit filter(s) for transmitting/sending the PUCCH-LRR according to the spatial relation(s)—e.g., the RS(s) in the RS set(s) provided/configured/indicated in the higher layer parameter PUCCH-SpatialRelationInfo—for the PUCCH-LRR resource.

Yet for another example, when the first TCI state(s) or the second TCI state(s) among the set of TCI states/pairs of TCI states indicated, e.g., by a TCI codepoint, in a beam indication DCI or MAC CE as specified herein in the present disclosure corresponds to a joint DL and UL TCI state provided by TCI-State/DLorJointTCI-State or a separate DL TCI state provided by TCI-State/DLorJointTCI-State, and when the UE 116 declares beam failure(s) for one or more BFD RSs in one or more BFD RS sets associated/corresponding to both of the first and second indicated TCI states as specified herein in the present disclosure, regardless of the value of the third indicator provided/configured/indicated for the PUCCH-LRR resource (e.g., in the higher layer parameter PUCCH-Config that configures the PUCCH-LRR resource) or when the third indicator provided/configured/indicated for the PUCCH-LRR resource (e.g., in the higher layer parameter PUCCH-Config that configures the PUCCH-LRR resource) is set to '00', '01', '10' or '11', the UE 116 could determine the spatial-domain transmit filter(s) for transmitting/sending the PUCCH-LRR according to the spatial relation(s)—e.g., the RS(s) in the RS set(s) provided/configured/indicated in the higher layer parameter PUCCH-SpatialRelationInfo—for the PUCCH-LRR resource.

Figure 14:
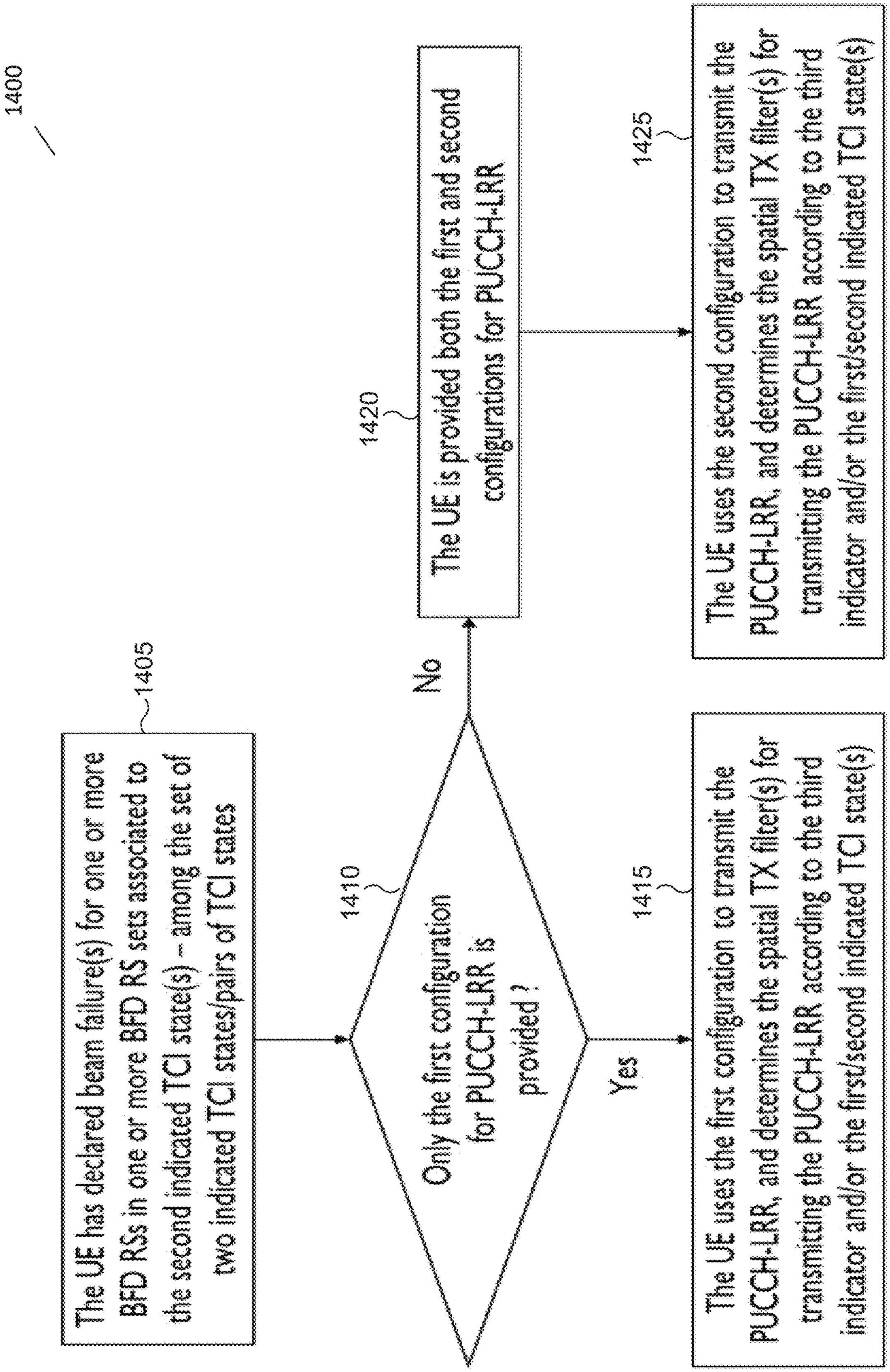
FIG. 14 illustrates a flowchart of an example UE procedure for transmitting a physical uplink control channel-link recovery request (PUCCH-LRR) according to embodiments of the present disclosure.

FIG. 14 illustrates a flowchart of an example UE procedure 1400 for transmitting a PUCCH-LRR according to embodiments of the present disclosure. For example, procedure 1400 can be performed by the UE 113 of FIG. 1. This example is for illustration only and other embodiments can be used without departing from the scope of the present disclosure.

The procedure begins in 1405, the UE 116 has declared beam failure(s) for one or more BFD RSs in one or more BFD RS sets associated to the second indicated TCI state(s)—among the set of two indicated TCI states/pairs of TCI states. In 1410, only the first configuration for PUCCH-LRR may be provided. If the first configuration is provided, in 1415, the UE 116 uses the first configuration to transmit the PUCCH-LRR and determines the spatial TX filter(s) for transmitting the PUCCH-LRR according to the third indicator and/or the first/second indicated TCI state(s). If the first configuration is not provided, in 1420, the UE 116 is provided both the first and second configurations for PUCCH-LRR. In 1425, the UE 116 uses the second configuration to transmit the PUCCH-LRR and determines the spatial TX filter(s) for transmitting the PUCCH-LRR according to the third indicator and/or the first/second indicated TCI state(s).

In one embodiment, when/if a UE is indicated/provided/configured by the network 130, e.g., via a beam indication MAC CE or a beam indication DCI (e.g., via one or more TCI codepoints of one or more TCI fields in the corresponding DCI 1_1/1_2 with or without DL assignment), a set of at least two (e.g., N=2) TCI states/pairs of TCI states for receiving/transmitting at least UE-dedicated DL/UL channels/signals, and/or when/if the PCell or the PSCell is associated with two BFD RS sets q0_0 and q0_1 (and therefore, with sets q1_0 and q1_1) as specified herein in the present disclosure, and/or when/if the UE 116 is provided/indicated/configured by the network 130, e.g., via higher layer RRC signaling/parameter and/or MAC CE command and/or dynamic DCI based L1 signaling, one or more of the first, second, third, and fourth indicators as specified herein in the present disclosure, indicating one or more of the indicated TCI states for PDCCH reception(s), PDSCH reception(s), PUCCH transmission(s) and/or PUSCH transmission(s), the UE 116 could be provided/configured/indicated by the network 130, e.g., via higher layer RRC signaling/parameter and/or MAC CE command and/or dynamic DCI based L1 signaling, a first configuration for PUCCH transmission with a link recovery request (LRR) for the UE 116 to transmit PUCCH, e.g. when the UE 116 has declared beam failure for one or more BFD RSs in one or more BFD RS sets associated to one or more of the indicated TCI states as specified herein in the present disclosure, and when/if the UE 116 provides twoLRRcapability, a second configuration for PUCCH transmission with a LRR for the UE 116 to transmit PUCCH, e.g., when the UE 116 has declared beam failure for one or more BFD RSs in one or more BFD RS sets associated to one or more of the indicated TCI states as specified herein in the present disclosure.

In one example, if the UE 116 is provided only the first configuration for PUCCH-LRR, and if the higher layers of the UE 116 declare beam failure(s) for one or more BFD RSs in one or more BFD RS sets associated to the first indicated TCI state(s) and/or the second indicated TCI state(s) as specified herein in the present disclosure, the UE 116 could send/transmit the PUCCH-LRR according to the first configuration and determine the spatial-domain transmit filter(s) for sending/transmitting the PUCCH-LRR according to the third indicator provided/configured/indicated to the UE 116 for the PUCCH-LRR resource, e.g., in the higher layer parameter PUCCH-Config that configures the PUCCH-LRR resource, and the set of TCI states/pairs of TCI states indicated, e.g., by a TCI codepoint, in a beam indication DCI or MAC CE as specified herein in the present disclosure, according to one or more of the design examples specified herein in the present disclosure.

In one example, if the UE 116 is provided both the first and second configurations for PUCCH-LRR:

For example, when the higher layers of the UE 116 declare beam failure(s) for one or more BFD RSs in one or more BFD RS sets associated/corresponding to the first TCI state(s) among the set of TCI states/pairs of TCI states indicated, e.g., by a TCI codepoint, in a beam indication DCI or MAC CE as specified herein in the present disclosure, the UE 116 could use the first configuration to send/transmit a first PUCCH-LRR, and determine the spatial-domain transmit filter(s) for sending/transmitting the first PUCCH-LRR according to the third indicator provided/configured/indicated to the UE 116 for the first PUCCH-LRR resource, e.g., in the higher layer parameter PUCCH-Config that configures the first PUCCH-LRR resource, and the set of TCI states/pairs of TCI states indicated, e.g., by a TCI codepoint, in a beam indication DCI or MAC CE as specified herein in the present disclosure, according to one or more of the design examples specified herein in the present disclosure. When the higher layers of the UE 116 declare beam failure(s) for one or more BFD RSs in one or more BFD RS sets associated/corresponding to the second TCI state(s) among the set of TCI states/pairs of TCI states indicated, e.g., by a TCI codepoint, in a beam indication DCI or MAC CE as specified herein in the present disclosure, the UE 116 could use the second configuration to send/transmit a second PUCCH-LRR, and determine the spatial-domain transmit filter(s) for sending/transmitting the second PUCCH-LRR according to the third indicator provided/configured/indicated to the UE 116 for the second PUCCH-LRR resource, e.g., in the higher layer parameter PUCCH-Config that configures the second PUCCH-LRR resource, and the set of TCI states/pairs of TCI states indicated, e.g., by a TCI codepoint, in a beam indication DCI or MAC CE as specified herein in the present disclosure, according to one or more of the design examples specified herein in the present disclosure.

For another example, when the higher layers of the UE 116 declare beam failure(s) for one or more BFD RSs in one or more BFD RS sets associated/corresponding to the first TCI state(s) among the set of TCI states/pairs of TCI states indicated, e.g., by a TCI codepoint, in a beam indication DCI or MAC CE as specified herein in the present disclosure, the UE 116 could use the second configuration to send/transmit a first PUCCH-LRR, and determine the spatial-domain transmit filter(s) for sending/transmitting the first PUCCH-LRR according to the third indicator provided/configured/indicated to the UE 116 for the first PUCCH-LRR resource, e.g., in the higher layer parameter PUCCH-Config that configures the first PUCCH-LRR resource, and the set of TCI states/pairs of TCI states indicated, e.g., by a TCI codepoint, in a beam indication DCI or MAC CE as specified herein in the present disclosure, according to one or more of the design examples specified herein in the present disclosure. When the higher layers of the UE 116 declare beam failure(s) for one or more BFD RSs in one or more BFD RS sets associated/corresponding to the second TCI state(s) among the set of TCI states/pairs of TCI states indicated, e.g., by a TCI codepoint, in a beam indication DCI or MAC CE as specified herein in the present disclosure, the UE 116 could use the first configuration to send/transmit a second PUCCH-LRR and determine the spatial-domain transmit filter(s) for sending/transmitting the second PUCCH-LRR according to the third indicator provided/configured/indicated to the UE 116 for the second PUCCH-LRR resource, e.g., in the higher layer parameter PUCCH-Config that configures the second PUCCH-LRR resource, and the set of TCI states/pairs of TCI states indicated, e.g., by a TCI codepoint, in a beam indication DCI or MAC CE as specified herein in the present disclosure, according to one or more of the design examples specified herein in the present disclosure.

Yet for another example, when the higher layers of the UE 116 declare beam failure(s) for one or more BFD RSs in one or more BFD RS sets associated/corresponding to the first TCI state(s) and the second TCI state(s) among the set of TCI states/pairs of TCI states indicated, e.g., by a TCI codepoint, in a beam indication DCI or MAC CE as specified herein in the present disclosure, the UE 116 could use the first configuration to send/transmit a first PUCCH-LRR and determine the spatial-domain transmit filter(s) for sending/transmitting the first PUCCH-LRR according to the third indicator provided/configured/indicated to the UE 116 for the first PUCCH-LRR resource, e.g., in the higher layer parameter PUCCH-Config that configures the first PUCCH-LRR resource, and the set of TCI states/pairs of TCI states indicated, e.g., by a TCI codepoint, in a beam indication DCI or MAC CE as specified herein in the present disclosure, according to one or more of the design examples specified herein in the present disclosure, and/or the UE 116 could use the second configuration to send/transmit a second PUCCH-LRR and determine the spatial-domain transmit filter(s) for sending/transmitting the second PUCCH-LRR according to the third indicator provided/configured/indicated to the UE 116 for the second PUCCH-LRR resource, e.g., in the higher layer parameter PUCCH-Config that configures the second PUCCH-LRR resource, and the set of TCI states/pairs of TCI states indicated, e.g., by a TCI codepoint, in a beam indication DCI or MAC CE as specified herein in the present disclosure, according to one or more of the design examples specified herein in the present disclosure.

A BFD RS set could be associated/corresponding to one or more TCI states-among the set of one or more (e.g., N=2) TCI states/pairs of TCI states indicated, e.g., by a TCI codepoint, in a beam indication DCI or MAC CE as specified herein in the present disclosure-indicated for at least UE-dedicated DL and/or UL channels/signals. For example, a BFD RS set could include periodic CSI-RS resource configuration indexes or SSB indexes (also referred to as BFD RS resource indexes) with same values as the RS indexes in the RS sets in the first TCI state(s) and/or the second TCI state(s) (e.g., for N=2)—among the set of one or more (e.g., N=2) TCI states/pairs of TCI states indicated, e.g., by a TCI codepoint, in a beam indication DCI or MAC CE as specified herein in the present disclosure; for this case, whether the first TCI state(s) and/or the second TCI state(s) are used/applied could be determined according to one or more of the following: (1) fixed in the system specification(s), (2) configured/provided/indicated by the network 130, e.g., via higher layer RRC signaling/parameter and/or MAC CE command and/or dynamic DCI based L1 signaling, and (3) depending on the first, second, third, and/or fourth indicators as specified herein in the present disclosure and/or their association(s) to the first, second, third, and/or fourth indicators. For another example, the UE 116 could assess the radio link quality(s) of a RRC configured and/or MAC CE indicated BFD RS set according to the RS indexes in the RS sets in the first TCI state(s) and/or the second TCI state(s) (e.g., for N=2)—among the set of one or more (e.g., N=2) TCI states/pairs of TCI states indicated, e.g., by a TCI codepoint, in a beam indication DCI or MAC CE as specified herein in the present disclosure; for this case, whether the first TCI state(s) and/or the second TCI state(s) are used/applied could be determined according to one or more of the following: (1) fixed in the system specification(s), (2) configured/provided/indicated by the network 130, e.g., via higher layer RRC signaling/parameter and/or MAC CE command and/or dynamic DCI based L1 signaling, and (3) depending on the first, second, third, and/or fourth indicators as specified herein in the present disclosure and/or their association(s) to the first, second, third, and/or fourth indicators. For configuring/determining one or more BFD RSs in one or more BFD RS sets as specified herein in the present disclosure, the first TCI state(s) or the second TCI state(s)—as specified herein in the present disclosure-could correspond to a joint DL and UL TCI state provided by TCI-State/DLorJointTCI-State, a separate DL TCI state provided by TCI-State/DLorJointTCI-State, or the separate DL TCI state in a pair of DL and UL TCI states. Throughout the present disclosure, if the radio link quality of one or more BFD RSs in one or more BFD RS sets (or equivalently, the radio link quality of one or more BFD RS sets) is worse than a threshold (e.g., Qout, LR), the (higher layers of) UE could declare beam failure(s) for the one or more BFD RSs in the one or more BFD RS sets (or equivalently, for the one or more BFD RS sets).

Figure 15:
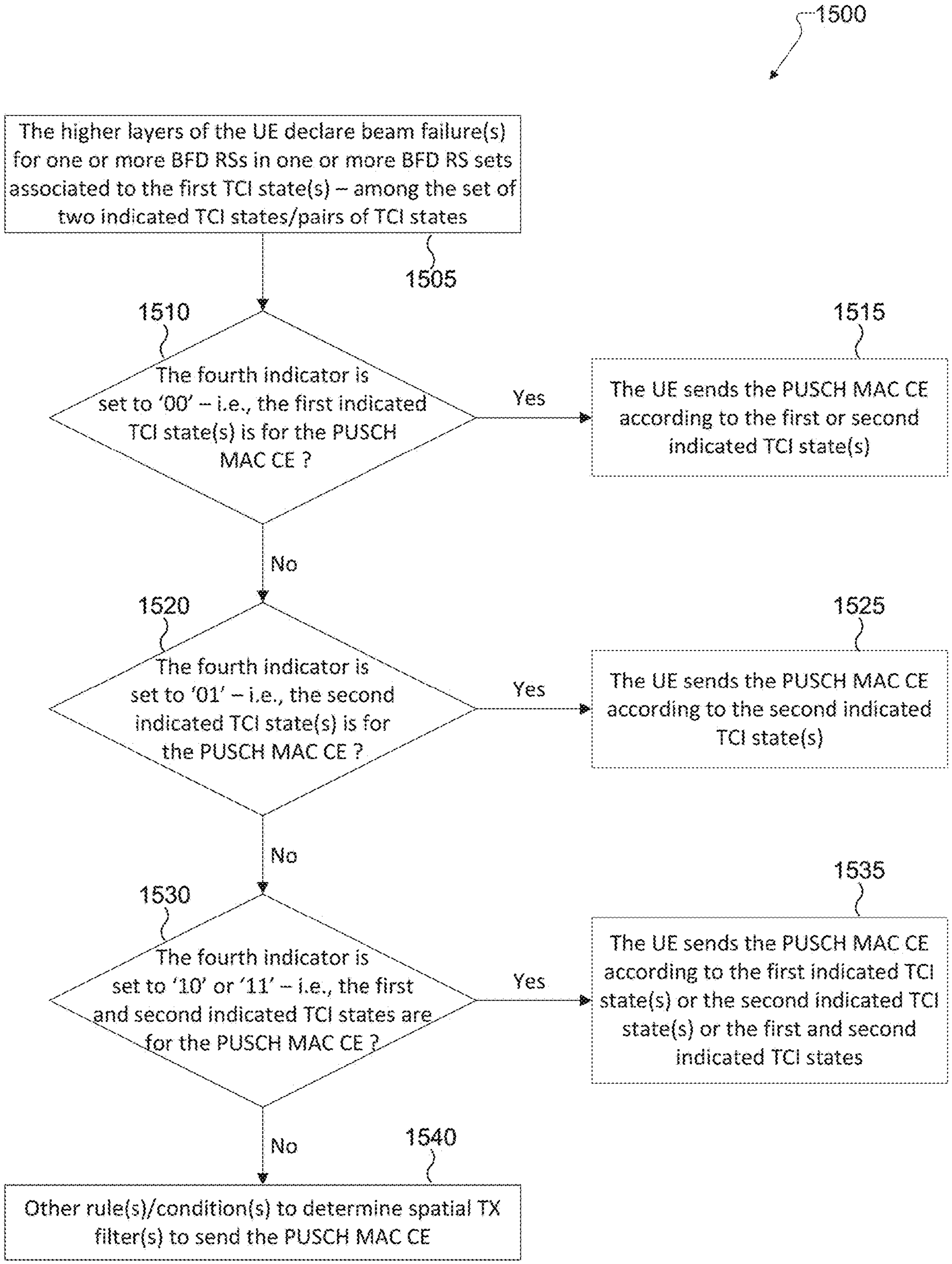
FIG. 15 illustrates a flowchart of an example UE procedure for transmitting a BFR physical uplink shared channel (PUSCH) medium access control (MAC) control element (CE) according to embodiments of the present disclosure.

FIG. 15 illustrates a flowchart of an example UE procedure 1500 for transmitting a BFR PUSCH MAC CE according to embodiments of the present disclosure. For example, procedure 1500 may be performed by the UE 114 of FIG. 1. This example is for illustration only and other embodiments can be used without departing from the scope of the present disclosure.

The procedure begins in 1505, the higher layers of the UE 116 declare beam failure(s) for one or more BFD RSs in one or more BFD RS sets associated to the first TCI state(s)—among the set of two indicated TCI states/pairs of TCI states. In 1510, the value of the fourth indicator may be set to '00'—i.e., the first indicated TCI state(s) is for the PUSCH MAC CE. If the value is set to '00', in 1515, the UE 116 sends the PUSCH MAC CE according to the first or second indicated TCI state(s). If the value is not set to '00', in 1520, the fourth indicator may be set to '01'—i.e., the second indicated TCI state(s) is for the PUSCH MAC CE. If the value is set to '01', in 1525, the UE 116 sends the PUSCH MAC CE according to the second indicated TCI state(s). If the value is not set to '01', in 1530, the value of the fourth indicator may be set to '10' or '11'—i.e., the first and second indicated TCI states are for the PUSCH MAC CE. If the value is set to '10' or '11', in 1535, the UE 116 sends the PUSCH MAC CE according to the first indicated TCI state(s) or the second indicated TCI state(s) or the first and second indicated TCI states. If the value is not set to '10' or '11', in 1540, other rule(s)/condition(s) to determine spatial TX filter(s) to send the PUSCH MAC CE are used.

In one embodiment, a UE could provide in a PUSCH MAC CE information related to BFD RS(s)/BFD RS set(s) having radio link quality worse than Qout, LR, presence of one or more new beams, information related to the one or more new beams, etc. As specified herein in the present disclosure, a UE could determine the spatial-domain transmit filter(s) to transmit an uplink signal/data on PUSCH according to the fourth indicator provided/configured/indicated to the UE 116 for the PUSCH, e.g., in the (uplink) DCI that schedules the PUSCH transmission, and the set of TCI states/pairs of TCI states indicated, e.g., by a TCI codepoint, in a beam indication DCI or MAC CE as specified herein in the present disclosure. For instance, for N=2 (i.e., a set of two TCI states/pairs of TCI states are indicated), the fourth indicator could be a two-bit indicator with '00' indicating that the UE 116 could determine or spatially relate the spatial-domain transmit filter(s) for transmitting the corresponding PUSCH(s)—i.e., associated/configured with the fourth indicator—according to the RS indexes in the RS sets in the first TCI state(s) among the set of TCI states/pairs of TCI states indicated, e.g., by a TCI codepoint, in a beam indication DCI or MAC CE as specified herein in the present disclosure. '01' indicates that the UE 116 could determine or spatially relate the spatial-domain transmit filter(s) for transmitting the corresponding PUSCH(s)—i.e., associated/configured with the fourth indicator—according to the RS indexes in the RS sets in the second TCI state(s) among the set of TCI states/pairs of TCI states indicated, e.g., by a TCI codepoint, in a beam indication DCI or MAC CE as specified herein in the present disclosure. '10' indicates that the UE 116 could determine or spatially relate the spatial-domain transmit filter(s) for transmitting the corresponding PUSCH(s)—i.e., associated/configured with the fourth indicator—according to the RS indexes in the RS sets in the first and second TCI states respectively among the set of TCI states/pairs of TCI states indicated, e.g., by a TCI codepoint, in a beam indication DCI or MAC CE as specified herein in the present disclosure. '11' indicates that the UE 116 could determine or spatially relate the spatial-domain transmit filter(s) for transmitting the corresponding PUSCH(s)—i.e., associated/configured with the fourth indicator—according to the RS indexes in the RS sets in the second and first TCI states respectively among the set of TCI states/pairs of TCI states indicated, e.g., by a TCI codepoint, in a beam indication DCI or MAC CE as specified herein in the present disclosure, or none of the indicated TCI states; in the present disclosure, the first and second PUSCH(s) could correspond to two PUSCH transmission occasions or repetitions in space, time and/or frequency.

- In one example, the UE 116 could determine the spatial-domain transmit filter(s) for transmitting/sending the PUSCH MAC CE according to the fourth indicator provided/configured/indicated to the UE 116 for the PUSCH MAC CE, e.g., in the (uplink) DCI that schedules the PUSCH MAC CE. For N=2 (i.e., a set of two TCI states/pairs of TCI states are indicated according to those specified herein in the present disclosure), the fourth indicator could be a two-bit indicator.
  - For example, when the fourth indicator provided/configured/indicated for the PUSCH MAC CE (e.g., in the (uplink) DCI that schedules the PUSCH MAC CE) is set to '00', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) among the set of TCI states/pairs of TCI states indicated, e.g., by a TCI codepoint, in a beam indication DCI or MAC CE as specified herein in the present disclosure.
  - For another example, when the fourth indicator provided/configured/indicated for the PUSCH MAC CE (e.g., in the (uplink) DCI that schedules the PUSCH MAC CE) is set to '01', the UE 116 could determine or spatially relate the spatial-domain transmit filter(s) for transmitting the corresponding PUSCH MAC CE—i.e., associated/configured with the fourth indicator-according to the RS indexes in the RS sets in the second TCI state(s) among the set of TCI states/pairs of TCI states indicated, e.g., by a TCI codepoint, in a beam indication DCI or MAC CE as specified herein in the present disclosure.
  - Yet for another example, when the fourth indicator provided/configured/indicated for the PUSCH MAC CE (e.g., in the (uplink) DCI that schedules the PUSCH MAC CE) is set to '10', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or the first and second TCI states respectively among the set of TCI states/pairs of TCI states indicated, e.g., by a TCI codepoint, in a beam indication DCI or MAC CE as specified herein in the present disclosure.
  - Yet for another example, when the fourth indicator provided/configured/indicated for the PUSCH MAC CE (e.g., in the (uplink) DCI that schedules the PUSCH MAC CE) is set to '11', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or the second and first TCI states respectively among the set of TCI states/pairs of TCI states indicated, e.g., by a TCI codepoint, in a beam indication DCI or MAC CE as specified herein in the present disclosure.

For transmitting/sending the PUSCH MAC CE, the first TCI state(s) or the second TCI state(s) could correspond to a joint DL and UL TCI state provided by TCI-State/DLorJointTCI-State, a separate UL TCI state provided by TCI-State/UL-TCIState, or the separate UL TCI state in a pair of DL and UL TCI states.

- In another example, as specified herein in the present disclosure, the higher layers of the UE 116 could declare beam failure(s) for one or more BFD RSs in one or more BFD RS sets associated/corresponding to one or more of the (set of) TCI states/pairs of TCI states indicated, e.g., by a TCI codepoint, in a beam indication DCI or MAC CE as specified herein in the present disclosure. For this example, the UE 116 could determine the spatial-domain transmit filter(s) for transmitting/sending the PUSCH MAC CE according to the fourth indicator provided/configured/indicated to the UE 116 for the PUSCH MAC CE, e.g., in the (uplink) DCI that schedules the PUSCH MAC CE, and also the TCI state(s) associated to the failed BFD RS(s)/BFD RS set(s). For N=2 (i.e., a set of two TCI states/pairs of TCI states are indicated according to those specified herein in the present disclosure), the fourth indicator could be a two-bit indicator.
  - For example, when the higher layers of the UE 116 declare beam failure(s) for one or more BFD RSs in one or more BFD RS sets associated/corresponding to the first TCI state(s) among the set of TCI states/pairs of TCI states indicated, e.g., by a TCI codepoint, in a beam indication DCI or MAC CE as specified herein in the present disclosure, and when the first TCI state(s) corresponds to a joint DL and UL TCI state provided by TCI-State/DLorJointTCIState or a pair of separate DL and UL TCI states:
    - In one example, when the fourth indicator provided/configured/indicated for the PUSCH MAC CE (e.g., in the (uplink) DCI that schedules the PUSCH MAC CE) is set to '00', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the first TCI state(s) could be the joint DL and UL TCI state, or the separate UL TCI state in the pair of DL and UL TCI states, while the second TCI state(s) could be a joint DL and UL TCI state, a separate UL TCI state, or the separate UL TCI state in a pair of DL and UL TCI states.

In another example, when the fourth indicator provided/configured/indicated for the PUSCH MAC CE (e.g., in the (uplink) DCI that schedules the PUSCH MAC CE) is set to '01', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the first TCI state(s) could be the joint DL and UL TCI state, or the separate UL TCI state in the pair of DL and UL TCI states, while the second TCI state(s) could be a joint DL and UL TCI state, a separate UL TCI state, or the separate UL TCI state in a pair of DL and UL TCI states.

In yet another example, when the fourth indicator provided/configured/indicated for the PUSCH MAC CE (e.g., in the (uplink) DCI that schedules the PUSCH MAC CE) is set to '10', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or the first and second TCI states respectively among the set of TCI states/pairs of TCI states indicated, e.g., by a TCI codepoint, in a beam indication DCI or MAC CE as specified herein in the present disclosure. For this design example, the first TCI state(s) could be the joint DL and UL TCI state, or the separate UL TCI state in the pair of DL and UL TCI states, while the second TCI state(s) could be a joint DL and UL TCI state, a separate UL TCI state, or the separate UL TCI state in a pair of DL and UL TCI states.

In yet another example, when the fourth indicator provided/configured/indicated for the PUSCH MAC CE (e.g., in the (uplink) DCI that schedules the PUSCH MAC CE) is set to '11', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or the second and first TCI states respectively among the set of TCI states/pairs of TCI states indicated, e.g., by a TCI codepoint, in a beam indication DCI or MAC CE as specified herein in the present disclosure. For this design example, the first TCI state(s) could be the joint DL and UL TCI state, or the separate UL TCI state in the pair of DL and UL TCI states, while the second TCI state(s) could be a joint DL and UL TCI state, a separate UL TCI state, or the separate UL TCI state in a pair of DL and UL TCI states.

In addition, when the higher layers of the UE 116 declare beam failure(s) for one or more BFD RSs in one or more BFD RS sets associated/corresponding to the first TCI state(s) among the set of TCI states/pairs of TCI states indicated, e.g., by a TCI codepoint, in a beam indication DCI or MAC CE as specified herein in the present disclosure, and when the first TCI state(s) is a separate DL TCI state provided by DLorJoint-TCI-State or TCI-State, the UE 116 could determine or spatially relate the spatial-domain transmit filter(s) for transmitting the corresponding PUSCH MAC CE—i.e., associated/configured with the fourth indicator—according to the RS indexes in the RS sets in the second TCI state(s) among the set of TCI states/pairs of TCI states indicated, e.g., by a TCI codepoint, in a beam indication DCI or MAC CE as specified herein in the present disclosure, regardless of the value of the fourth indicator provided/configured/indicated for the PUSCH MAC CE (e.g., in the (uplink) DCI that schedules the PUSCH MAC CE) or when the fourth indicator provided/configured/indicated for the PUSCH MAC CE (e.g., in the (uplink) DCI that schedules the PUSCH MAC CE) is set to '00', '01', '10', or '11', wherein the second TCI state(s) could be a joint DL and UL TCI state, a separate UL TCI state, or the separate UL TCI state in a pair of DL and UL TCI states.

For another example, when the higher layers of the UE 116 declare beam failure(s) for one or more BFD RSs in one or more BFD RS sets associated/corresponding to the second TCI state(s) among the set of TCI states/pairs of TCI states indicated, e.g., by a TCI codepoint, in a beam indication DCI or MAC CE as specified herein in the present disclosure, and when the second TCI state(s) corresponds to a joint DL and UL TCI state provided by TCI-State/DLorJoint-TCIState or a pair of separate DL and UL TCI states:

In one example, when the fourth indicator provided/configured/indicated for the PUSCH MAC CE (e.g., in the (uplink) DCI that schedules the PUSCH MAC CE) is set to '01', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the second TCI state(s) could be the joint DL and UL TCI state, or the separate UL TCI state in the pair of DL and UL TCI states, while the first TCI state(s) could be a joint DL and UL TCI state, a separate UL TCI state, or the separate UL TCI state in a pair of DL and UL TCI states.

In another example, when the fourth indicator provided/configured/indicated for the PUSCH MAC CE (e.g., in the (uplink) DCI that schedules the PUSCH MAC CE) is set to '00', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the second TCI state(s) could be the joint DL and UL TCI state, or the separate UL TCI state in the pair of DL and UL TCI states, while the first TCI state(s) could be a joint DL and UL TCI state, a separate UL TCI state, or the separate UL TCI state in a pair of DL and UL TCI states.

In yet another example, when the fourth indicator provided/configured/indicated for the PUSCH MAC CE (e.g., in the (uplink) DCI that schedules the PUSCH MAC CE) is set to '10', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or the first and second TCI states respectively among the set of TCI states/pairs of TCI states indicated, e.g., by a TCI codepoint, in a beam indication DCI or MAC CE as specified herein in the present disclosure. For this design example, the second TCI state(s) could be the joint DL and UL TCI state, or the separate UL TCI state in the pair of DL and UL TCI states, while the first TCI state(s) could be a joint DL and UL TCI state, a separate UL TCI state, or the separate UL TCI state in a pair of DL and UL TCI states.

In yet another example, when the fourth indicator provided/configured/indicated for the PUSCH MAC CE (e.g., in the (uplink) DCI that schedules the PUSCH MAC CE) is set to '11', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or the second and first TCI states respectively among the set of TCI states/pairs of TCI states indicated, e.g., by a TCI codepoint, in a beam indication DCI or MAC CE as specified herein in the present disclosure. For this design example, the second TCI state(s) could be the joint DL and UL TCI state, or the separate UL TCI state in the pair of DL and UL TCI states, while the first TCI state(s) could be a joint DL and UL TCI state, a separate UL TCI state, or the separate UL TCI state in a pair of DL and UL TCI states.

In addition, when the higher layers of the UE 116 declare beam failure(s) for one or more BFD RSs in one or more BFD RS sets associated/corresponding to the second TCI state(s) among the set of TCI states/pairs of TCI states indicated, e.g., by a TCI codepoint, in a beam indication DCI or MAC CE as specified herein in the present disclosure, and when the second TCI state(s) is a separate DL TCI state provided by DLorJoint-TCIState or TCI-State, the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) among the set of TCI states/pairs of TCI states indicated, e.g., by a TCI codepoint, in a beam indication DCI or MAC CE as specified herein in the present disclosure, regardless of the value of the fourth indicator provided/configured/indicated for the PUSCH MAC CE (e.g., in the (uplink) DCI that schedules the PUSCH MAC CE) or when the fourth indicator provided/configured/indicated for the PUSCH MAC CE (e.g., in the (uplink) DCI that schedules the PUSCH MAC CE) is set to '00', '01', '10', or '11', wherein the first TCI state(s) could be a joint DL and UL TCI state, a separate UL TCI state, or the separate UL TCI state in a pair of DL and UL TCI states.

Yet for another example, when the higher layers of the UE 116 declare beam failure(s) for one or more BFD RSs in one or more BFD RS sets associated/corresponding to the first TCI state(s) and the second TCI state(s) among the set of TCI states/pairs of TCI states indicated, e.g., by a TCI codepoint, in a beam indication DCI or MAC CE as specified herein in the present disclosure, and when the first TCI state(s) or the second TCI state(s) corresponds to a joint DL and UL TCI state provided by TCI-State/DLorJoint-TCI-State or a separate DL TCI state provided by TCI-State/DLorJoint-TCIState or a pair of separate DL and UL TCI states:

In one example, when the fourth indicator provided/configured/indicated for the PUSCH MAC CE (e.g., in the (uplink) DCI that schedules the PUSCH MAC CE) is set to '00', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the first TCI state(s) or the second TCI state(s) could be the joint DL and UL TCI state or the separate UL TCI state in the pair of DL and UL TCI states.

In another example, when the fourth indicator provided/configured/indicated for the PUSCH MAC CE (e.g., in the (uplink) DCI that schedules the PUSCH MAC CE) is set to '01', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or both of the first and second TCI states among the set of TCI states/pairs of TCI states indicated, e.g., by a TCI codepoint, in a beam indication DCI or MAC CE as specified herein in the present disclosure. For this design example, the first TCI state(s) or the second TCI state(s) could be the joint DL and UL TCI state or the separate UL TCI state in the pair of DL and UL TCI states.

In yet another example, when the fourth indicator provided/configured/indicated for the PUSCH MAC CE (e.g., in the (uplink) DCI that schedules the PUSCH MAC CE) is set to '10', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or the first and second TCI states respectively among the set of TCI states/pairs of TCI states indicated, e.g., by a TCI codepoint, in a beam indication DCI or MAC CE as specified herein in the present disclosure. For this design example, the first TCI state(s) or the second TCI state(s) could be the joint DL and UL TCI state or the separate UL TCI state in the pair of DL and UL TCI states.

In yet another example, when the fourth indicator provided/configured/indicated for the PUSCH MAC CE (e.g., in the (uplink) DCI that schedules the PUSCH MAC CE) is set to '11', the UE 116 could determine or spatially relate the spatial-domain transmit filter(s) for transmitting the corresponding PUSCH MAC CE—i.e., associated/configured with the fourth indicator-according to the RS indexes in the RS sets in the first TCI state(s) or the second TCI state(s) or the second and first TCI states respectively among the set of TCI states/pairs of TCI states indicated, e.g., by a TCI codepoint, in a beam indication DCI or MAC CE as specified herein in the present disclosure. For this design example, the first TCI state(s) or the second TCI state(s) could be the joint DL and UL TCI state, or the separate UL TCI state in the pair of DL and UL TCI states.

In yet another example, as specified herein in the present disclosure, the higher layers of the UE 116 could declare beam failure(s) for one or more BFD RSs in one or more BFD RS sets associated/corresponding to one or more of the (set of) TCI states/pairs of TCI states indicated, e.g., by a TCI codepoint, in a beam indication DCI or MAC CE as specified herein in the present disclosure. For this example, the UE 116 could determine the spatial-domain transmit filter(s) for transmitting/sending the PUSCH MAC CE according to the SRS resource indicator (SRI) configured/indicated/provided for the PUSCH MAC CE (e.g., in the corresponding scheduling (uplink) DCI) according to one or more of the following.

For example, when the fourth indicator provided/configured/indicated for the PUSCH MAC CE (e.g., in the (uplink) DCI that schedules the PUSCH MAC CE) is set to '11' or 'none', which indicates that none of the indicated TCI states could be used/applied for the PUSCH MAC CE, the UE 116 could determine the spatial-domain transmit filter(s) for transmitting/sending the PUSCH MAC CE according to the SRI(s)—e.g., provided/configured/indicated in the corresponding scheduling (uplink) DCI—for the PUSCH MAC CE.

For another example, when both of the first and second TCI states among the set of TCI states/pairs of TCI states indicated, e.g., by a TCI codepoint, in a beam indication DCI or MAC CE as specified herein in the present disclosure correspond to separate DL TCI states each provided by TCI-State/DLorJoint-TCI-State, regardless of the value of the fourth indicator provided/configured/indicated for the PUSCH MAC CE (e.g., in the (uplink) DCI that schedules the PUSCH MAC CE) or when the fourth indicator provided/configured/indicated for the PUSCH MAC CE (e.g., in the (uplink) DCI that schedules the PUSCH MAC CE) is set to '00', '01', '10', or '11', the UE 116 could determine the spatial-domain transmit filter(s) for transmitting/sending the PUSCH MAC CE according to the SRI(s)—e.g., provided/configured/indicated in the corresponding scheduling (uplink) DCI—for the PUSCH MAC CE.

Yet for another example, when the first TCI state(s) or the second TCI state(s) among the set of TCI states/pairs of TCI states indicated, e.g., by a TCI codepoint, in a beam indication DCI or MAC CE as specified herein in the present disclosure, corresponds to a joint DL and UL TCI state provided by TCI-State/DLorJointTCI-State or a separate DL TCI state provided by TCI-State/DLorJointTCI-State, and when the UE 116 declares beam failure(s) for one or more BFD RSs in one or more BFD RS sets associated/corresponding to both of the first and second indicated TCI states as specified herein in the present disclosure, regardless of the value of the fourth indicator provided/configured/indicated for the PUSCH MAC CE (e.g., in the (uplink) DCI that schedules the PUSCH MAC CE) or when the fourth indicator provided/configured/indicated for the PUSCH MAC CE (e.g., in the (uplink) DCI that schedules the PUSCH MAC CE) is set to '00', '01', '10', or '11', the UE 116 could determine the spatial-domain transmit filter(s) for transmitting/sending the PUSCH MAC CE according to the SRI(s)—e.g., provided/configured/indicated in the corresponding scheduling (uplink) DCI—for the PUSCH MAC CE.

In the present disclosure, the value(s) of the third indicator for the PUCCH-LRR—e.g., configured/indicated/provided in the higher layer parameter PUCCH-Config that configures the corresponding PUCCH resource for LRR—and the fourth indicator for the PUSCH MAC CE that carries necessary information related to beam(s) having radio link quality worse than a threshold—e.g., configured/indicated/provided in the (uplink) DCI that schedules the PUSCH MAC CE-could be the same (i.e., the UE 116 could determine the spatial-domain transmit filter(s) for transmitting/sending the PUCCH-LRR and the PUSCH MAC CE according to the RS(s) in the RS set(s) in the same indicated TCI state(s)) or different (i.e., the UE 116 could determine the spatial-domain transmit filters for transmitting/sending the PUCCH-LRR and the PUSCH MAC CE according to the RSs in the RS sets in different indicated TCI states).

This disclosure evaluates various design aspects related to sending beam failure recovery request (BFRQ) and information related to beams having radio link quality worse than a threshold in a multi-TRP system, wherein beams/TRPs selection is conducted under the unified TCI framework.

As specified in Rel-17, a unified TCI framework could indicate/include N≥1 DL TCI states and/or M≥1 UL TCI states, wherein the indicated TCI state could be at least one of:

A DL TCI state and/or its corresponding/associated TCI state ID

An UL TCI state and/or its corresponding/associated TCI state ID

A joint DL and UL TCI state and/or its corresponding/associated TCI state ID

Separate DL TCI state and UL TCI state and/or their corresponding/associated TCI state ID(s)

There could be various design options/channels to indicate to the UE 116 a beam (i.e., a TCI state) for the transmission/reception of a PDCCH or a PDSCH. As described in the 3GPP Rel-17:

In one example, a MAC CE could be used to indicate to the UE 116 a beam (i.e., a TCI state and/or a TCI state ID) for the transmission/reception of a PDCCH or a PDSCH.

In another example, a DCI could be used to indicate to the UE 116 a beam (i.e., a TCI state and/or a TCI state ID) for the transmission/reception of a PDCCH or a PDSCH For example, a DL related DCI (e.g., DCI format 1_0, DCI format 1_1 or DCI format 1_2) could be used to indicate to the UE 116 a beam (i.e., a TCI state and/or a TCI state ID) for the transmission/reception of a PDCCH or a PDSCH, wherein the DL related DCI may or may not include a DL assignment.

For another example, an UL related DCI (e.g., DCI format 0_0, DCI format 0_1, DCI format 0_2) could be used to indicate to the UE 116 a beam (i.e., a TCI state and/or a TCI state ID) for the transmission/reception of a PDCCH or a PDSCH, wherein the UL related DCI may or may not include an UL scheduling grant.

Yet for another example, a custom/purpose designed DCI format could be used to indicate to the UE 116 a beam (i.e., a TCI state and/or a TCI state ID) for the transmission/reception of a PDCCH or a PDSCH.

Rel-17 introduced the unified TCI framework, where a unified or master or main TCI state is signaled to the UE 116. The unified or master or main TCI state can be one of:

In case of joint TCI state indication, wherein a same beam is used for DL and UL channels, a joint TCI state that can be used at least for UE-dedicated DL channels and UE-dedicated UL channels.

In case of separate TCI state indication, wherein different beams are used for DL and UL channels, a DL TCI state can be used at least for UE-dedicated DL channels.

In case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

In a (single-DCI based) multi-TRP system, a UE could be indicated/provided/configured by the network 130, e.g., via a beam indication MAC CE or a DCI (e.g., via one or more TCI codepoints of one or more TCI fields in the corresponding DCI 1_1/1_2 with or without DL assignment), a set of one or more (e.g., N>1) TCI states/pairs of TCI states, wherein a TCI state could be a joint DL and UL TCI state or a separate DL TCI state provided by TCI-State/DLorJointTCI-State, or a separate UL TCI state provided by TCI-State/UL-TCI-State, and a pair of TCI states could include/contain a separate DL TCI state provided by TCI-State/DLorJointTCI-State or a separate UL TCI State provided by TCI-State/UL-TCIState, under the unified TCI framework.

For PDCCH reception or PDCCH candidate monitoring in a (single-DCI based) multi-TRP system, a UE could be configured/provided/indicated by the network 130 via higher layer RRC signaling/parameter and/or MAC CE command and/or dynamic DCI based L1 signaling—e.g., in higher layer RRC signaling/parameter ControlResourceSet that configures a CORESET-a first indicator to indicate which one or more of the set of TCI states/pairs of TCI states indicated, e.g., by a TCI codepoint, in a beam indication DCI or MAC CE as specified herein in the present disclosure, to use/apply for receiving/monitoring the PDCCH(s)/PDCCH candidate(s) in the corresponding CORESET. For instance, for N=2 (i.e., a set of two TCI states/pairs of TCI states are indicated), the first indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '01' indicates that the second TCI state(s) among the set of TCI states/pairs of TCI states indicated, e.g., by a TCI codepoint, in a beam indication DCI or MAC CE as specified herein in the present disclosure, could be used/applied for receiving/monitoring the PDCCH(s)/PDCCH candidate(s) in the corresponding CORESET. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving/monitoring the PDCCH(s)/PDCCH candidate(s)—e.g., first and second PDCCH candidates—in the corresponding CORESET(s). '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for receiving/monitoring the PDCCH(s)/PDCCH candidate(s)—e.g., first and second PDCCH candidates—in the corresponding CORESET(s), wherein the first and second PDCCH candidates could be received in search space sets that are higher layer linked via SearchSpaceLinking and/or the first and second PDCCH candidates carry the same/identical DCI payload. Furthermore, throughout the present disclosure, the first TCI state(s) or the second TCI state(s)—specified herein in the present disclosure-could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

For PDSCH reception in a (single-DCI based) multi-TRP system, a UE could be configured/provided/indicated by the network 130 via higher layer RRC signaling/parameter and/or MAC CE command and/or dynamic DCI based L1 signaling—e.g., in a DL DCI (e.g., DCI format 1_0/1_1/1_2) that schedules the PDSCH-a second indicator to indicate which one or more of the set of TCI states/pairs of TCI states indicated, e.g., by a TCI codepoint, in a beam indication DCI or MAC CE as specified herein in the present disclosure, to use/apply for receiving the PDSCH(s). For instance, for N=2 (i.e., a set of two TCI states/pairs of TCI states are indicated), the second indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '01' indicates that the second TCI state(s) among the set of TCI states/pairs of TCI states indicated, e.g., by a TCI codepoint, in a beam indication DCI or MAC CE as specified herein in the present disclosure, could be used/applied for receiving the corresponding PDSCH(s)—e.g., scheduled by the DL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for receiving the corresponding PDSCH(s)—e.g., first and second PDSCHs—e.g., scheduled by the DL DCI/PDCCH, wherein the first and second PDSCHs could correspond to two PDSCH transmission occasions or repetition in space, time and/or frequency.

Furthermore, throughout the present disclosure, the first TCI state(s) or the second TCI state(s)—specified herein in the present disclosure—could correspond to a joint DL and UL TCI state provided by TCI-State/DLorJointTCI-State, a separate DL TCI state provided by TCI-State/DLorJointTCI-State, a separate UL TCI state provided by TCI-State/UL-TCI-State, or a pair of separate DL and separate UL TCI states.

For PUCCH transmission in a (single-DCI based) multi-TRP system, a UE could be configured/provided/indicated by the network 130 via higher layer RRC signaling/parameter and/or MAC CE command and/or dynamic DCI based L1 signaling—e.g., in higher layer RRC signaling/parameter PUCCH-Config that configures PUCCH(s)/PUCCH resource(s)—a third indicator to indicate which one or more of the set of TCI states/pairs of TCI states indicated, e.g., by a TCI codepoint, in a beam indication DCI or MAC CE as specified herein in the present disclosure, to use/apply for transmitting the PUCCH(s)/PUCCH resource(s). For instance, for N=2 (i.e., a set of two TCI states/pairs of TCI states are indicated), the third indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '01' indicates that the second TCI state(s) among the set of TCI states/pairs of TCI states indicated, e.g., by a TCI codepoint, in a beam indication DCI or MAC CE as specified herein in the present disclosure, could be used/applied for transmitting the PUCCH(s)/PUCCH resource(s). '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the PUCCH(s)/PUCCH resource(s)—e.g., first PUCCH/PUCCH resource and second PUCCH/PUCCH resource. '11' indicates that the second and first TCI states among the set of TCI states/pairs of TCI states indicated, e.g., by a TCI codepoint, in a beam indication DCI or MAC CE as specified herein in the present disclosure, or none of the indicated TCI states, could be (respectively) used/applied for transmitting the PUCCH(s)/PUCCH resource(s)—e.g., first PUCCH/PUCCH resource and second PUCCH/PUCCH resource, wherein the first and second PUCCHs/PUCCH resources could correspond to two PUCCH transmission occasions or repetitions in space, time and/or frequency. Furthermore, throughout the present disclosure, the first TCI state(s) or the second TCI state(s)—specified herein in the present disclosure-could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

For PUSCH transmission in a (single-DCI based) multi-TRP system, a UE could be configured/provided/indicated by the network 130 via higher layer RRC signaling/parameter and/or MAC CE command and/or dynamic DCI based L1 signaling—e.g., in an UL DCI (e.g., DCI format 0_0/0_1/0_2) that schedules the PUSCH-a fourth indicator to indicate which one or more of the set of TCI states/pairs of TCI states indicated, e.g., by a TCI codepoint, in a beam indication DCI or MAC CE as specified herein in the present disclosure, to use/apply for transmitting the PUSCH(s). For instance, for N=2 (i.e., a set of two TCI states/pairs of TCI states are indicated), the fourth indicator could be a two-bit indicator with '00' indicating that the first TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCC. '01' indicates that the second TCI state(s) among the set of TCI states/pairs of TCI states indicated, e.g., by a TCI codepoint, in a beam indication DCI or MAC CE as specified herein in the present disclosure, could be used/applied for transmitting the corresponding PUSCH(s)—e.g., scheduled by the UL DCI/PDCCH. '10' indicates that the first and second TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH. '11' indicates that the second and first TCI states among the set of TCI states/pairs of TCI states indicated, e.g., by a TCI codepoint, in a beam indication DCI or MAC CE as specified herein in the present disclosure, could be respectively used/applied for transmitting the corresponding PUSCH(s)—e.g., first and second PUSCHs—e.g., scheduled by the UL DCI/PDCCH, wherein the first and second PUSCHs could correspond to two PUSCH transmission occasions or repetition in space, time and/or frequency. Furthermore, throughout the present disclosure, the first TCI state(s) or the second TCI state(s)—specified herein in the present disclosure-could correspond to a joint DL and UL TCI state provided by TCI-State/DLorJointTCI-State, a separate DL TCI state provided by TCI-State/DLorJointTCI-State, a separate UL TCI state provided by TCI-State/UL-TCIState, or a pair of separate DL and separate UL TCI states.

In one embodiment, for implicit BFD RS determination:

- In one example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first TCI state(s) among the set of one or more (e.g., N=2) TCI states/pairs of TCI states indicated, e.g., by a TCI codepoint, in a beam indication DCI or MAC CE as specified herein in the present disclosure.
- In another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the second TCI state(s) among the set of one or more (e.g., N=2) TCI states/pairs of TCI states indicated, e.g., by a TCI codepoint, in a beam indication DCI or MAC CE as specified herein in the present disclosure.
- In yet another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in both of the first and second TCI states among the set of one or more (e.g., N=2) TCI states/pairs of TCI states indicated, e.g., by a TCI codepoint, in a beam indication DCI or MAC CE as specified herein in the present disclosure.
- In yet another example, the UE 116 could determine two BFD RS sets. For instance, the UE 116 could determine a first BFD RS set—e.g., denoted by q0_0—to include periodic CSI-RS resource configuration indexes or SSB indexes (also referred to as BFD RS resource indexes) with same values as the RS indexes in the RS sets in the first TCI state(s) among the set of one or more (e.g., N=2) TCI states/pairs of TCI states indicated, e.g., by a TCI codepoint, in a beam indication DCI or MAC CE as specified herein in the present disclosure, and a second BFD RS set—e.g., denoted by q0_1—to include periodic CSI-RS resource configuration indexes or SSB indexes (also referred to as BFD RS resource indexes) with same values as the RS indexes in the RS sets in the second TCI state(s) among the set of one or more (e.g., N=2) TCI states/pairs of TCI states indicated, e.g., by a TCI codepoint, in a beam indication DCI or MAC CE as specified herein in the present disclosure.

When a UE receives the first indicator for one or more CORESETs as specified herein in the present disclosure, the UE 116 would determine one or more BFD RS sets (and therefore, BFD RSs determined therein) according to one or more of the following.

- In one example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '00' as specified herein in the present disclosure, wherein the first TCI state(s) is for the one or more CORESETs.
- In another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the second TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '01' as specified herein in the present disclosure, wherein the second TCI state(s) is for the one or more CORESETs.
- In yet another example, the UE 116 could determine two BFD RS sets. For instance, the UE 116 could determine a first BFD RS set—e.g., denoted by q0_0—to include periodic CSI-RS resource configuration indexes or SSB indexes (also referred to as BFD RS resource indexes) with same values as the RS indexes in the RS sets in the first TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more first CORESETs configured/associated with the first indicator set to '00' as specified herein in the present disclosure, wherein the first TCI state(s) is for the one or more first CORESETs, and a second BFD RS set—e.g., denoted by q0_1—to include periodic CSI-RS resource configuration indexes or SSB indexes (also referred to as BFD RS resource indexes) with same values as the RS indexes in the RS sets in the second TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more second CORESETs configured/associated with the first indicator set to '01' as specified herein in the present disclosure, wherein the second TCI state(s) is for the one or more second CORESETs.
- In yet another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first and second TCI states among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.
- In yet another example, the UE 116 could determine two BFD RS sets. For instance, the UE 116 could determine a first BFD RS set—e.g., denoted by q0_0—to include periodic CSI-RS resource configuration indexes or SSB indexes (also referred to as BFD RS resource indexes) with same values as the RS indexes in the RS sets in the first TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, and a second BFD RS set—e.g., denoted by q0_1—to include periodic CSI-RS resource configuration indexes or SSB indexes (also referred to as BFD RS resource indexes) with same values as the RS indexes in the RS sets in the second TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.
- In yet another example, the UE 116 could determine a BFD RS set—e.g., denoted by q0—to include periodic CSI-RS resource configuration indexes or SSB indexes (also referred to as BFD RS resource indexes) with same values as the RS indexes in the RS sets in a TCI state indicated for receiving/monitoring PDCCH/PDCCH candidate(s) in one or more CORESETs configured/associated with the first indicator set to '11' as specified herein in the present disclosure, wherein (i) the TCI state could be provided by TCI-State and for the one or more CORESETs, and/or (ii) the TCI state is not in the set of indicated TCI states/pairs of TCI states as specified herein in the present disclosure.

According to one or more examples described herein, the UE 116 could determine a BFD RS set—e.g., denoted by q0 or q0_0—to include periodic CSI-RS resource configuration indexes or SSB indexes (also referred to as BFD RS resource indexes) with same values as the RS indexes in the RS sets in the first TCI state(s) among the set of one or more (e.g., N=2) TCI states/pairs of TCI states indicated, e.g., by a TCI codepoint, in a beam indication DCI or MAC CE as specified herein in the present disclosure, when/if the first TCI state(s), among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '00' or '10' or '11'.

According to one or more examples described herein, the UE 116 could determine a BFD RS set—e.g., denoted by q1 or q0_1—to include periodic CSI-RS resource configuration indexes or SSB indexes (also referred to as BFD RS resource indexes) with same values as the RS indexes in the RS sets in the second TCI state(s) among the set of one or more (e.g., N=2) TCI states/pairs of TCI states indicated, e.g., by a TCI codepoint, in a beam indication DCI or MAC CE as specified herein in the present disclosure, when/if the second TCI state(s), among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '01' or '10' or '11'.

According to one or more examples described herein, the UE 116 could determine a BFD RS set—e.g., denoted by q0—to include periodic CSI-RS resource configuration indexes or SSB indexes (also referred to as BFD RS resource indexes) with same values as the RS indexes in the RS sets in the first and second TCI states among the set of one or more (e.g., N=2) TCI states/pairs of TCI states indicated, e.g., by a TCI codepoint, in a beam indication DCI or MAC CE as specified herein in the present disclosure, when/if both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated for at least one CORESET or used/applied for PDCCH reception, wherein as specified herein in the present disclosure, the first indicator configured for or associated to PDCCH(s)/PDCCH candidate(s)—e.g., the first and second PDCCH candidates-received in the CORESET(s) could be set to '10' or '11'.

For explicit BFD RS configuration, activation, or indication, a UE could be configured/provided/indicated by the network 130, e.g., via higher layer RRC signaling/parameter and/or MAC CE command and/or dynamic DCI based L1 signaling, one or more BFD RS sets for radio link quality monitoring each comprising one or more BFD RSs, wherein a BFD RS could correspond to a periodic CSI-RS resource or a SSB. For instance, the UE 116 could be first configured by the network 130, e.g., via higher layer RRC signaling/parameter, one or more sets of BFD RSs or BFD RS IDs. The UE 116 could then receive from the network 130, one or more BFD RS MAC CE activation/subselection commands (or BFD RS indication MAC CEs) that activate/subselect one or more BFD RSs or BFD RS IDs from the one or more sets, to update one or more BFD RSs in one or more BFD RS sets.

In one embodiment, a UE could use/apply a single BFD RS set—e.g., denoted by q0—to monitor radio link quality for (single-DCI based) multi-TRP operation. As specified herein in the present disclosure, the UE 116 could be first configured by the network 130, e.g., via higher layer RRC signaling/parameter, a set of BFD RSs or BFD RS IDs. The UE 116 could then receive from the network 130, e.g., a BFD RS MAC CE activation/subselection command (or a BFD RS indication MAC CE) that activates/subselects one or more BFD RSs or BFD RS IDs from the set, to update one or more BFD RSs in the BFD RS set (e.g., q0).

For monitoring the radio link quality over the BFD RS set q0:

- In one example, the UE 116 could assess the radio link quality of the BFD RS set q0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure.
- In another example, the UE 116 could assess the radio link quality of the BFD RS set q0 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure.
- In yet another example, the UE 116 could assess the radio link quality of the BFD RS set q0 according to SSBs on the PCell or the PSCell or periodic CSI-RS resource configurations that are in both of the first and second TCI states among the set of one or more (e.g., N=2) TCI states/pairs of TCI states indicated, e.g., by a TCI codepoint, in a beam indication DCI or MAC CE as specified herein in the present disclosure.
- In yet another example, the UE 116 could assess a first radio link quality of the BFD RS set q0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, and a second radio link quality of the BFD RS set q0 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure.

When a UE receives the first indicator for one or more CORESETs as specified herein in the present disclosure, the UE 116 would determine or assess one or more radio link qualities of the BFD RS set q0 according to one or more of the following.

- In one example, the UE 116 could assess the radio link quality of the BFD RS set q0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '00' as specified herein in the present disclosure, wherein the first TCI state(s) is for the one or more CORESETs.

In another example, the UE 116 could assess the radio link quality of the BFD RS set q0 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '01' as specified herein in the present disclosure, wherein the second TCI state(s) is for the one or more CORESETs.

In yet another example, the UE 116 could determine or access two radio link qualities of the BFD RS set q0. For instance, the UE 116 could assess a first radio link quality of the BFD RS set q0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more first CORESETs configured/associated with the first indicator set to '00' as specified herein in the present disclosure, wherein the first TCI state(s) is for the one or more first CORESETs, and a second radio link quality of the BFD RS set q0 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more second CORESETs configured/associated with the first indicator set to '01' as specified herein in the present disclosure, wherein the second TCI state(s) is for the one or more second CORESETs.

In yet another example, the UE 116 could assess the radio link quality of the BFD RS set q0 according to SSBs on the PCell or the PSCell or periodic CSI-RS resource configurations that are in the first and second TCI states among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

In yet another example, the UE 116 could determine or access two radio link qualities of the BFD RS set q0. For instance, the UE 116 could assess a first radio link quality of the BFD RS set q0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, and a second radio link quality of the BFD RS set q0 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

In yet another example, the UE 116 could assess the radio link quality of the BFD RS set q0 according to SSBs on the PCell or the PSCell or periodic CSI-RS resource configurations that are in a TCI state indicated for receiving/monitoring PDCCH/PDCCH candidate(s) in one or more CORESETs configured/associated with the first indicator set to '11' as specified herein in the present disclosure, wherein (i) the TCI state could be provided by TCI-State and for the one or more CORESETs and/or (ii) the TCI state is not in the set of indicated TCI states/pairs of TCI states as specified herein in the present disclosure.

According to one or more examples described herein, the UE 116 could assess the radio link quality of the BFD RS set q0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, when/if the first TCI state(s), among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '00' or '10' or '11'.

According to one or more examples described herein, the UE 116 could assess the radio link quality of the BFD RS set q0 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure, when/if the second TCI state(s), among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '01' or '10' or '11'.

According to one or more examples described herein, the UE 116 could assess the radio link quality of the BFD RS set q0 according to SSBs on the PCell or the PSCell or periodic CSI-RS resource configurations that are in the first and second TCI states among the set of one or more (e.g., N=2) TCI states/pairs of TCI states indicated, e.g., by a TCI codepoint, in a beam indication DCI or MAC CE as specified herein in the present disclosure, when/if both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated for at least one CORESET or used/applied for PDCCH reception, wherein as specified herein in the present disclosure, the first indicator configured for or associated to PDCCH(s)/PDCCH candidate(s)—e.g., the first and second PDCCH candidates-received in the CORESET(s) could be set to '10' or '11'.

In one embodiment, a UE could use/apply one or more of S>1 (e.g., two) BFD RS sets—e.g., denoted by q0_0 and q0_1—to monitor radio link quality(s) for (single-DCI based) multi-TRP operation. As specified herein in the present disclosure, the UE 116 could be first configured by the network 130, e.g., via higher layer RRC signaling/parameter, one or more (e.g., two) sets of BFD RSs or BFD RS IDs. The UE 116 could then receive from the network 130, e.g., one or more (e.g., two) BFD RS MAC CE activation/subselection commands (or one or more BFD RS indication MAC CEs) that respectively activate/subselect one or more BFD RSs or BFD RS IDs from the one or more sets, to respectively update one or more BFD RSs in one or more of the S>1 BFD RS sets (e.g., q0_0 and q0_1). In the present disclosure, various design examples and methods are presented under S=2; they can be extended to system settings and/or assumptions with S>2.

For S=2 or N=2, the two BFD RS sets q0_0 and q0_1 could be (one-to-one) mapped/associated to the (set of) two TCI states/pairs of TCI states indicated, e.g., by a TCI codepoint, in a beam indication DCI or MAC CE as specified herein in the present disclosure.

- For example, the first BFD RS set q0_0 could be mapped/associated to the first TCI state(s)—identified among the set of one or more (e.g., N=2) TCI states/pairs of TCI states indicated, e.g., by a TCI codepoint, in a beam indication DCI or MAC CE as specified herein in the present disclosure, and the second BFD RS set q0_0 could be mapped/associated to the second TCI state(s)—identified among the set of one or more (e.g., N=2) TCI states/pairs of TCI states indicated, e.g., by a TCI codepoint, in a beam indication DCI or MAC CE as specified herein in the present disclosure.
- For another example, the first BFD RS set q0_0 could be mapped/associated to the second TCI state(s)—identified among the set of one or more (e.g., N=2) TCI states/pairs of TCI states indicated, e.g., by a TCI codepoint, in a beam indication DCI or MAC CE as specified herein in the present disclosure, and the second BFD RS set q0_0 could be mapped/associated to the first TCI state(s)—identified among the set of one or more (e.g., N=2) TCI states/pairs of TCI states indicated, e.g., by a TCI codepoint, in a beam indication DCI or MAC CE as specified herein in the present disclosure.
- Yet for another example, the UE 116 could be indicated/configured/provided by the network 130, e.g., via higher layer RRC signaling/parameter and/or MAC CE command and/or dynamic DCI based L1 signaling, the mapping/association relationship between the two BFD RS sets q0_0 and q0_1 and the (set of) two TCI states/pairs of TCI states indicated, e.g., by a TCI codepoint, in a beam indication DCI or MAC CE as specified herein in the present disclosure.

Depending on which one or more of the TCI states-among the set of one or more (e.g., N=2) TCI states/pairs of TCI states indicated, e.g., by a TCI codepoint, in a beam indication DCI or MAC CE as specified herein in the present disclosure—are used/applied for transmitting or receiving channels/signals (e.g., indicated by the first, second, third and/or fourth indicators as specified herein in the present disclosure), the UE 116 could assess the radio link quality(s) of the associated/corresponding BFD RS set(s)—e.g., q0_0 and/or q0_1—as specified herein in the present disclosure, to detect potential beam failure(s). In the following design examples, the first BFD RS set q0_0 is mapped/associated to the first indicated TCI state and the second BFD RS set q0_1 is mapped/associated to the second indicated TCI state. The design examples specified in the present disclosure can be extended/applied to when the first BFD RS set q0_0 is mapped/associated to the second indicated TCI state and the second BFD RS set q0_1 is mapped/associated to the first indicated TCI state.

- In one example, the UE 116 could assess the radio link quality of the first BFD RS set q0_0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure.
- In another example, the UE 116 could assess the radio link quality of the second BFD RS set q0_1 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure.
- In yet another example, the UE 116 could assess a first radio link quality of the first BFD RS set q0_0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, and a second radio link quality of the second BFD RS set q0_1 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure.

When a UE receives the first indicator for one or more CORESETs as specified herein in the present disclosure, the UE 116 would determine or assess radio link quality(s) of the first BFD RS set q0_0 and/or the second BFD RS set q0_1 according to one or more of the following.

- In one example, the UE 116 could assess the radio link quality of the first BFD RS set q0_0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '00' as specified herein in the present disclosure, wherein the first TCI state(s) is for the one or more CORESETs.
- In another example, the UE 116 could assess the radio link quality of the second BFD RS set q0_1 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '01' as specified herein in the present disclosure, wherein the second TCI state(s) is for the one or more CORESETs.

In yet another example, the UE 116 could assess a first radio link quality of the first BFD RS set q0_0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more first CORESETs configured/associated with the first indicator set to '00' as specified herein in the present disclosure, wherein the first TCI state(s) is for the one or more first CORESETs, and a second radio link quality of the second BFD RS set q0_1 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more second CORESETs configured/associated with the first indicator set to '01' as specified herein in the present disclosure, wherein the second TCI state(s) is for the one or more second CORESETs.

In yet another example, the UE 116 could assess a first radio link quality of the first BFD RS set q0_0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, and a second radio link quality of the second BFD RS set q0_1 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure, for receiving/monitoring PDCCH/PDCCH candidate(s) in one or more CORESETs configured/associated with the first indicator set to '10' or '11' as specified herein in the present disclosure, wherein both of the first and second TCI states are for the one or more CORESETs.

According to one or more examples described herein, the UE 116 could assess the radio link quality of the first BFD RS set q0_0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, when/if the first TCI state(s), among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '00' or '10' or '11'.

According to one or more examples described herein, the UE 116 could assess the radio link quality of the second BFD RS set q0_1 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure, when/if the second TCI state(s), among the set of one or more (e.g., N=2) TCI states/pairs of TCI states indicated, e.g., by a TCI codepoint, in a beam indication DCI or MAC CE as specified herein in the present disclosure, is indicated for at least one CORESET or used/applied for PDCCH reception, wherein as specified herein in the present disclosure, the first indicator configured for or associated to PDCCH(s)/PDCCH candidate(s) received in the CORESET could be set to '01' or '10' or '11'.

According to one or more examples described herein, the UE 116 could assess a first radio link quality of the first BFD RS set q0_0 according to SSBs on the PCell or the PSCell or periodic CSI-RS resource configurations that are in the first TCI state(s) among the set of one or more (e.g., N=2) TCI states/pairs of TCI states indicated, e.g., by a TCI codepoint, in a beam indication DCI or MAC CE as specified herein in the present disclosure, and a second radio link quality of the second BFD RS set q0_1 according to SSBs on the PCell or the PSCell or periodic CSI-RS resource configurations that are in the second TCI state(s) among the set of one or more (e.g., N=2) TCI states/pairs of TCI states indicated, e.g., by a TCI codepoint, in a beam indication DCI or MAC CE as specified herein in the present disclosure, when/if both of the first and second TCI states, among the set of one or more (e.g., N=2) TCI states/pairs of TCI states indicated, e.g., by a TCI codepoint, in a beam indication DCI or MAC CE as specified herein in the present disclosure, are indicated for at least one CORESET or used/applied for PDCCH reception, wherein as specified herein in the present disclosure, the first indicator configured for or associated to PDCCH(s)/PDCCH candidate(s)—e.g., the first and second PDCCH candidates-received in the CORESET(s) could be set to '10' or '11'.

For a (or any or every) BFD RS set specified herein in the present disclosure, the higher layers in the UE 116 would increment beam failure instance (BFI) count (by one) in the BFI counter (denoted by BFI_COUNTER) associated/corresponding to the BFD RS set if the higher layers receive from the physical layer in the UE 116 that the radio link quality of the BFD RS set is worse than a threshold Qout. The UE 116 would declare a beam failure for the BFD RS set if the BFI count in the BFI counter BFI_COUNTER for the BFD RS set reaches the maximum number of BFI counts (e.g., provided by the higher layer parameter maxBFIcount) before a BFD timer expires. After the higher layers in the UE 116 declare the beam failure for the BFD RS set, the higher layers in the UE 116 would reset the BFI count in the corresponding/associated BFI counter BFI_COUNTER or the BFD timer to zero.

For a (or any or every) BFD RS set specified herein in the present disclosure, the UE 116 could be configured with/ provided by the network 130, e.g., via the higher layer parameter candidateBeamRSList, a new beam identification (NBI) RS set of periodic CSI-RS resource configuration indexes or SSB indexes—corresponding/associated to the BFD RS set—for radio link quality measurement. The NBI RS set—as discussed herein, corresponding/associated to the BFD RS set—is used for identifying potential new beam(s) to recover the failed beam(s)/link(s) for the BFD RS set (and therefore, the corresponding channel(s)/signal(s) or TRP). The UE 116 expects single-port or two-port CSI-RS with frequency density equal to 1 or 3 REs per RB in the NBI RS set. The UE 116 could assess the radio link quality according to the NBI RS set of resource configurations against a threshold Qin. The UE 116 would apply the Qin threshold to the L1-RSRP measurement obtained from a SSB in the NBI RS set and apply the Qin threshold to the L1-RSRP measurement obtained from a CSI-RS resource in the NBI RS set after scaling a respective CSI-RS reception power with a value provided by powerControlOffset. According to the L1-RSRP measurements, the UE 116 could identify the periodic CSI-RS resource configuration index or SSB index in the NBI RS set, denoted by q_new, that corresponds to the largest/highest measured L1-RSRP among those larger than or equal to the Qin threshold.

A BFD RS set could be associated/corresponding to one or more TCI states-among the set of one or more (e.g., N=2) TCI states/pairs of TCI states indicated, e.g., by a TCI codepoint, in a beam indication DCI or MAC CE as specified herein in the present disclosure-indicated for at least UE-dedicated DL and/or UL channels/signals. For example, a BFD RS set could include periodic CSI-RS resource configuration indexes or SSB indexes (also referred to as BFD RS resource indexes) with same values as the RS indexes in the RS sets in the first TCI state(s) and/or the second TCI state(s) (e.g., for N=2)—among the set of one or more (e.g., N=2) TCI states/pairs of TCI states indicated, e.g., by a TCI codepoint, in a beam indication DCI or MAC CE as specified herein in the present disclosure; for this case, whether the first TCI state(s) and/or the second TCI state(s) are used/applied could be determined according to one or more of the following: (1) fixed in the system specification(s), (2) configured/provided/indicated by the network 130, e.g., via higher layer RRC signaling/parameter and/or MAC CE command and/or dynamic DCI based L1 signaling, and (3) depending on the first, second, third, and/or fourth indicators as specified herein in the present disclosure and/or their association(s) to the first, second, third, and/or fourth indicators. For another example, the UE 116 could assess the radio link quality(s) of a RRC configured and/or MAC CE indicated BFD RS set according to the RS indexes in the RS sets in the first TCI state(s) and/or the second TCI state(s) (e.g., for N=2)—among the set of one or more (e.g., N=2) TCI states/pairs of TCI states indicated, e.g., by a TCI codepoint, in a beam indication DCI or MAC CE as specified herein in the present disclosure; for this case, whether the first TCI state(s) and/or the second TCI state(s) are used/applied could be determined according to one or more of the following: (1) fixed in the system specification(s), (2) configured/provided/indicated by the network 130, e.g., via higher layer RRC signaling/parameter and/or MAC CE command and/or dynamic DCI based L1 signaling, and (3) depending on the first, second, third, and/or fourth indicators as specified herein in the present disclosure and/or their association(s) to the first, second, third, and/or fourth indicators. For configuring/determining one or more BFD RSs in one or more BFD RS sets as specified herein in the present disclosure, the first TCI state(s) or the second TCI state(s)—as specified herein in the present disclosure-could correspond to a joint DL and UL TCI state provided by TCI-State/DLorJointTCI-State, a separate DL TCI state provided by TCI-State/DLorJointTCI-State, or the separate DL TCI state in a pair of DL and UL TCI states. Throughout the present disclosure, if the radio link quality of one or more BFD RSs in one or more BFD RS sets (or equivalently, the radio link quality of one or more BFD RS sets) is worse than a threshold (e.g., Qout, LR), the (higher layers of) UE could declare beam failure(s) for the one or more BFD RSs in the one or more BFD RS sets (or equivalently, for the one or more BFD RS sets).

Figure 16:
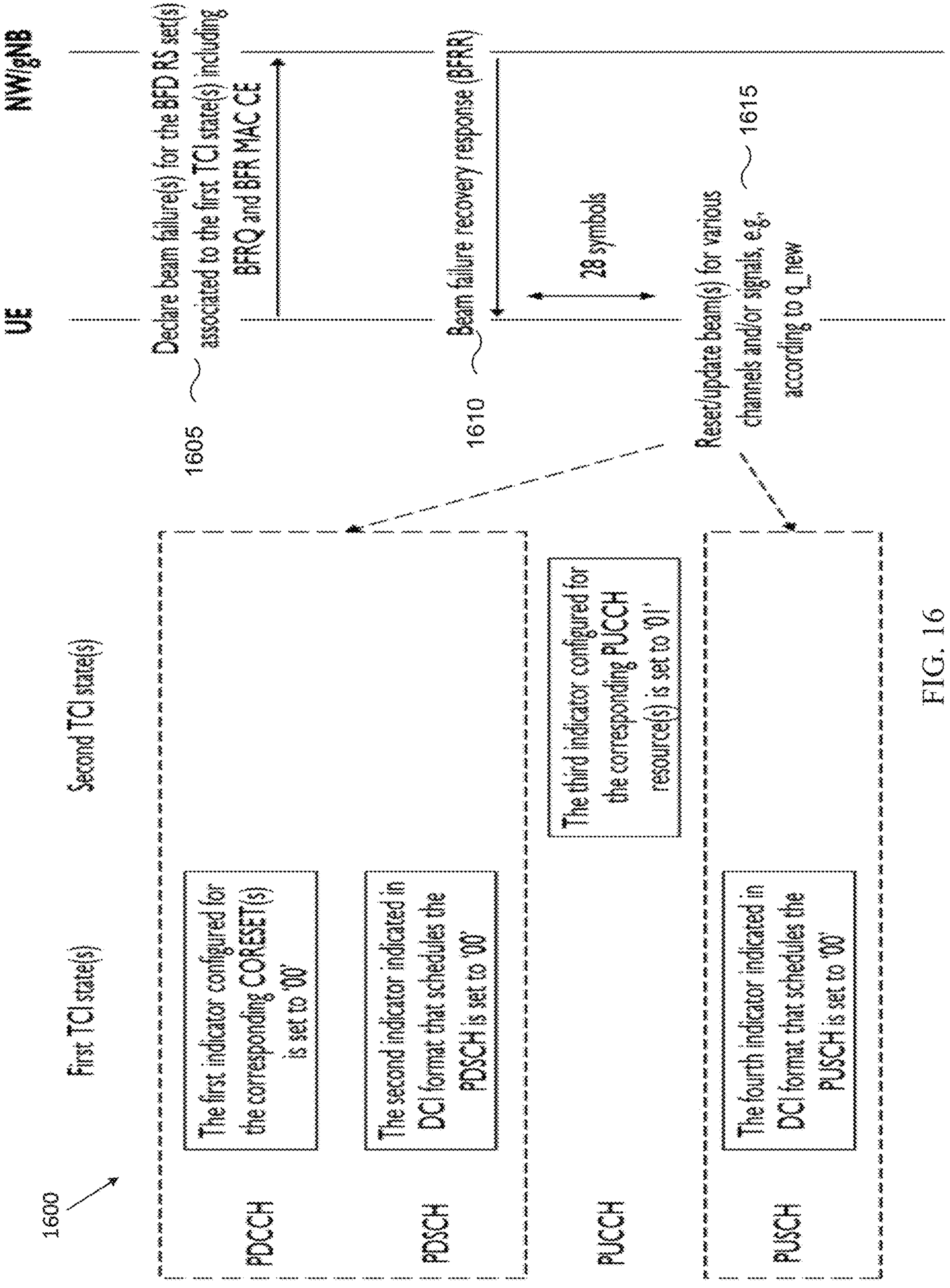
FIG. 16 illustrates an example procedure for beam resetting/updating according to embodiments of the present disclosure.

FIG. 16 illustrates an example procedure 1600 for beam resetting/updating according to embodiments of the present disclosure. For example, procedure 1600 can be performed by the UE 116 and the gNB 102 and/or the network 130 in the wireless network 100 of FIG. 1. This example is for illustration only and other embodiments can be used without departing from the scope of the present disclosure.

The procedure begins in 1605, the UE 116 sends declaration of beam failure(s) for the BFD RS set(s) associated to the first TCI state(s) including BFRQ and BFR MAC CE to the gNB 102 and/or the network 130. In 1610, the gNB 102 and/or the network 130 sends beam failure recovery response (BFRR) to the UE 116. In 1615, the UE 116 resets/updates beam(s) for various channels and/or signals, e.g., according to q_new.

In one embodiment, a UE could monitor and declare beam failure(s) for a single TRP in a (single-DCI based) multi-TRP (MTRP) system. As specified herein, a UE could assess the radio link quality(s) of one or more BFD RSs in one or more BFD RS sets associated to the first TCI state(s) or the second TCI state(s) among the set of one or more (e.g., N=2) TCI states/pairs of TCI states indicated, e.g., by a TCI codepoint, in a beam indication DCI or MAC CE as specified herein in the present disclosure. For this case, the (higher layers of) UE could declare beam failure(s) for the one or more BFD RS sets having radio link quality(s) worse than Qout, LR (and therefore, the corresponding/associated first or second TCI state(s)). As specified herein in the present disclosure, the one or more BFD RS sets (and therefore, the one or more BFD RSs provided therein) being corresponding/associated to the first TCI state(s) or the second TCI state(s) could be according to the value(s) of the first indicator configured for CORESET(s)/PDCCH reception (e.g., when/if the first indicator is set to '00', the BFD RS set(s) is associated to the first TCI state(s), while when/if the first indicator is set to '01', the BFD RS set(s) is associated to the second TCI state(s)) and/or the second indicator indicated for PDSCH reception (e.g., when/if the second indicator is set to '00', the BFD RS set(s) is associated to the first TCI state(s), while when/if the second indicator is set to '01', the BFD RS set(s) is associated to the second TCI state(s)) and/or the third indicator configured for PUCCH transmission (e.g., when/if the third indicator is set to '00', the BFD RS set(s) is associated to the first TCI state(s), while when/if the third indicator is set to '01', the BFD RS set(s) is associated to the second TCI state(s)) and/or the fourth indicator indicated for PUSCH transmission (e.g., when/if the fourth indicator is set to '00', the BFD RS set(s) is associated to the first TCI state(s), while when/if the fourth indicator is set to '01', the BFD RS set(s) is associated to the second TCI state(s)).

In one example, the UE 116 could declare beam failure(s) for the BFD RS set(s) associated to the first TCI state(s) among the set of one or more (e.g., N=2) TCI states/pairs of TCI states indicated, e.g., by a TCI codepoint, in a beam indication DCI or MAC CE as specified herein in the present disclosure. For this design example, after the UE 116 has sent to the network 130 beam failure recovery request (BFRQ) and necessary information related to the BFD RS set(s) having radio link quality(s) worse than Qout, LR, etc., the UE 116 could expect to receive from the network 130 a beam failure recovery response (BFRR), upon which the UE 116 could reset/update the beam(s) for transmitting or receiving channels/signals associated to the BFD RS set(s)—and therefore, the first TCI state(s)—as the newly identified beam(s).

If a UE is indicated/configured/provided by the network 130, e.g., via higher layer RRC signaling and/or MAC CE command (e.g., via a TCI codepoint in a TCI state(s) indication/activation MAC CE) and/or dynamic DCI based L1 signaling (e.g., via a TCI codepoint of a TCI field in a beam indication DCI 1_1/1_2 with or without DL assignment), a set of one or more (unified) TCI states/pairs of TCI states for the PCell or the PSCell, and/or if the PCell or the PSCell is associated with one or more (e.g., two) BFD RS sets, and/or if the UE 116 has declared beam failure(s)—including sending the corresponding BFRQ and information (in PUSCH MAC CE for BFR) related to the beam failure(s)—for the BFD RS set(s) associated to the first TCI state(s) among the set of one or more (e.g., N=2) TCI states/pairs of TCI states indicated, e.g., by a TCI codepoint, in a beam indication DCI or MAC CE as specified herein in the present disclosure, and/or the UE 116 provides BFR MAC CE in Msg3 or MsgA of contention based random access procedure, after 28 symbols from a last symbol of a first PDCCH reception in a search space set provided by recoverySearchSpaceId where the UE 116 detects a DCI format with cyclic redundancy check (CRC) scrambled by C-RNTI or modulation and coding scheme (MCS)-C-RNTI or after 28 symbols from the last symbol of the PDCCH reception that determines the completion of the contention based random access procedure, the UE 116 could:

monitor PDCCH in all CORESETs or one or more CORESETs associated/corresponding to the first TCI state(s)—e.g., the one or more CORESETs configured/associated with the first indicator set to '00' or '10' or '11' as specified herein in the present disclosure-using the same antenna port quasi co-location parameters as the ones associated with the index q_new;

receive PDSCH associated/corresponding to the first TCI state(s)—e.g., the second indicator indicated in the (downlink) DCI (e.g., DCI format 1_0/1_1/1_2) that schedules/activates/triggers the PDSCH is set to '00' or '10' or '11' as specified herein in the present disclosure-using the same antenna port quasi co-location parameters as the ones associated with the index q_new;

receive aperiodic CSI-RS resource in a CSI-RS resource set with same indicated TCI state(s)—i.e., the first TCI state(s) here—as for the PDCCH and/or the PDSCH using the same antenna port quasi co-location parameters as the ones associated with the index q_new;

transmit PUCCH associated/corresponding to the first TCI state(s)—e.g., the corresponding PUCCH resource(s) configured/associated with the third indicator set to '00' or '10' or '11' as specified herein in the present disclosure-using a same spatial domain filter as for the last PRACH transmission;

transmit PUSCH associated/corresponding to the first TCI state(s)—e.g., the fourth indicator indicated in the (uplink) DCI (e.g., DCI format 0_0/0_1/0_2) that schedules/activates/triggers the PUSCH is set to '00' or '10' or '11' as specified herein in the present disclosure-using a same spatial domain filter as for the last PRACH transmission;

transmit SRS that uses a same spatial domain filter with same indicated TCI state(s)—i.e., the first TCI state(s) here—as for the PUCCH and/or the PUSCH using a same spatial domain filter as for the last PRACH transmission; and/or for transmitting the PUCCH, PUSCH and/or SRS as specified herein in the present disclosure, the following parameters for determination of a corresponding power can be used:

the RS index $q_d = q_{new}$ for obtaining the downlink pathloss estimate;

the values of $P_{O\_UE\_PUSCH,b,f,c}(j)$, $\alpha_{b,f,c}(j)$ and the PUSCH power control adjustment state l provided by p0-Alpha-CLID-PUSCH-Set associated with the first TCI state(s) and/or the smallest value of ul-powercontrolId for the PCell or the PSCell;

the value of $P_{O\_UE\_PUSCH,b,f,c}(q_s)$ and $\alpha_{SRS,b,f,c}(q_s)$, the PUCCH power control adjustment state l provided by p0-Alpha-CLID-PUCCH-Set associated with the first TCI state(s) and/or the smallest value of ul-powercontrolId for the PCell or the PSCell; and/or the values of $P_{O\_SRS,b,f,c}(q_s)$, and $\alpha_{SRS,b,f,c}(q_s)$ the SRS power control adjustment state l provided by p0-Alpha-CLID-SRS-Set associated with the first TCI state(s) and/or the smallest value of ul-powercontrolId for the PCell or the PSCell.

Furthermore, the index q_new could correspond to a RS index determined/selected by the UE 116 from the NBI RS set(s)—as specified herein in the present disclosure—that is associated with the BFD RS set(s) associated/corresponding to the first TCI state(s).

If a UE is indicated/configured/provided by the network 130, e.g., via higher layer RRC signaling and/or MAC CE command (e.g., via a TCI codepoint in a TCI state(s) indication/activation MAC CE) and/or dynamic DCI based L1 signaling (e.g., via a TCI codepoint of a TCI field in a beam indication DCI 1_1/1_2 with or without DL assignment), a set of one or more (unified) TCI states/pairs of TCI states for the PCell or the PSCell, and/or if the PCell or the PSCell is associated with one or more (e.g., two) BFD RS sets, and/or if the UE 116 has declared beam failure(s)—including sending the corresponding BFRQ and information (in PUSCH MAC CE for BFR) related to the beam failure(s)—for the BFD RS set(s) associated to the first TCI state(s) among the set of one or more (e.g., N=2) TCI states/pairs of TCI states indicated, e.g., by a TCI codepoint, in a beam indication DCI or MAC CE as specified herein in the present disclosure, after 28 symbols from a last symbol of a PDCCH reception with a DCI format scheduling a PUSCH transmission with a same hybrid automatic repeat request (HARQ) process number as for the transmission of the PUSCH that carries the information related to the beam failure(s) and having a toggled new data indicator (NDI) field value, the UE 116 could:

monitor PDCCH in all CORESETs or one or more CORESETs associated/corresponding to the first TCI state(s)—e.g., the one or more CORESETs configured/associated with the first indicator set to '00' or '10' or '11' as specified herein in the present disclosure-using the same antenna port quasi co-location parameters as the ones associated with the index q_new;

receive PDSCH associated/corresponding to the first TCI state(s)—e.g., the second indicator indicated in the (downlink) DCI (e.g., DCI format 1_0/1_1/1_2) that schedules/activates/triggers the PDSCH is set to '00' or '10' or '11' as specified herein in the present disclosure-using the same antenna port quasi co-location parameters as the ones associated with the index q_new;

receive aperiodic CSI-RS resource in a CSI-RS resource set with same indicated TCI state(s)—i.e., the first TCI state(s) here—as for the PDCCH and/or the PDSCH using the same antenna port quasi co-location parameters as the ones associated with the index q_new;

transmit PUCCH associated/corresponding to the first TCI state(s)—e.g., the corresponding PUCCH resource(s) configured/associated with the third indicator set to '00' or '10' or '11' as specified herein in the present disclosure-using a same spatial domain filter as the one corresponding to q_new; transmit PUSCH associated/corresponding to the first TCI state(s)—e.g., the fourth indicator indicated in the (uplink) DCI (e.g., DCI format 0_0/_01/0_2) that schedules/activates/triggers the PUSCH is set to '00' or '10' or '11' as specified herein in the present disclosure-using a same spatial domain filter as the one corresponding to q_new;

transmit SRS that uses a same spatial domain filter with same indicated TCI state(s)—i.e., the first TCI state(s) here—as for the PUCCH and/or the PUSCH using a same spatial domain filter as the one corresponding to q_new; and/or for transmitting the PUCCH, PUSCH and/or SRS as specified herein in the present disclosure, the following parameters for determination of a corresponding power can be used:

the RS index $q_d = q_{new}$ for obtaining the downlink pathloss estimate;

the values of $P_{O\_UE\_PUSCH,b,f,c}(j)$, $\alpha_{b,f,c}(j)$ and the PUSCH power control adjustment state l provided by p0-Alpha-CLID-PUSCH-Set associated with the first TCI state(s) and/or the smallest value of ul-powercontrolId for the PCell or the PSCell;

the value of $P_{O\_UE\_PUSCH,b,f,c}(q_u)$ and the PUCCH power control adjustment state l provided by p0-Alpha-CLID-PUCCH-Set associated with the first TCI state(s) and/or the smallest value of ul-powercontrolId for the PCell or the PSCell; and/or the values of $P_{O\_SRS,b,f,c}(q_s)$, $\alpha_{SRS,b,f,c}(q_s)$ and the SRS power control adjustment state l provided by p0-Alpha-CLID-SRS-Set associated with the first TCI state(s) and/or the smallest value of ul-powercontrolId for the PCell or the PSCell Furthermore, the index q_new could correspond to a RS index determined/selected by the UE 116 from the narrowband interference (NBI) RS set(s)—as specified herein in the present disclosure—that is associated with the BFD RS set(s) associated/corresponding to the first TCI state(s).

With reference to FIG. 16, after 28 symbols upon receiving the BFRR for the BFD RS set(s) associated to the first TCI state(s)—i.e., the BFD RS set(s) that has radio link quality worse than Qout, LR, the UE 116 would reset/update the beams for PDCCH, PDSCH, and PUSCH that are associated with/to the first TCI state(s)—e.g., their respective first, second and fourth indicators are set to '00'—according to the index q_new. For this example, the UE 116 would not reset/update the beam(s) for PUCCH according to the index q_new because the PUCCH is associated with/to the second TCI state(s)—e.g., the third indicator configured for the corresponding PUCCH resource(s) is set to '01'.

Figure 17:
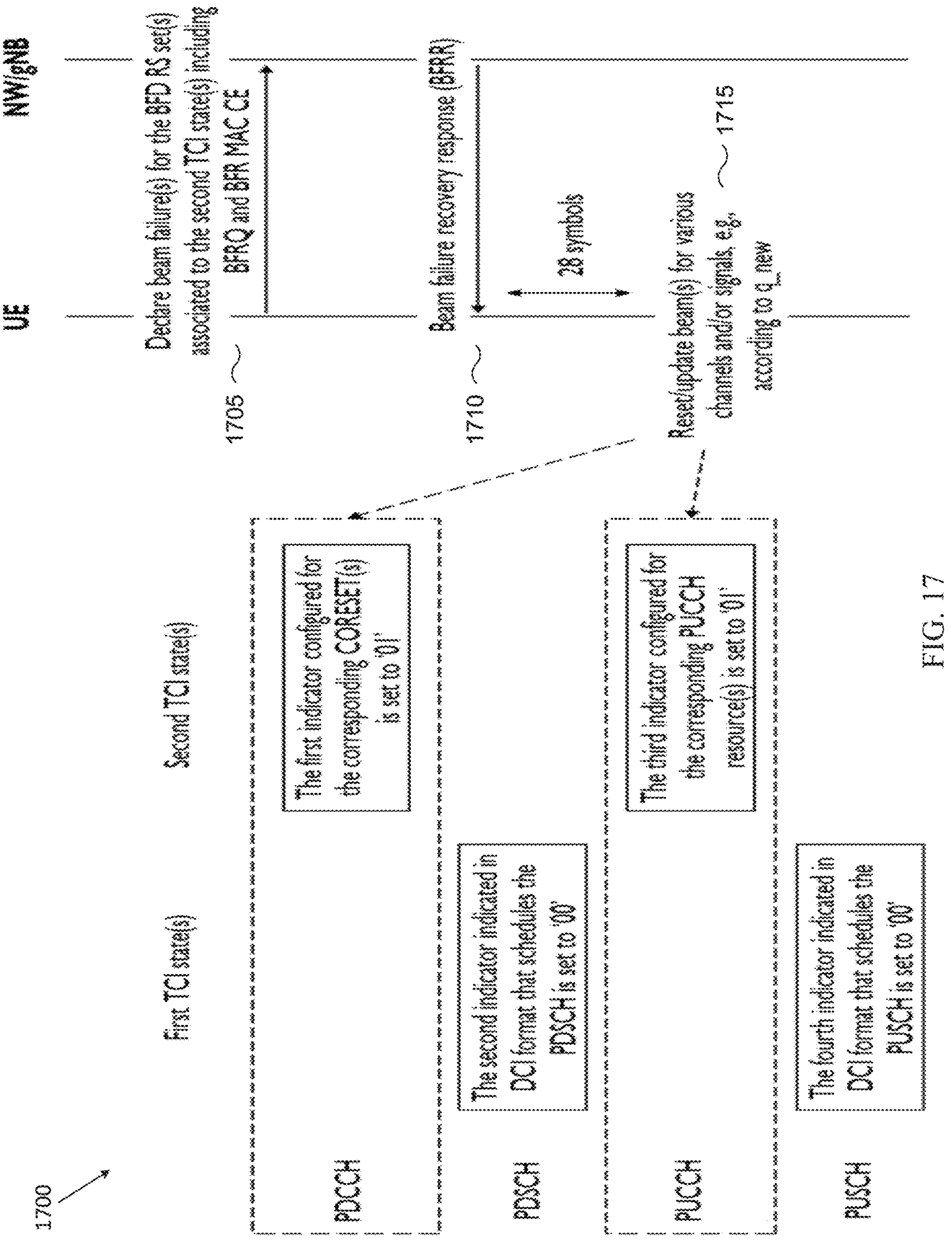
FIG. 17 illustrates an example procedure for beam resetting/updating according to embodiments of the present disclosure.

FIG. 17 illustrates an example procedure 1700 for beam resetting/updating according to embodiments of the present disclosure. For example, procedure 1700 can be performed by the UE 111 and the gNB 102 and/or the network 130 in the wireless network 100 of FIG. 1. This example is for illustration only and other embodiments can be used without departing from the scope of the present disclosure.

The procedure begins in 1705, the UE 116 sends a declaration of beam failure(s) for the BFD RS set(s) associated to the second TCI state(s) including BFRQ and BF MAC CE to the gNB 102 and/or the network 130. In 1710, the gNB 102 and/or the network 130 sends BFRR to the UE 116. In 1715, the UE 116 resets/updates beam(s) for various channels and/or signals, e.g., according to q_new.

In another example, the UE 116 could declare beam failure(s) for the BFD RS set(s) associated to the second TCI state(s) among the set of one or more (e.g., N=2) TCI states/pairs of TCI states indicated, e.g., by a TCI codepoint, in a beam indication DCI or MAC CE as specified herein in the present disclosure. For this design example, after the UE 116 has sent to the network 130 beam failure recovery request (BFRQ) and necessary information related to the BFD RS set(s) having radio link quality(s) worse than Qout, LR, etc., the UE 116 could expect to receive from the network 130 a beam failure recovery response (BFRR), upon which the UE 116 could reset/update the beam(s) for transmitting or receiving channels/signals associated to the BFD RS set(s)—and therefore, the second TCI state(s)—as the newly identified beam(s).

If a UE is indicated/configured/provided by the network 130, e.g., via higher layer RRC signaling and/or MAC CE command (e.g., via a TCI codepoint in a TCI state(s) indication/activation MAC CE) and/or dynamic DCI based L1 signaling (e.g., via a TCI codepoint of a TCI field in a beam indication DCI 1_1/1_2 with or without DL assignment), a set of one or more (unified) TCI states/pairs of TCI states for the PCell or the PSCell, and/or if the PCell or the PSCell is associated with one or more (e.g., two) BFD RS sets, and/or if the UE 116 has declared beam failure(s)—including sending the corresponding BFRQ and information (in PUSCH MAC CE for BFR) related to the beam failure(s)—for the BFD RS set(s) associated to the second TCI state(s) among the set of one or more (e.g., N=2) TCI states/pairs of TCI states indicated, e.g., by a TCI codepoint, in a beam indication DCI or MAC CE as specified herein in the present disclosure, and/or the UE 116 provides BFR MAC CE in Msg3 or MsgA of contention based random access procedure, after 28 symbols from a last symbol of a first PDCCH reception in a search space set provided by recoverySearchSpaceId where the UE 116 detects a DCI format with CRC scrambled by C-RNTI or MCS-C-RNTI or after 28 symbols from the last symbol of the PDCCH reception that determines the completion of the contention based random access procedure, the UE 116 could:

monitor PDCCH in all CORESETs or one or more CORESETs associated/corresponding to the second TCI state(s)—e.g., the one or more CORESETs configured/associated with the first indicator set to '01' or '10' or '11' as specified herein in the present disclosure-using the same antenna port quasi co-location parameters as the ones associated with the index q_new;

receive PDSCH associated/corresponding to the second TCI state(s)—e.g., the second indicator indicated in the (downlink) DCI (e.g., DCI format 1_0/1_1/1_2) that schedules/activates/triggers the PDSCH is set to '01' or '10' or '11' as specified herein in the present disclosure-using the same antenna port quasi co-location parameters as the ones associated with the index q_new;

receive aperiodic CSI-RS resource in a CSI-RS resource set with same indicated TCI state(s)—i.e., the second TCI state(s) here—as for the PDCCH and/or the PDSCH using the same antenna port quasi co-location parameters as the ones associated with the index q_new;

transmit PUCCH associated/corresponding to the second TCI state(s)—e.g., the corresponding PUCCH resource(s) configured/associated with the third indicator set to '01' or '10' or '11' as specified herein in the present disclosure-using a same spatial domain filter as for the last PRACH transmission;

transmit PUSCH associated/corresponding to the second TCI state(s)—e.g., the fourth indicator indicated in the (uplink) DCI (e.g., DCI format 0_0/0_1/0_2) that schedules/activates/triggers the PUSCH is set to '01' or '10' or '11' as specified herein in the present disclosure-using a same spatial domain filter as for the last PRACH transmission;

transmit SRS that uses a same spatial domain filter with same indicated TCI state(s)—i.e., the second TCI state(s) here—as for the PUCCH and/or the PUSCH using a same spatial domain filter as for the last PRACH transmission; and/or for transmitting the PUCCH, PUSCH and/or SRS as specified herein in the present disclosure, the following parameters for determination of a corresponding power can be used:

the RS index $q_d = q_{new}$ for obtaining the downlink pathloss estimate;

the values of $P_{O\_UE\_PUSCH,b,f,c}(j)$, $\alpha_{b,f,c}(j)$, and the PUSCH power control adjustment state l provided by p0-Alpha-CLID-PUSCH-Set associated with the second TCI state(s) and/or the smallest value of ul-powercontrolId for the PCell or the PSCell;

the value of $P_{O\_PUCCH,b,f,c}(q_u)$ and the PUCCH power control adjustment state l provided by p0-Alpha-CLID-PUCCH-Set associated with the second TCI state(s) and/or the smallest value of ul-powercontrolId for the PCell or the PSCell; and/or the values of $P_{O\_SRS,b,f,c}(q_s)$, $\alpha_{SRS,b,f,c}(q_s)$ and the SRS power control adjustment state l provided by p0-Alpha-CLID-SRS-Set associated with the second TCI state(s) and/or the smallest value of ul-powercontrolId for the PCell or the PSCell.

Furthermore, the index q_new could correspond to a RS index determined/selected by the UE 116 from the NBI RS set(s)—as specified herein in the present disclosure—that is associated with the BFD RS set(s) associated/corresponding to the second TCI state(s).

If a UE is indicated/configured/provided by the network 130, e.g., via higher layer RRC signaling and/or MAC CE command (e.g., via a TCI codepoint in a TCI state(s) indication/activation MAC CE) and/or dynamic DCI based L1 signaling (e.g., via a TCI codepoint of a TCI field in a beam indication DCI 1_1/1_2 with or without DL assignment), a set of one or more (unified) TCI states/pairs of TCI states for the PCell or the PSCell, and/or if the PCell or the PSCell is associated with one or more (e.g., two) BFD RS sets, and/or if the UE 116 has declared beam failure(s)—including sending the corresponding BFRQ and information (in PUSCH MAC CE for BFR) related to the beam failure(s)—for the BFD RS set(s) associated to the second TCI state(s) among the set of one or more (e.g., N=2) TCI states/pairs of TCI states indicated, e.g., by a TCI codepoint, in a beam indication DCI or MAC CE as specified herein in the present disclosure, after 28 symbols from a last symbol of a PDCCH reception with a DCI format scheduling a PUSCH transmission with a same HARQ process number as for the transmission of the PUSCH that carries the information related to the beam failure(s) and having a toggled NDI field value, the UE 116 could:

monitor PDCCH in all CORESETs or one or more CORESETs associated/corresponding to the second TCI state(s)—e.g., the one or more CORESETs configured/associated with the first indicator set to '01' or '10' or '11' as specified herein in the present disclosure-using the same antenna port quasi co-location parameters as the ones associated with the index q_new;

receive PDSCH associated/corresponding to the second TCI state(s)—e.g., the second indicator indicated in the (downlink) DCI (e.g., DCI format 1_0/1_1/1_2) that schedules/activates/triggers the PDSCH is set to '01' or '10' or '11' as specified herein in the present disclosure-using the same antenna port quasi co-location parameters as the ones associated with the index q_new;

receive aperiodic CSI-RS resource in a CSI-RS resource set with same indicated TCI state(s)—i.e., the second TCI state(s) here—as for the PDCCH and/or the PDSCH using the same antenna port quasi co-location parameters as the ones associated with the index q_new;

transmit PUCCH associated/corresponding to the second TCI state(s)—e.g., the corresponding PUCCH resource(s) configured/associated with the third indicator set to '01' or '10' or '11' as specified herein in the present disclosure-using a same spatial domain filter as the one corresponding to q_new;

transmit PUSCH associated/corresponding to the second TCI state(s)—e.g., the fourth indicator indicated in the (uplink) DCI (e.g., DCI format 0_0/0_1/0_2) that schedules/activates/triggers the PUSCH is set to '01' or '10' or '11' as specified herein in the present disclosure-using a same spatial domain filter as the one corresponding to q_new;

transmit SRS that uses a same spatial domain filter with same indicated TCI state(s)—i.e., the second TCI state(s) here—as for the PUCCH and/or the PUSCH using a same spatial domain filter as the one corresponding to q_new; and/or for transmitting the PUCCH, PUSCH and/or SRS as specified herein in the present disclosure, the following parameters for determination of a corresponding power can be used:

the RS index $q_d = q_{new}$ for obtaining the downlink pathloss estimate;

the values of $P_{O\_UE\_PUSCH,b,f,c}(j)$, $\alpha_{b,f,c}(j)$, and the PUSCH power control adjustment state l provided by p0-Alpha-CLID-PUSCH-Set associated with the second TCI state(s) and/or the smallest value of ul-powercontrolId for the PCell or the PSCell;

the value of $P_{O\_PUCCH,b,f,c}(q_u)$ and the PUCCH power control adjustment state l provided by p0-Alpha-CLID-PUCCH-Set associated with the second TCI state(s) and/or the smallest value of ul-powercontrolId for the PCell or the PSCell; and/or the values of $P_{O\_SRS,b,f,c}(q_s)$, $\alpha_{SRS,b,f,c}(q_s)$ and the SRS power control adjustment state provided by p0-Alpha-CLID-SRS-Set associated with the second TCI state(s) and/or the smallest value of ul-powercontrolId for the PCell or the PSCell.

Furthermore, the index q_new could correspond to a RS index determined/selected by the UE 116 from the NBI RS set(s)—as specified herein in the present disclosure—that is associated with the BFD RS set(s) associated/corresponding to the second TCI state(s).

With reference to FIG. 17, after 28 symbols upon receiving the BFRR for the BFD RS set(s) associated to the second TCI state(s)—i.e., the BFD RS set(s) that has radio link quality worse than Qout, LR, the UE 116 would reset/update the beams for PDCCH and PUCCH that are associated with/to the second TCI state(s)—e.g., their respective first and third indicators are set to '01'—according to the index q_new. For this example, the UE 116 would not reset/update the beam(s) for PDSCH and PUSCH according to the index q_new because they are associated with/to the first TCI state(s)—e.g., the second and fourth indicators indicated for the PDSCH and PUSCH are set to '00'.

In one embodiment, a UE could monitor and declare beam failure(s) for one or more TRPs in a (single-DCI based) MTRP system. As specified herein, a UE could assess the radio link quality(s) of one or more BFD RSs in one or more BFD RS sets associated to the first TCI state(s) and/or the second TCI state(s) among the set of one or more (e.g., N=2) TCI states/pairs of TCI states indicated, e.g., by a TCI codepoint, in a beam indication DCI or MAC CE as specified herein in the present disclosure. For this case, the (higher layers of) UE could declare beam failure(s) for the one or more BFD RS sets having radio link quality(s) worse than Qout, LR (and therefore, the corresponding/associated first and/or second TCI state(s)). As specified herein in the present disclosure, the one or more BFD RS sets (and therefore, the one or more BFD RSs provided therein) being corresponding/associated to the first TCI state(s) and/or the second TCI state(s) could be according to the value(s) of the first indicator configured for CORESET(s)/PDCCH reception (e.g., when/if the first indicator is set to '00', the BFD RS set(s) is associated to the first TCI state(s), when/if the first indicator is set to '01', the BFD RS set(s) is associated to the second TCI state(s), while when/if the first indicator is set to '10' or '11', the BFD RS set(s) is associated to both the first and second TCI states) and/or the second indicator indicated for PDSCH reception (e.g., when/if the second indicator is set to '00', the BFD RS set(s) is associated to the first TCI state(s), when/if the second indicator is set to '01', the BFD RS set(s) is associated to the second TCI state(s), while when/if the second indicator is set to '10' or '11', the BFD RS set(s) is associated to both the first and second TCI states) and/or the third indicator configured for PUCCH transmission (e.g., when/if the third indicator is set to '00', the BFD RS set(s) is associated to the first TCI state(s), when/if the third indicator is set to '01', the BFD RS set(s) is associated to the second TCI state(s), while when/if the third indicator is set to '10' or '11', the BFD RS set(s) is associated to both the first and second TCI states) and/or the fourth indicator indicated for PUSCH transmission (e.g., when/if the fourth indicator is set to '00', the BFD RS set(s) is associated to the first TCI state(s), when/if the fourth indicator is set to '01', the BFD RS set(s) is associated to the second TCI state(s), while when/if the fourth indicator is set to '10' or '11', the BFD RS set(s) is associated to both the first and second TCI states).

In one example, the UE 116 could declare beam failure(s) for the BFD RS set(s) associated to both the first and second TCI states among the set of one or more (e.g., N=2) TCI states/pairs of TCI states indicated, e.g., by a TCI codepoint, in a beam indication DCI or MAC CE as specified herein in the present disclosure. For this design example, after the UE 116 has sent to the network 130 beam failure recovery request (BFRQ) and necessary information related to the BFD RS set(s) having radio link quality(s) worse than Qout, LR, etc., the UE 116 could expect to receive from the network 130 a beam failure recovery response (BFRR), upon which the UE 116 could reset/update the beam(s) for transmitting or receiving channels/signals associated to the BFD RS set(s)—and therefore, the first TCI state(s) and/or the second TCI state(s)—as the newly identified beam(s).

Figure 18:
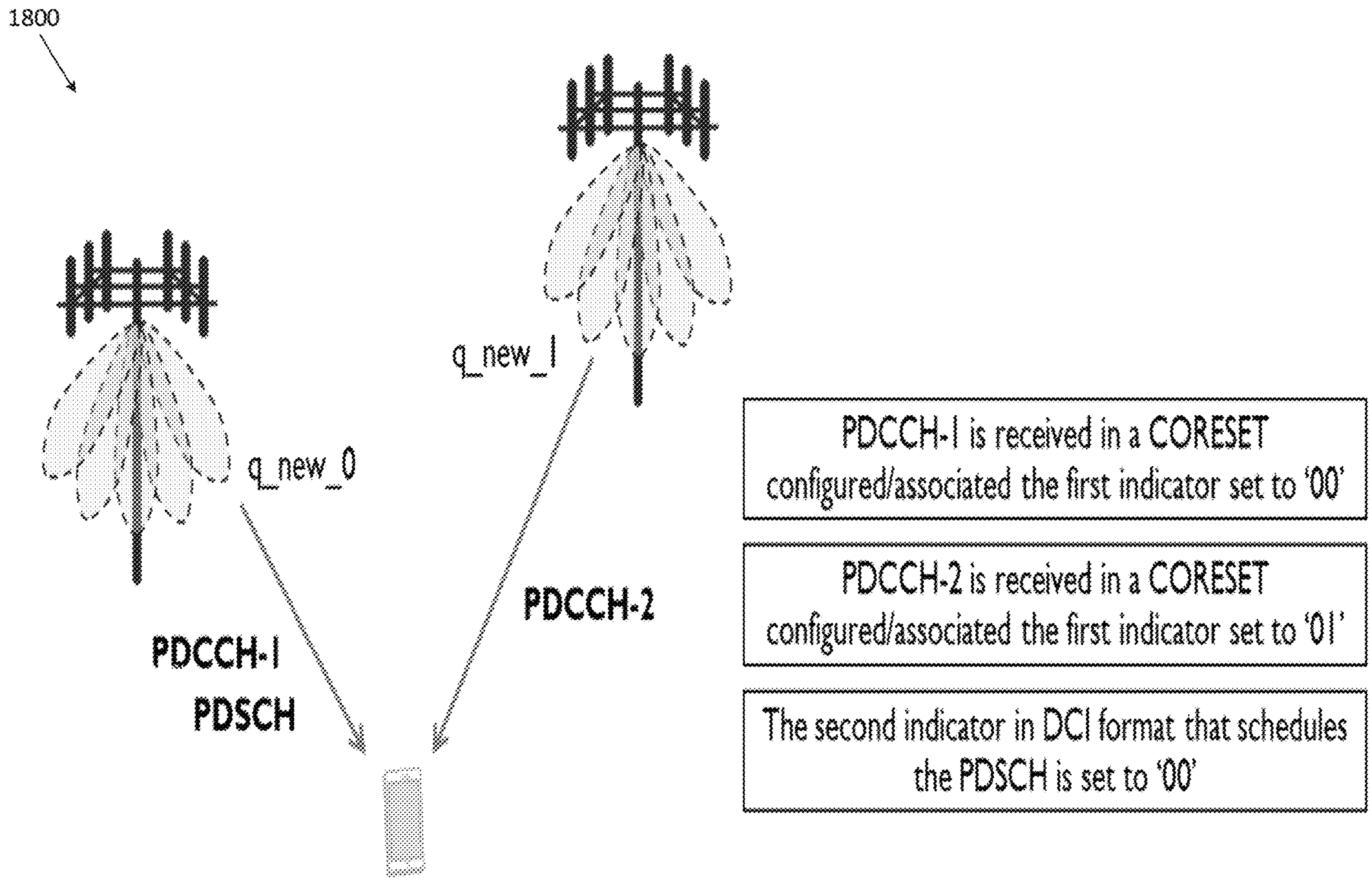
FIG. 18 illustrates an example system for receiving physical downlink control channel(s) (PDCCH(s)) and physical downlink shared channel (PDSCH) according to embodiments of the present disclosure.

FIG. 18 illustrates an example system 1800 for receiving PDCCH(s) and PDSCH according to embodiments of the present disclosure. For example, the system 1800 may operate within the wireless network 100 in FIG. 1. This example is for illustration only and other embodiments can be used without departing from the scope of the present disclosure.

If a UE is indicated/configured/provided by the network 130, e.g., via higher layer RRC signaling and/or MAC CE command (e.g., via a TCI codepoint in a TCI state(s) indication/activation MAC CE) and/or dynamic DCI based L1 signaling (e.g., via a TCI codepoint of a TCI field in a beam indication DCI 1_1/1_2 with or without DL assignment), a set of one or more (unified) TCI states/pairs of TCI states for the PCell or the PSCell, and/or if the PCell or the PSCell is associated with one or more (e.g., two) BFD RS sets, and/or if the UE 116 has declared beam failure(s)—including sending the corresponding BFRQ and information (in PUSCH MAC CE for BFR) related to the beam failure(s)—for the BFD RS set(s) associated to the first TCI state(s) and/or the second TCI state(s) among the set of one or more (e.g., N=2) TCI states/pairs of TCI states indicated, e.g., by a TCI codepoint, in a beam indication DCI or MAC CE as specified herein in the present disclosure, and/or the UE 116 provides BFR MAC CE in Msg3 or MsgA of contention based random access procedure, after 28 symbols from a last symbol of a first PDCCH reception in a search space set provided by recoverySearchSpaceId where the UE 116 detects a DCI format with CRC scrambled by C-RNTI or MCS-C-RNTI or after 28 symbols from the last symbol of the PDCCH reception that determines the completion of the contention based random access procedure:

For PDCCH reception, the UE 116 could:

- monitor PDCCH in all CORESETs or one or more CORESETs associated/corresponding to the first TCI state(s)—e.g., the one or more CORESETs configured/associated with the first indicator set to '00' as specified herein in the present disclosure-using the same antenna port quasi co-location parameters as the ones associated with the index q_new_0;
- monitor PDCCH in all CORESETs or one or more CORESETs associated/corresponding to the second TCI state(s)—e.g., the one or more CORESETs configured/associated with the first indicator set to '01' as specified herein in the present disclosure-using the same antenna port quasi co-location parameters as the ones associated with the index q_new_1; and/or
- monitor first PDCCH in all CORESETs or one or more CORESETs associated/corresponding to the first (or second) TCI state(s)—e.g., the one or more CORESETs configured/associated with the first indicator set to '10' (or '11') as specified herein in the present disclosure-using the same antenna port quasi co-location parameters as the ones associated with the index q_new_0 (or q_new_1), and monitor second PDCCH in all CORESETs or one or more CORESETs associated/corresponding to the second (or first) TCI state(s)—e.g., the one or more CORESETs configured/associated with the first indicator set to '10' (or '11') as specified herein in the present disclosure-using the same antenna port quasi co-location parameters as the ones associated with the index q_new_1 (or q_new_0), wherein the first and second PDCCHs could be fully overlapping in time or frequency (e.g., PDCCH-SFN) or partially/non-overlapping in time or frequency (e.g., PDCCH repetitions wherein the first and second PDCCHs could be received in search space sets that are higher layer linked by RRC signaling/parameter searchSpaceLinking).

For PDSCH reception, the UE 116 could:

receive PDSCH associated/corresponding to the first TCI state(s)—e.g., the second indicator indicated in the (downlink) DCI (e.g., DCI format 1_0/1_1/1_2) that schedules/activates/triggers the PDSCH is set to '00' as specified herein in the present disclosure-using the same antenna port quasi co-location parameters as the ones associated with the index q_new_0;

receive PDSCH associated/corresponding to the second TCI state(s)—e.g., the second indicator indicated in the (downlink) DCI (e.g., DCI format 1_0/1_1/1_2) that schedules/activates/triggers the PDSCH is set to '01' as specified herein in the present disclosure-using the same antenna port quasi co-location parameters as the ones associated with the index q_new_1; and/or receive first PDSCH associated/corresponding to the first (or second) TCI state(s)—e.g., the second indicator indicated in the (downlink) DCI (e.g., DCI format 1_0/1_1/1_2) that schedules/activates/triggers the first PDSCH is set to '10' (or '11') as specified herein in the present disclosure-using the same antenna port quasi co-location parameters as the ones associated with the index q_new_0, and receive second PDSCH associated/corresponding to the second (or first) TCI state(s)—e.g., the second indicator indicated in the (downlink) DCI (e.g., DCI format 1_0/1_1/1_2) that schedules/activates/triggers the second PDSCH is set to '10' (or '11') as specified herein in the present disclosure-using the same antenna port quasi co-location parameters as the ones associated with the index q_new_1, wherein the first and second PDSCHs could be fully overlapping in time or frequency (e.g., PDSCH-SFN) or partially/non-overlapping in time or frequency (e.g., PDSCH repetitions or transmission occasions).

For CSI-RS reception, the UE 116 could receive aperiodic CSI-RS resource in a CSI-RS resource set with same indicated TCI state(s)—i.e., the first and/or second TCI states here—as for the PDCCH(s) and/or the PDSCH(s) using the same antenna port quasi co-location parameters as the ones associated with the index q_new_0 and/or q_new_1.

For example, the UE 116 could receive the aperiodic CSI-RS associated/corresponding to the first TCI state(s)—e.g., triggered by DCI format/PDCCH received in CORESET(s) configured/associated with the first indicator set to '00' as specified herein in the present disclosure-using the same antenna port quasi co-location parameters as the ones associated with the index q_new_0;

For another example, the UE 116 could receive the aperiodic CSI-RS associated/corresponding to the second TCI state(s)—e.g., triggered by DCI format/PDCCH received in CORESET(s) configured/associated with the first indicator set to '01' as specified herein in the present disclosure—using the same antenna port quasi co-location parameters as the ones associated with the index q_new_1; and/or Yet for another example, the UE 116 could receive the aperiodic CSI-RS associated/corresponding to the first TCI state(s) and/or the second TCI state(s)—e.g., triggered by DCI format/PDCCH received in CORESET(s) configured/associated with the first indicator set to '10' or '11' as specified herein in the present disclosure-using the same antenna port quasi co-location parameters as the ones associated with the index q_new_0 and/or q_new_1.

For PUCCH transmission, the UE 116 could:

transmit PUCCH associated/corresponding to the first TCI state(s)—e.g., the corresponding PUCCH resource(s) configured/associated with the third indicator set to '00' as specified herein in the present disclosure-using a same spatial domain filter as for the last PRACH transmission—e.g., associated/corresponding to the first TCI state(s);

transmit PUCCH associated/corresponding to the second TCI state(s)—e.g., the corresponding PUCCH resource(s) configured/associated with the third indicator set to '01' as specified herein in the present disclosure-using a same spatial domain filter as for the last PRACH transmission—e.g., associated/corresponding to the second TCI state(s); and/or transmit first PUCCH associated/corresponding to the first (or second) TCI state(s)—e.g., the corresponding PUCCH resource(s) configured/associated with the third indicator set to '10' (or '11') as specified herein in the present disclosure-using a same spatial domain filter as for the last PRACH transmission—e.g., associated/corresponding to the first TCI state(s), and transmit second PUCCH associated/corresponding to the second (or first) TCI state(s)—e.g., the corresponding PUCCH resource(s) configured/associated with the third indicator set to '10' (or '11') as specified herein in the present disclosure-using a same spatial domain filter as for the last PRACH transmission—e.g., associated/corresponding to the second TCI state(s), wherein the first and second PUCCHs could be fully overlapping in time or frequency (e.g., PUCCH-SFN) or partially/non-overlapping in time or frequency (e.g., PUCCH repetitions or transmission occasions).

for PUSCH transmission, the UE 116 could:

transmit PUSCH associated/corresponding to the first TCI state(s)—e.g., the fourth indicator indicated in the (uplink) DCI (e.g., DCI format 0_0/0_1/0_2) that schedules/activates/triggers the PUSCH is set to '00' as specified herein in the present disclosure-using a same spatial domain filter as for the last PRACH transmission—e.g., associated/corresponding to the first TCI state(s);

transmit PUSCH associated/corresponding to the second TCI state(s)—e.g., the fourth indicator indicated in the (uplink) DCI (e.g., DCI format 0_0/0_1/0_2) that schedules/activates/triggers the PUSCH is set to '01' as specified herein in the present disclosure-using a same spatial domain filter as for the last PRACH transmission—e.g., associated/corresponding to the second TCI state(s); and/or transmit first PUSCH associated/corresponding to the first (or second) TCI state(s)—e.g., the fourth indicator indicated in the (uplink) DCI (e.g., DCI format 0_0/0_1/0_2) that schedules/activates/triggers the PUSCH is set to '10' (or '11') as specified herein in the present disclosure-using a same spatial domain filter as for the last PRACH transmission—e.g., associated/corresponding to the first TCI state(s), and transmit second PUSCH associated/corresponding to the second (or first) TCI state(s)—e.g., the fourth indicator indicated in the (uplink) DCI (e.g., DCI format 0_0/0_1/0_2) that schedules/activates/triggers the PUSCH is set to '10' (or '11') as specified herein in the present disclosure-using a same spatial domain filter as for the last PRACH transmission—e.g., associated/corresponding to the second TCI state(s), wherein the first and second PUSCHs could be fully overlapping in time or frequency (e.g., PUSCH-SFN) or partially/non-overlapping in time or frequency (e.g., PUSCH repetitions or transmission occasions).

for SRS transmission, the UE 116 could transmit SRS that uses same spatial filter(s) with same indicated TCI state(s)—i.e., the first and/or second TCI states here—as for the PUCCH(s) and/or the PUSCH(s) using same spatial domain filter(s) as for the last PRACH transmission(s)—e.g., associated/corresponding to the first TCI state(s) and/or the second TCI state(s).

For example, the UE 116 could transmit the (aperiodic) SRS associated/corresponding to the first TCI state(s)—e.g., triggered by DCI format/PDCCH received in CORESET(s) configured/associated with the first indicator set to '00' as specified herein in the present disclosure-using a same spatial domain filter as for the last PRACH transmission—e.g., associated/corresponding to the first TCI state(s);

For another example, the UE 116 could transmit the (aperiodic) SRS associated/corresponding to the second TCI state(s)—e.g., triggered by DCI format/PDCCH received in CORESET(s) configured/associated with the first indicator set to '01' as specified herein in the present disclosure—using a same spatial domain filter as for the last PRACH transmission—e.g., associated/corresponding to the second TCI state(s); and/or Yet for another example, the UE 116 could transmit the (aperiodic) SRS associated/corresponding to the first TCI state(s) and/or the second TCI state(s)—e.g., triggered by DCI format/PDCCH received in CORESET(s) configured/associated with the first indicator set to '10' or '11' as specified herein in the present disclosure-using same spatial domain filter(s) as for the last PRACH transmission(s)—e.g., associated/corresponding to the first TCI state(s) and/or the second TCI state(s);

for transmitting the PUCCH, PUSCH, and/or SRS associated/corresponding to the first TCI state(s) as specified herein in the present disclosure, the following parameters for determination of a corresponding power can be used:

the RS index q_d=q_new_0 for obtaining the downlink pathloss estimate;

the values of $P_{O\_UE\_PUSCH,b,f,c}(j)$, $\alpha_{b,f,c}(j)$, and the PUSCH power control adjustment state l provided by p0-Alpha-CLID-PUSCH-Set associated with the first TCI state(s) and/or the smallest value of ul-powercontrolId for the PCell or the PSCell;

the value of $P_{O\_PUCCH,b,f,c}(q_u)$ and the PUCCH power control adjustment state l provided by p0-Alpha-CLID-PUCCH-Set associated with the first TCI state(s) and/or the smallest value of ul-powercontrolId for the PCell or the PSCell; and/or the values of $P_{O\_SRS,b,f,c}(q_s)$, $\alpha_{SRS,b,f,c}(q_s)$, and the SRS power control adjustment state l provided by p0-Alpha-CLID-SRS-Set associated with the first TCI state(s) and/or the smallest value of ul-powercontrolId for the PCell or the PSCell.

for transmitting the PUCCH, PUSCH and/or SRS associated/corresponding to the second TCI state(s) as specified herein in the present disclosure, the following parameters for determination of a corresponding power can be used:

the RS index q_d=q_new_1 for obtaining the downlink pathloss estimate;

the values of $P_{O\_UE\_PUSCH,b,f,c}(j)$, $\alpha_{b,f,c}(j)$, and the PUSCH power control adjustment state l provided by p0-Alpha-CLID-PUSCH-Set associated with the second TCI state(s) and/or the smallest value of ul-powercontrolId for the PCell or the PSCell;

the value of $P_{O\_PUCCH,b,f,c}(q_u)$ and the PUCCH power control adjustment state l provided by p0-Alpha-CLID-PUCCH-Set associated with the second TCI state(s) and/or the smallest value of ul-powercontrolId for the PCell or the PSCell; and/or the values of $P_{O\_SRS,b,f,c}(q_s)$, $\alpha_{SRS,b,f,c}(q_s)$, and the SRS power control adjustment state l provided by p0-Alpha-CLID-SRS-Set associated with the second TCI state(s) and/or the smallest value of ul-powercontrolId for the PCell or the PSCell.

Furthermore, the index q_new_0 could correspond to a RS index determined/selected by the UE 116 from the NBI RS set(s)—as specified herein in the present disclosure—that is associated with the BFD RS set(s) associated/corresponding to the first TCI state(s), and the index q_new_1 could correspond to a RS index determined/selected by the UE 116 from the NBI RS set(s)—as specified herein in the present disclosure—that is associated with the BFD RS set(s) associated/corresponding to the second TCI state(s).

With reference to FIG. 18, the UE 116 would reset/update the TCI state(s)/beam(s) for receiving PDCCH-1 and PDSCH according to the index q_new_0 as the first indicator configured for PDCCH-1 and the second indicator indicated for the PDSCH are set to '00', while the UE 116 would reset/update the TCI state(s)/beam(s) for receiving PDCCH-2 according to the index q_new_1 because the first indicator configured for PDCCH-1 is set to '01'.

If a UE is indicated/configured/provided by the network 130, e.g., via higher layer RRC signaling and/or MAC CE command (e.g., via a TCI codepoint in a TCI state(s) indication/activation MAC CE) and/or dynamic DCI based L1 signaling (e.g., via a TCI codepoint of a TCI field in a beam indication DCI 1_1/1_2 with or without DL assignment), a set of one or more (unified) TCI states/pairs of TCI states for the PCell or the PSCell, and/or if the PCell or the PSCell is associated with one or more (e.g., two) BFD RS sets, and/or if the UE 116 has declared beam failure(s)—including sending the corresponding BFRQ and information (in PUSCH MAC CE for BFR) related to the beam failure(s)—for the BFD RS set(s) associated to the first TCI state(s) and/or the second TCI state(s) among the set of one or more (e.g., N=2) TCI states/pairs of TCI states indicated, e.g., by a TCI codepoint, in a beam indication DCI or MAC CE as specified herein in the present disclosure, after 28 symbols from a last symbol of a PDCCH reception with a DCI format scheduling a PUSCH transmission with a same HARQ process number as for the transmission of the PUSCH that carries the information related to the beam failure(s) and having a toggled NDI field value:

for PDCCH reception, the UE 116 could:

monitor PDCCH in all CORESETs or one or more CORESETs associated/corresponding to the first TCI state(s)—e.g., the one or more CORESETs configured/associated with the first indicator set to '00' as specified herein in the present disclosure-using the same antenna port quasi co-location parameters as the ones associated with the index q_new_0;

monitor PDCCH in all CORESETs or one or more CORESETs associated/corresponding to the second TCI state(s)—e.g., the one or more CORESETs configured/associated with the first indicator set to '01' as specified herein in the present disclosure-using the same antenna port quasi co-location parameters as the ones associated with the index q_new_1; and/or monitor first PDCCH in all CORESETs or one or more CORESETs associated/corresponding to the first (or second) TCI state(s)—e.g., the one or more CORESETs configured/associated with the first indicator set to '10' (or '11') as specified herein in the present disclosure-using the same antenna port quasi co-location parameters as the ones associated with the index q_new_0 (or q_new_1), and monitor second PDCCH in all CORESETs or one or more CORESETs associated/corresponding to the second (or first) TCI state(s)—e.g., the one or more CORESETs configured/associated with the first indicator set to '10' (or '11') as specified herein in the present disclosure-using the same antenna port quasi co-location parameters as the ones associated with the index q_new_1 (or q_new_0), wherein the first and second PDCCHs could be fully overlapping in time or frequency (e.g., PDCCH-SFN) or partially/non-overlapping in time or frequency (e.g., PDCCH repetitions wherein the first and second PDCCHs could be received in search space sets that are higher layer linked by RRC signaling/parameter searchSpaceLinking).

for PDSCH reception, the UE 116 could:

receive PDSCH associated/corresponding to the first TCI state(s)—e.g., the second indicator indicated in the (downlink) DCI (e.g., DCI format 1_0/1_1/1_2) that schedules/activates/triggers the PDSCH is set to '00' as specified herein in the present disclosure-using the same antenna port quasi co-location parameters as the ones associated with the index q_new_0;

receive PDSCH associated/corresponding to the second TCI state(s)—e.g., the second indicator indicated in the (downlink) DCI (e.g., DCI format 1_0/1_1/1_2) that schedules/activates/triggers the PDSCH is set to '01' as specified herein in the present disclosure-using the same antenna port quasi co-location parameters as the ones associated with the index q_new_1; and/or receive first PDSCH associated/corresponding to the first (or second) TCI state(s)—e.g., the second indicator indicated in the (downlink) DCI (e.g., DCI format 1_0/1_1/1_2) that schedules/activates/triggers the first PDSCH is set to '10' (or '11') as specified herein in the present disclosure-using the same antenna port quasi co-location parameters as the ones associated with the index q_new_0, and receive second PDSCH associated/corresponding to the second (or first) TCI state(s)—e.g., the second indicator indicated in the (downlink) DCI (e.g., DCI format 1_0/1_1/1_2) that schedules/activates/triggers the second PDSCH is set to '10' (or '11') as specified herein in the present disclosure-using the same antenna port quasi co-location parameters as the ones associated with the index q_new_1, wherein the first and second PDSCHs could be fully overlapping in time or frequency (e.g., PDSCH-SFN) or partially/non-overlapping in time or frequency (e.g., PDSCH repetitions or transmission occasions).

for CSI-RS reception, the UE 116 could receive aperiodic CSI-RS resource in a CSI-RS resource set with same indicated TCI state(s)—i.e., the first and/or second TCI states here—as for the PDCCH(s) and/or the PDSCH(s) using the same antenna port quasi co-location parameters as the ones associated with the index q_new_0 and/or q_new_1.

For example, the UE 116 could receive the aperiodic CSI-RS associated/corresponding to the first TCI state(s)—e.g., triggered by DCI format/PDCCH received in CORESET(s) configured/associated with the first indicator set to '00' as specified herein in the present disclosure-using the same antenna port quasi co-location parameters as the ones associated with the index q_new_0.

For another example, the UE 116 could receive the aperiodic CSI-RS associated/corresponding to the second TCI state(s)—e.g., triggered by DCI format/PDCCH received in CORESET(s) configured/associated with the first indicator set to '01' as specified herein in the present disclosure—using the same antenna port quasi co-location parameters as the ones associated with the index q_new_1.

Yet for another example, the UE 116 could receive the aperiodic CSI-RS associated/corresponding to the first TCI state(s) and/or the second TCI state(s)—e.g., triggered by DCI format/PDCCH received in CORESET(s) configured/associated with the first indicator set to '10' or '11' as specified herein in the present disclosure-using the same antenna port quasi co-location parameters as the ones associated with the index q_new_0 and/or q_new_1.

for PUCCH transmission, the UE 116 could:

transmit PUCCH associated/corresponding to the first TCI state(s)—e.g., the corresponding PUCCH resource(s) configured/associated with the third indicator set to '00' as specified herein in the present disclosure-using a same spatial domain filter as the one corresponding to q_new_0;

transmit PUCCH associated/corresponding to the second TCI state(s)—e.g., the corresponding PUCCH resource(s) configured/associated with the third indicator set to '01' as specified herein in the present disclosure-using a same spatial domain filter as the one corresponding to q_new_1; and/or transmit first PUCCH associated/corresponding to the first (or second) TCI state(s)—e.g., the corresponding PUCCH resource(s) configured/associated with the third indicator set to '10' (or '11') as specified herein in the present disclosure-using a same spatial domain filter as the one corresponding to q_new_0, and transmit second PUCCH associated/corresponding to the second (or first) TCI state(s)—e.g., the corresponding PUCCH resource(s) configured/associated with the third indicator set to '10' (or '11') as specified herein in the present disclosure-using a same spatial domain filter as the one corresponding to q_new_1, wherein the first and second PUCCHs could be fully overlapping in time or frequency (e.g., PUCCH-SFN) or partially/non-overlapping in time or frequency (e.g., PUCCH repetitions or transmission occasions).

for PUSCH transmission, the UE 116 could:

transmit PUSCH associated/corresponding to the first TCI state(s)—e.g., the fourth indicator indicated in the (uplink) DCI (e.g., DCI format 0_0/0_1/0_2) that schedules/activates/triggers the PUSCH is set to '00' as specified herein in the present disclosure-using a same spatial domain filter as the one corresponding to q_new_0;

transmit PUSCH associated/corresponding to the second TCI state(s)—e.g., the fourth indicator indicated in the (uplink) DCI (e.g., DCI format 0_0/0_1/0_2) that schedules/activates/triggers the PUSCH is set to '01' as specified herein in the present disclosure-using a same spatial domain filter as the one corresponding to q_new_1; and/or transmit first PUSCH associated/corresponding to the first (or second) TCI state(s)—e.g., the fourth indicator indicated in the (uplink) DCI (e.g., DCI format 0_0/0_1/0_2) that schedules/activates/triggers the PUSCH is set to '10' (or '11') as specified herein in the present disclosure-using a same spatial domain filter as the one corresponding to q_new_0, and transmit second PUSCH associated/corresponding to the second (or first) TCI state(s)—e.g., the fourth indicator indicated in the (uplink) DCI (e.g., DCI format 0_0/0_1/0_2) that schedules/activates/triggers the PUSCH is set to '10' (or '11') as specified herein in the present disclosure-using a same spatial domain filter as the one corresponding to q_new_1, wherein the first and second PUSCHs could be fully overlapping in time or frequency (e.g., PUSCH-SFN) or partially/non-overlapping in time or frequency (e.g., PUSCH repetitions or transmission occasions).

for SRS transmission, the UE 116 could transmit SRS that uses same spatial filter(s) with same indicated TCI state(s)—i.e., the first and/or second TCI states here—as for the PUCCH(s) and/or the PUSCH(s) using same spatial domain filter(s) as the one(s) corresponding to q_new_0 and q_new_1.

For example, the UE 116 could transmit the (aperiodic) SRS associated/corresponding to the first TCI state(s)—e.g., triggered by DCI format/PDCCH received in CORESET(s) configured/associated with the first indicator set to '00' as specified herein in the present disclosure-using a same spatial domain filter as the one corresponding to q_new_0.

For another example, the UE 116 could transmit the (aperiodic) SRS associated/corresponding to the second TCI state(s)—e.g., triggered by DCI format/PDCCH received in CORESET(s) configured/associated with the first indicator set to '01' as specified herein in the present disclosure—using a same spatial domain filter as the one corresponding to q_new_1.

Yet for another example, the UE 116 could transmit the (aperiodic) SRS associated/corresponding to the first TCI state(s) and/or the second TCI state(s)—e.g., triggered by DCI format/PDCCH received in CORESET(s) configured/associated with the first indicator set to '10' or '11' as specified herein in the present disclosure-using same spatial domain filter(s) as the one(s) corresponding to q_new_0 and/or q_new_1.

for transmitting the PUCCH, PUSCH and/or SRS associated/corresponding to the first TCI state(s) as specified herein in the present disclosure, the following parameters for determination of a corresponding power can be used:

the RS index q_d=q_new_0 for obtaining the downlink pathloss estimate;

the values of $P_{O\_UE\_PUSCH,b,f,c}(j)$, $\alpha_{b,f,c}(j)$, and the PUSCH power control adjustment state l provided by p0-Alpha-CLID-PUSCH-Set associated with the first TCI state(s) and/or the smallest value of ul-powercontrolId for the PCell or the PSCell;

the value of $P_{O\_PUCCH,b,f,c}(q_u)$ and the PUCCH power control adjustment state l provided by p0-Alpha-CLID-PUCCH-Set associated with the first TCI state(s) and/or the smallest value of ul-powercontrolId for the PCell or the PSCell; and/or the values of $P_{O\_SRS,b,f,c}(q_s)$, $\alpha_{SRS,b,f,c}(q_s)$, and the SRS power control adjustment state l provided by p0-Alpha-CLID-SRS-Set associated with the first TCI state(s) and/or the smallest value of ul-powercontrolId for the PCell or the PSCell.

for transmitting the PUCCH, PUSCH and/or SRS associated/corresponding to the second TCI state(s) as specified herein in the present disclosure, the following parameters for determination of a corresponding power can be used:

the RS index q_d=q_new_1 for obtaining the downlink pathloss estimate;

the values of $P_{O\_UE\_PUSCH,b,f,c}(j)$, $\alpha_{b,f,c}(j)$, and the PUSCH power control adjustment state l provided by p0-Alpha-CLID-PUSCH-Set associated with the second TCI state(s) and/or the smallest value of ul-powercontrolId for the PCell or the PSCell;

the value of $P_{O\_PUCCH,b,f,c}(q_u)$ and the PUCCH power control adjustment state l provided by p0-Alpha-CLID-PUCCH-Set associated with the second TCI state(s) and/or the smallest value of ul-powercontrolId for the PCell or the PSCell; and/or the values of $P_{O\_SRS,b,f,c}(q_s)$, $\alpha_{SRS,b,f,c}(q_s)$, and the SRS power control adjustment state l provided by p0-Alpha-CLID-SRS-Set associated with the second TCI state(s) and/or the smallest value of ul-powercontrolId for the PCell or the PSCell.

Furthermore, the index q_new_0 could correspond to a RS index determined/selected by the UE 116 from the NBI RS set(s)—as specified herein in the present disclosure—that is associated with the BFD RS set(s) associated/corresponding to the first TCI state(s), and the index q_new_1 could correspond to a RS index determined/selected by the UE 116 from the NBI RS set(s)—as specified herein in the present disclosure—that is associated with the BFD RS set(s) associated/corresponding to the second TCI state(s).

Figure 19:
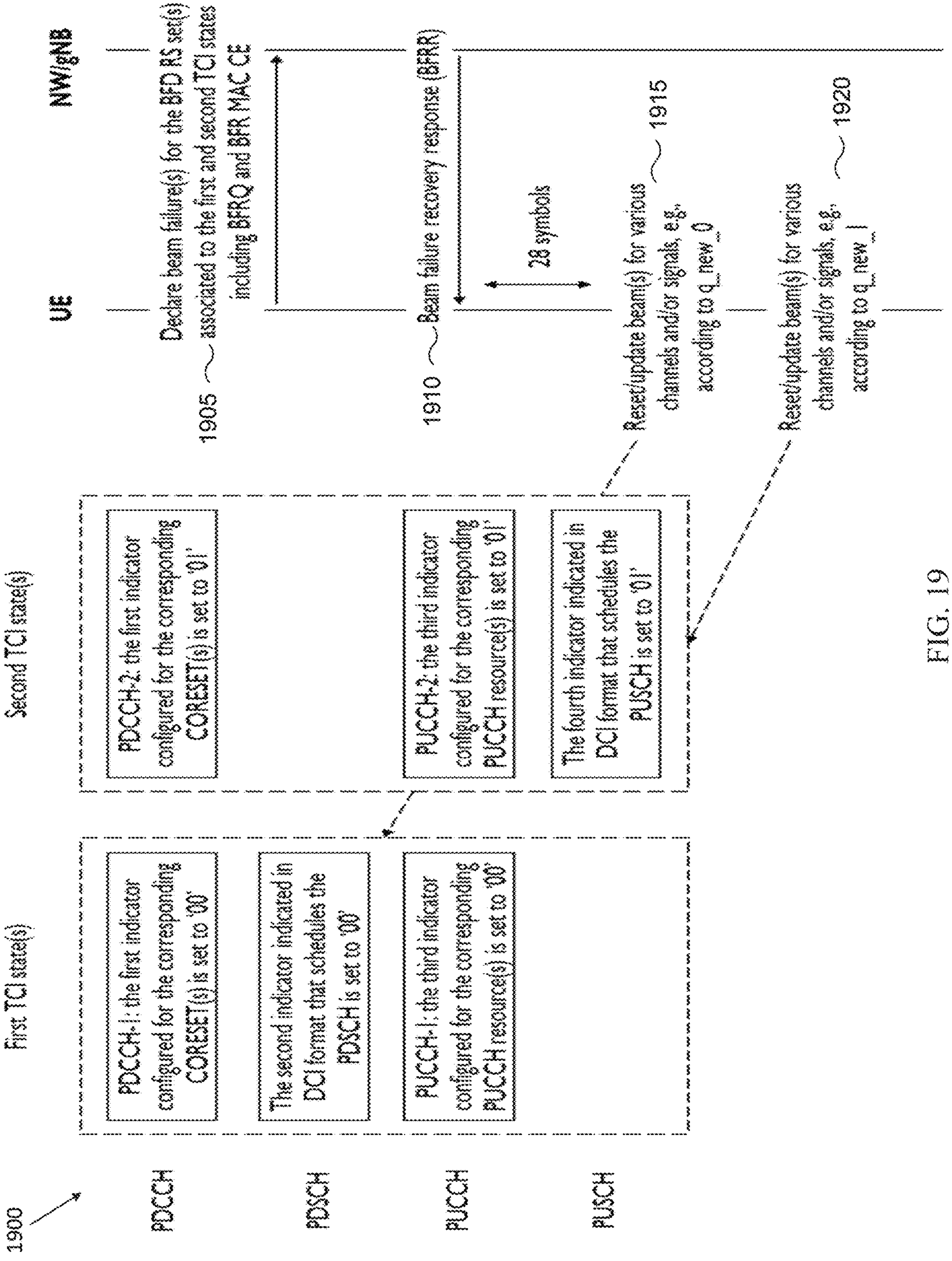
FIG. 19 illustrates an example procedure for beam resetting/updating according to embodiments of the present disclosure.

FIG. 19 illustrates an example procedure 1900 for beam resetting/updating according to embodiments of the present disclosure. For example, procedure 1900 can be performed by the UE 113 and the gNB 102 and/or the network 130 in the wireless network 100 of FIG. 1. This example is for illustration only and other embodiments can be used without departing from the scope of the present disclosure.

The procedure begins in 1905, the UE 116 sends a declaration of beam failure(s) for the BFD RS set(s) associated to the first and second TCI states including BFRQ and BFR MAC CE to the gNB 102 and/or the network 130. In 1910, the gNB 102 and/or the network 130 sends a BFRR to the UE 116. In 1915, the UE 116 resets/updates beam(s) for various channels and/or signals, e.g., according to q_new_0. In 1920 the UE 116 resets/updates beam(s) for various channels and/or signals, e.g., according to q_new_1.

With reference to FIG. 19, the UE 116 declares beam failure(s) for the BFD RS set(s) associated to both the first and second TCI states. 28 symbols after receiving the BFRR, the UE 116 resets/updates the TCI state(s)/beam(s) for receiving PDCCH-1 and the PDSCH, and for transmitting PUCCH-1 and the PUSCH according to the index q_new_0, while the UE 116 resets/updates the TCI state(s)/beam(s) for receiving PDCCH-2 and for transmitting PUCCH-2 according to the index q_new_1. As illustrated in FIG. 12, PDCCH-1 is associated to the first TCI state(s) as the respective first indicator is set to '00', PDCCH-2 is associated to the second TCI state(s) as the respective first indicator is set to '01'. For the PDSCH, as the respective second indicator is set to '00', it is associated to the first TCI state(s). Furthermore, PUCCH-1 and PUCCH-2 are respectively associated to the first and second TCI states as their respective third indicators are set to '00' and '01', respectively. For the PUSCH, as the respective fourth indicator is set to '01', it is associated to the second TCI state(s).

In one example, the presence or absence of the first indicator for PDCCH reception could be configured by the network 130, e.g., via higher layer RRC signaling/parameter and/or MAC CE command and/or dynamic DCI based L1 signaling. When/if the first indicator is not present or is not configured, the UE 116 could use/apply fallback or default TCI state(s)/beam(s) to receive/monitor the corresponding PDCCH(s). For this case, when/if the fallback or default TCI state(s) correspond to the first TCI state(s) and/or the second TCI state(s), 28 symbols after receiving the BFRR, the UE 116 could reset/update the TCI state(s)/beam(s) for receiving/monitoring the PDCCH(s) according to those specified herein in the present disclosure for the corresponding first TCI state(s) and/or the second TCI state(s).

In one example, the presence or absence of the second indicator for PDSCH reception could be configured by the network 130, e.g., via higher layer RRC signaling/parameter and/or MAC CE command and/or dynamic DCI based L1 signaling. When/if the second indicator is not present or is not configured, the UE 116 could use/apply fallback or default TCI state(s)/beam(s) to receive the corresponding PDSCH(s). For this case, when/if the fallback or default TCI state(s) correspond to the first TCI state(s) and/or the second TCI state(s), 28 symbols after receiving the BFRR, the UE 116 could reset/update the TCI state(s)/beam(s) for receiving the PDSCH(s) according to those specified herein in the present disclosure for the corresponding first TCI state(s) and/or the second TCI state(s).

In one example, the presence or absence of the third indicator for PUCCH transmission could be configured by the network 130, e.g., via higher layer RRC signaling/parameter and/or MAC CE command and/or dynamic DCI based L1 signaling. When/if the third indicator is not present or is not configured, the UE 116 could use/apply fallback or default TCI state(s)/beam(s) to transmit the corresponding PUCCH(s). For this case, when/if the fallback or default TCI state(s) correspond to the first TCI state(s) and/or the second TCI state(s), 28 symbols after receiving the BFRR, the UE 116 could reset/update the TCI state(s)/beam(s) for transmitting the PUCCH(s) according to those specified herein in the present disclosure for the corresponding first TCI state(s) and/or the second TCI state(s).

In one example, the presence or absence of the fourth indicator for PUSCH transmission could be configured by the network 130, e.g., via higher layer RRC signaling/parameter and/or MAC CE command and/or dynamic DCI based L1 signaling. When/if the fourth indicator is not present or is not configured, the UE 116 could use/apply fallback or default TCI state(s)/beam(s) to transmit the corresponding PUSCH(s). For this case, when/if the fallback or default TCI state(s) correspond to the first TCI state(s) and/or the second TCI state(s), 28 symbols after receiving the BFRR, the UE 116 could reset/update the TCI state(s)/beam(s) for transmitting the PUSCH(s) according to those specified herein in the present disclosure for the corresponding first TCI state(s) and/or the second TCI state(s).

For modulation and coding configuration indicator (MDCI) based MTRP operation (e.g., if a UE is provided two coresetPoolIndex values 0 and 1 for the first and second CORESETs, or is not provided coresetPoolIndex value for the first CORESETs and is provided coresetPoolIndex value of 1 for the second CORESETs, respectively), the UE 116 could receive from the network 130 an (enhanced) unified TCI state(s) activation/deactivation MAC CE command used to map up to Ntci (e.g., Ntci=8) TCI states and/or pairs of TCI states, with one TCI state for DL channels/signals and/or one TCI state for UL channels/signals to the TCI codepoints of the DCI field 'Transmission Configuration Indication' for one or for a set of CCs/DL bandwidth parts (BWPs), and if applicable, for one or for a set of CCs/UL BWPs. If the (enhanced) unified TCI state(s) activation/deactivation MAC CE command maps TCI-State and/or UL-TCI-State to only one TCI codepoint, the UE 116 would apply the indicated TCI-State and/or UL-TCI-State to one or to a set of CCs/DL BWPs, and if applicable, to one or to a set of CCs/UL BWPs once the indicated mapping for the one single TCI codepoint is applied. Furthermore, the (enhanced) unified TCI state(s) activation/deactivation MAC CE command could also provide/indicate/configure/include/contain/comprise a coresetPoolIndex value field. When/if the coresetPoolIndex value field in the (enhanced) unified TCI state(s) activation/deactivation MAC CE is set to '0' (or '1'), the joint/DL/UL TCI state(s) activated by/in the (enhanced) unified TCI state(s) activation/deactivation MAC CE could be specific/associated to/with the coresetPoolIndex value 0 (or 1).

In one example, the UE 116 could be indicated by the network 130, e.g., via one or more TCI codepoints of one or more TCI fields in one or more DCIs (e.g., DCI format 1_1/1_2 with or without DL assignment) received in one or more CORESETs associated/configured with coresetPoolIndex value 0, at least one TCI state for DL channels/signals and/or one TCI state for UL channels/signals for one or for a set of CCs/DL BWPs, and if applicable, for one or for a set of CCs/UL BWPs; for this case, the one TCI state for DL channels/signals and/or the one TCI state for UL channels/signals could be specific/associated to/with the coresetPoolIndex value 0. Furthermore, the one TCI state for DL channels/signals (and/or the one TCI state for UL channels/signals) could correspond to or replace the first TCI state(s) used throughout the present disclosure for specifying the beam resetting behaviors/operations in a single-DCI based multi-TRP system to specify beam resetting behaviors/operations in a multi-DCI based multi-TRP system (e.g., if a UE is provided two coresetPoolIndex values 0 and 1 for the first and second CORESETs, or is not provided coresetPoolIndex value for the first CORESETs and is provided coresetPoolIndex value of 1 for the second CORESETs, respectively). Furthermore, for this case, any channels, signals, information, parameters, configurations, indications, settings, etc. associated/specific to/with the first TCI state(s) as specified throughout the present disclosure could also be (said to be) associated/specific to/with coresetPoolIndex value 0 in a multi-DCI based multi-TRP system (e.g., if a UE is provided two coresetPoolIndex values 0 and 1 for the first and second CORESETs, or is not provided coresetPoolIndex value for the first CORESETs and is provided coresetPoolIndex value of 1 for the second CORESETs, respectively).

In one example, the UE 116 could be indicated by the network 130, e.g., via one or more TCI codepoints of one or more TCI fields in one or more DCIs (e.g., DCI format 1_1/1_2 with or without DL assignment) received in one or more CORESETs associated/configured with coresetPoolIndex value 1, at least one TCI state for DL channels/signals and/or one TCI state for UL channels/signals for one or for a set of CCs/DL BWPs, and if applicable, for one or for a set of CCs/UL BWPs; for this case, the one TCI state for DL channels/signals and/or the one TCI state for UL channels/signals could be specific/associated to/with the coresetPoolIndex value 1. Furthermore, the one TCI state for DL channels/signals (and/or the one TCI state for UL channels/signals) could correspond to or replace the second TCI state(s) used throughout the present disclosure for specifying the beam resetting behaviors/operations in a single-DCI based multi-TRP system to specify beam resetting behaviors/operations in a multi-DCI based multi-TRP system (e.g., if a UE is provided two coresetPoolIndex values 0 and 1 for the first and second CORESETs, or is not provided coresetPoolIndex value for the first CORESETs and is provided coresetPoolIndex value of 1 for the second CORESETs, respectively). Furthermore, for this case, any channels, signals, information, parameters, configurations, indications, settings, etc. associated/specific to/with the second TCI state(s) as specified throughout the present disclosure could also be (said to be) associated/specific to/with coresetPoolIndex value 1 in a multi-DCI based multi-TRP system (e.g., if a UE is provided two coresetPoolIndex values 0 and 1 for the first and second CORESETs, or is not provided coresetPoolIndex value for the first CORESETs and is provided coresetPoolIndex value of 1 for the second CORESETs, respectively).

Any of the above variation embodiments can be utilized independently or in combination with at least one other variation embodiment.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE), comprising:
a transceiver configured to:
transmit a physical uplink shared channel (PUSCH) including a first reference signal (RS) index for a first beam failure recovery request associated with a first beam failure detection (BFD) RS set;
receive a response to the first beam failure recovery request;
receive first information for reception of a physical downlink control channel (PDCCH); and
receive second information for reception of a physical downlink shared channel (PDSCH); and
a processor operably coupled to the transceiver, the processor configured to:
determine, based on the response and the first information, whether to apply a first spatial domain filter according to the first RS index for reception of the PDCCH; and
determine, based on the response and the second information, whether to apply a second spatial domain filter according to the first RS index for reception of the PDSCH, wherein:
the first information is provided in a higher layer parameter ControlResourceSet that configures reception of the PDCCH;
when the first information is set to 'first', reception of the PDCCH is based on a first transmission configuration indication (TCI) state;
when the first information is set to 'second', reception of the PDCCH is based on a second TCI state; and
when the first information is set to 'both', reception of the PDCCH is based on both the first and second TCI states.

2. The UE of claim 1, wherein the response corresponds to a PDCCH reception with a downlink control information (DCI) format that (i) schedules a PUSCH transmission with a hybrid automatic repeat request (HARQ) process number used for transmitting the PUSCH and (ii) includes a toggled new data indicator (NDI) field value.

3. The UE of claim 1, wherein, when the first information is set to 'first' or 'both', the processor is further configured to apply the first spatial domain filter according to the first RS index for reception of the PDCCH.

4. The UE of claim 1, wherein:
the second information is indicated in a downlink control information (DCI) format that schedules reception of the PDSCH;
when the second information is set to '00', reception of the PDSCH is based on a first transmission configuration indication (TCI) state;
when the second information is set to '01', reception of the PDSCH is based on a second TCI state; and
when the second information is set to '10', reception of the PDSCH is based on both the first and second TCI states.

5. The UE of claim 4, wherein, when the second information is set to '00' or '10', the processor is further configured to apply the second spatial domain filter according to the first RS index for reception of the PDSCH.

6. The UE of claim 1, wherein:
when an initial transmission of a physical uplink control channel (PUCCH) is based on a first transmission configuration indication (TCI) state, the processor is further configured to apply a third spatial domain filter according to the first RS index for a subsequent transmission of the PUCCH; and when an initial transmission of the PUSCH is based on the first TCI state, the processor is further configured to apply a fourth spatial domain filter according to the first RS index for a subsequent transmission of the PUSCH.

7. The UE of claim 1, wherein:

the transceiver is further configured to transmit, in the PUSCH, a second RS index for a second beam failure recovery request associated with a second BFD RS set; and the processor is further configured to:

determine, based on the response and the first information, whether to apply the first spatial domain filter according to the second RS index for reception of the PDCCH; and determine, based on the response and the second information, whether to apply the second spatial domain filter according to the second RS index for reception of the PDSCH.

8. A base station (BS), comprising:

a transceiver configured to:

receive a physical uplink shared channel (PUSCH) including a first reference signal (RS) index for a first beam failure recovery request associated with a first beam failure detection (BFD) RS set;

transmit a response to the first beam failure recovery request;

transmit first information for reception of a physical downlink control channel (PDCCH); and transmit second information for reception of a physical downlink shared channel (PDSCH); and a processor operably coupled to the transceiver, the processor configured to:

determine, based on the response and the first information, whether to apply a first spatial domain filter according to the first RS index for transmission of the PDCCH; and determine, based on the response and the second information, whether to apply a second spatial domain filter according to the first RS index for transmission of the PDSCH, wherein:

the first information is provided in a higher layer parameter ControlResourceSet that configures reception of the PDCCH;

when the first information is set to ‘first’, transmission of the PDCCH is based on a first transmission configuration indication (TCI) state;

when the first information is set to ‘second’, transmission of the PDCCH is based on a second TCI state; and when the first information is set to ‘both’, transmission of the PDCCH is based on both the first and second TCI states.

9. The BS of claim 8, wherein the response corresponds to a PDCCH transmission with a downlink control information (DCI) format that (i) schedules a PUSCH reception with a hybrid automatic repeat request (HARQ) process number used for receiving the PUSCH and (ii) includes a toggled new data indicator (NDI) field value.

10. The BS of claim 8, wherein, when the first information is set to ‘first’ or ‘both’, the processor is further configured to apply the first spatial domain filter according to the first RS index for transmission of the PDCCH.

11. The BS of claim 8, wherein:

the second information is indicated in a downlink control information (DCI) format that schedules transmission of the PDSCH;

when the second information is set to ‘00’, transmission of the PDSCH is based on a first transmission configuration indication (TCI) state;

when the second information is set to ‘01’, transmission of the PDSCH is based on a second TCI state; and when the second information is set to ‘10’, transmission of the PDSCH is based on both the first and second TCI states.

12. The BS of claim 11, wherein, when the second information is set to ‘00’ or ‘10’, the processor is further configured to apply the second spatial domain filter according to the first RS index for transmission of the PDSCH.

13. The BS of claim 8, wherein:

when an initial reception of a physical uplink control channel (PUCCH) is based on a first transmission configuration indication (TCI) state, the processor is further configured to apply a third spatial domain filter according to the first RS index for a subsequent reception of the PUCCH; and when an initial reception of the PUSCH is based on the first TCI state, the processor is further configured to apply a fourth spatial domain filter according to the first RS index for a subsequent reception of the PUSCH.

14. The BS of claim 8, wherein:

the transceiver is further configured to receive, in the PUSCH, a second RS index for a second beam failure recovery request associated with a second BFD RS set; and the processor is further configured to:

determine, based on the response and the first information, whether to apply the first spatial domain filter according to the second RS index for transmission of the PDCCH; and determine, based on the response and the second information, whether to apply the second spatial domain filter according to the second RS index for transmission of the PDSCH.

15. A method performed by a user equipment (UE), the method comprising:

transmitting a physical uplink shared channel (PUSCH) including a first reference signal (RS) index for a first beam failure recovery request associated with a first beam failure detection (BFD) RS set;

receiving a response to the first beam failure recovery request;

receiving first information for reception of a physical downlink control channel (PDCCH);

receiving second information for reception of a physical downlink shared channel (PDSCH);

determining, based on the response and the first information, whether to apply a first spatial domain filter according to the first RS index for reception of the PDCCH; and determining, based on the response and the second information, whether to apply a second spatial domain filter according to the first RS index for reception of the PDSCH, wherein:

the first information is provided in a higher layer parameter ControlResourceSet that configures reception of the PDCCH;

when the first information is set to ‘first’, reception of the PDCCH is based on a first transmission configuration indication (TCI) state;

when the first information is set to ‘second’, reception of the PDCCH is based on a second TCI state; and when the first information is set to 'both', reception of the PDCCH is based on both the first and second TCI states.

16. The method of claim 15, wherein the response corresponds to a PDCCH reception with a downlink control information (DCI) format that (i) schedules a PUSCH transmission with a hybrid automatic repeat request (HARQ) process number used for transmitting the PUSCH and (ii) includes a toggled new data indicator (NDI) field value.

17. The method of claim 15, further comprising, when the first information is set to 'first' or 'both', applying the first spatial domain filter according to the first RS index for reception of the PDCCH.

18. The method of claim 15, wherein:

the second information is indicated in a downlink control information (DCI) format that schedules reception of the PDSCH;

when the second information is set to '00', reception of the PDSCH is based on a first transmission configuration indication (TCI) state;

when the second information is set to '01', reception of the PDSCH is based on a second TCI state; and when the second information is set to '10', reception of the PDSCH is based on both the first and second TCI states.

19. The method of claim 18, further comprising, when the second information is set to '00' or '10', applying the second spatial domain filter according to the first RS index for reception of the PDSCH.

20. The method of claim 15, further comprising:

when an initial transmission of a physical uplink control channel (PUCCH) is based on a first transmission configuration indication (TCI) state, applying a third spatial domain filter according to the first RS index for a subsequent transmission of the PUCCH; and when an initial transmission of the PUSCH is based on the first TCI state, applying a fourth spatial domain filter according to the first RS index for a subsequent transmission of the PUSCH.

* * * * *